(12) United States Patent
Tabuchi et al.

(10) Patent No.: US 8,842,726 B2
(45) Date of Patent: Sep. 23, 2014

(54) ENCODING APPARATUS OF VIDEO AND AUDIO DATA, ENCODING METHOD THEREOF, AND VIDEO EDITING SYSTEM

(75) Inventors: Atsushi Tabuchi, Kobe (JP); Naoya Yamasaki, Kobe (JP)

(73) Assignee: Thomson Licensing, Boulogne-Billancourt (FR)

( * ) Notice: Subject to any disclaimer, the term of this patent is extended or adjusted under 35 U.S.C. 154(b) by 441 days.

(21) Appl. No.: 12/737,409

(22) PCT Filed: Jul. 14, 2009

(86) PCT No.: PCT/JP2009/003294
§ 371 (c)(1),
(2), (4) Date: Jan. 11, 2011

(87) PCT Pub. No.: WO2010/007760
PCT Pub. Date: Jan. 21, 2010

(65) Prior Publication Data
US 2011/0110417 A1    May 12, 2011

(30) Foreign Application Priority Data

Jul. 16, 2008  (JP) ................................. 2008-185406

(51) Int. Cl.
*H04N 7/26* (2006.01)
*G11B 27/034* (2006.01)
*H04N 19/15* (2014.01)
(52) U.S. Cl.
CPC ........ *G11B 27/034* (2013.01); *H04N 19/00187* (2013.01)
USPC .................................................... 375/240.01
(58) Field of Classification Search
CPC .............. H04N 7/12; H04N 19/00163; H04N 19/00133; H04N 19/00181; H04N 19/00139; H04N 19/00206; H04N 19/00248
USPC ..................................................... 375/240.01
See application file for complete search history.

(56) References Cited

U.S. PATENT DOCUMENTS

2005/0157937 A1* 7/2005 Kondo et al. ................. 382/236
2006/0171689 A1* 8/2006 Smith ........................... 386/125

FOREIGN PATENT DOCUMENTS

WO          WO9749024        12/1997

OTHER PUBLICATIONS

Saraiya et al., "Encoding Solutions for MPEG Systems", Wescon Technical Papers, Western Periodicals Co, North Hollywood, CA, Nov. 7, 1995, pp. 732-737.

(Continued)

*Primary Examiner* — Jay Patel
*Assistant Examiner* — Francis G Geroleo
(74) *Attorney, Agent, or Firm* — Tutunjian & Bitetto, P.C.

(57) ABSTRACT

An encoding apparatus employing both a CPU and a chip or circuit dedicated to the encoding is disclosed. The encoding apparatus includes a hardware encoder and a software encoder. The hardware encoder is configured by hardware dedicated to the encoding and encodes a portion of AV data. The software encoder encodes another portion of the AV data in parallel to the encoding process of the hardware encoder by the use of a CPU. A position detector detects a switching position of an allocation destination in the AV data. A data allocator allocates sections of the AV data divided by the switching position to both encoders. A synthesizer arranges the encoded AV data in a predetermined sequence to synthesize a series of encoded AV data. An output unit outputs the series of encoded AV data.

9 Claims, 29 Drawing Sheets

(56) References Cited

OTHER PUBLICATIONS

Furht, "Processor Architectures for Multimedia: A Survey", Proceedings of 1997 International Conference on Multimedia Momdeling, Sinapore, Nov. 17-20, 1997, pp. 89-109.

Zheng et al., "Real-Time Software Based MPEG-4 Video Encoder", 2001 Proceedings of Workshop and Exhibitioin, Jun. 18-20, 2001, pp. 71-74.

Search Report Dated Feb. 25, 2010.

* cited by examiner

*FIG. 16*

| PROCESSING ITEMS | TYPE | CPU LOAD INDEX |
|---|---|---|
| DECODING OF VIDEO DATA | AVC-Intra 100 1920x1080/60i (100MbpsFIXED)<br>AVC-Intra 100 1280x720/60p (100MbpsFIXED)<br>AVC-Intra 50 1440x1080/60i (50MbpsFIXED)<br>DVCPRO HD 1280x1080/60i (100MbpsFIXED)<br>DVCPRO HD 1440x1080/50i (100MbpsFIXED)<br>Canopus HQ 1440x1080/60i AVERAGE100Mbps<br>Canopus HQ 1440x1080/60i AVERAGE150Mbps<br>DV25 720x480/60i (25MbpsFIXED) | 100<br>100<br>100<br>20<br>20<br>20<br>24<br>5 |
| RESOLUTION CONVERSION | 1920x1080 to 1440x1080<br>1280x720 to 1440x1080<br>1280x1080 to 1440x1080<br>720x480 to 1440x1080 | 10<br>20<br>10<br>20 |
| FRAME RATE CONVERSION | 1440x1080/50i to 1440x1080/60i<br>1280x720/60p to 1280x720/60i | 3<br>5 |
| TITLE | STANDARD ONE TITLE LAYER | 5 |
| EFFECT | DISSOLVE<br>COLOR CORRECTION<br>PICTURE IN PICTURE<br>OLD FILM<br>SOFT FOCUS | 5<br>5<br>5<br>20<br>35 |
| ENCODING OF VIDEO DATA | AVC-Intra 100 1920x1080/60i (100MbpsFIXED)<br>AVC-Intra 100 1280x720/60p (100MbpsFIXED)<br>AVC-Intra 50 1440x1080/60i (50MbpsFIXED)<br>DVCPRO HD 1280x1080/60i (100MbpsFIXED)<br>DVCPRO HD 1440x1080/50i (100MbpsFIXED)<br>Canopus HQ 1440x1080/60i AVERAGE100Mbps<br>Canopus HQ 1440x1080/60i AVERAGE150Mbps<br>DV25 720x480/60i (25MbpsFIXED) | 200<br>200<br>200<br>40<br>40<br>40<br>48<br>10 |

ENCODING APPARATUS OF VIDEO AND AUDIO DATA, ENCODING METHOD THEREOF, AND VIDEO EDITING SYSTEM

This application claims the benefit, under 35 U.S.C. §365 of International Application PCT/JP2009/03294, filed Jul. 14, 2009, which was published in accordance with PCT Article 21(2) on Jan. 21, 2010 in English and which claims the benefit of Japanese patent application No. 2008-185406, filed Jul. 16, 2008.

TECHNICAL FIELD

The present invention relates to encoding processing of video data and/or audio data.

BACKGROUND ART

A video editing system is a system used for supporting a user's editing work on video data and/or audio data (AV data) and is generally realized by making a computer terminal including a general-purpose CPU, such as a personal computer, execute a predetermined application program. The video editing system records one or more pieces of AV data from a video camera or the like onto an HDD beforehand and edits one AV data stream therefrom. The edited AV data which has been compressed by a system or the edited AV data which is non-compressed data is recorded in a recording medium, such as an HDD or a DVD, within the same system, is transmitted for broadcast or the like, or is output to the outside through an interface, such as IEEE 1394.

The video editing system employs a variety of encoding schemes to compress and encode the AV data. As encoding processes of the AV data, a technique of employing a CPU (Central Processing Unit) to edit and decode the AV data and a technique of performing an encoding process using a chip or circuit dedicated to the encoding process are known.

CITATION LIST

Patent Literature

[PTL1] Japanese Unexamined Patent Application, First Publication No. 2004-356851
[PTL2] Japanese Unexamined Patent Application, First Publication No. H06-339018

SUMMARY OF INVENTION

Technical Problem

An object of the present invention is to provide a novel and useful encoding apparatus for encoding video and audio data, an encoding method thereof, and a video editing system. A specific object of the present invention is to provide an encoding apparatus for encoding video and audio data to obtain good image quality using both a CPU which performs another process other than the encoding process on the video and audio data and a chip or circuit dedicated to the encoding process, an encoding method thereof, and a video editing system.

Solution to Problem

According to an aspect of the present invention, there is provided an encoding apparatus for encoding audiovisual (AV) data including audio data and/or video data, including: a CPU; a hardware encoder, configured by hardware, for encoding a portion of AV data to be encoded; a software encoder for encoding another portion of the AV data using the CPU in parallel with the encoding by the hardware encoder; a position detector for detecting a switching position of a destination to which the AV data is allocated, the switching position being at least one of a position in the AV data at which one scene is switched to another scene, a position in the AV data at which the type of edit process is changed according to a predetermined pattern, a position in the AV data at which an amount of variation in scene between the data units before and after this position is greater than a predetermined threshold, and a position in the AV data at which amounts of information of both the data units before and after this position are less than a predetermined threshold; a data allocator for allocating the portion or the other portion of the AV data to the hardware encoder or the software encoder, a destination to which the portion or the other portion of the AV data is supplied being switched at the switching position from one of the hardware encoder and the software encoder to the other; a synthesizer for arranging AV data encoded by the hardware encoder and AV data encoded by the software encoder in a predetermined sequence to synthesize a series of encoded AV data; and an output unit for outputting the series of encoded AV data.

According to the present invention, the position detector detects the switching position of the destination to which the AV data to be encoded is allocated and the data allocator switches the destination to which the AV data is allocated from one of the hardware encoder and the software encoder to the other at the switching position. Accordingly, the hardware encoder and the software encoder encode the AV data in parallel. Here, the switching position is at least one of a position in the AV data at which one scene is switched to another scene, a position in the AV data at which the type of edit process is changed according to a predetermined pattern, a position in the AV data at which the amount of variation in scenes between the data units before and after this position is greater than a predetermined threshold, and a position in the AV data at which amounts of information of both the data units before and after this position are less than a predetermined threshold. At the position at which one scene is switched to another scene, the position at which the type of the edit process is changed according to the predetermined pattern, and the position at which the amount of variation in scene between the data units before and after this position is greater than the predetermined threshold, the variation in the image is great. Accordingly, even when the encoding process of the hardware encoder and the encoding process of the software encoder are switched at the positions, a viewer will hardly perceive the variation in image quality, if any, which is caused by a difference between the encoding process of the hardware encoder and the encoding process of the software encoder, from a video reconstructed by decoding this encoded AV data. Additionally, at the position at which amounts of information of both the data units before and after this position are less than the predetermined threshold, the amount of information in data units of the AV data is small. Accordingly, even when the encoding process of the hardware encoder and the encoding process of the software encoder are switched at this position, there is only minimal variation in image quality caused by the difference between the encoding process of the hardware encoder and the encoding process of the software encoder. Thus, the viewer will hardly perceive the variation from a video reconstructed by decoding this encoded AV data. Therefore, the encoding apparatus according to the present invention can improve the image quality of the encoded AV data.

In the specification and the claims, the "hardware encoder" is (i) a circuit such as an IC or a module specifically designed to execute a portion or all of the encoding process of AV data or (ii) an arithmetic circuit such as a CPU or a DSP (Digital Signal Processor) which can execute a portion or all of the encoding process of AV data and a process other than the encoding process, whereby the arithmetic circuit exclusively performing a portion or all of the encoding process during the arithmetic circuit is executing the portion or all of the encoding process of AV data.

In the specification and the claims, the "software encoder" means an encoder for performing the encoding process on the AV data in parallel with another process by making an arithmetic circuit, which is also used in another process other than the encoding process of the AV data, such as a general-purpose CPU or a DSP, execute the software for encoding the AV data.

According to another aspect of the present invention, there is provided a video editing system including: a CPU; an editor for editing AV data including audio data and/or video data; a hardware encoder, configured by a circuit for encoding, for encoding a portion of AV data to be encoded; a software encoder for encoding another portion of the AV data using the CPU in parallel with the encoding by the hardware encoder; a position detector for detecting a switching position of a destination to which the AV data is allocated, the switching position being at least one of a position in the AV data at which one scene is switched to another scene, a position in the AV data at which the type of an edit process is changed according to a predetermined pattern, a position in the AV data at which an amount of variation in scene between the data units before and after this position is greater than a predetermined threshold, and a position in the AV data at which amounts of information of both the data units before and after this position are less than a predetermined threshold; a data allocator for allocating the portion or the other portion of the AV data to the hardware encoder or the software encoder, a destination to which the portion or the other portion of AV data is supplied being switched at the switching position from one of the hardware encoder and the software encoder to the other; a synthesizer for arranging AV data encoded by the hardware encoder and AV data encoded by the software encoder in a predetermined sequence to synthesize a series of encoded AV data; and an output unit for outputting the series of encoded AV data.

According to the present invention, the position detector detects the switching position of the destination to which the AV data edited by the editor is allocated and the data allocator switches the destination to which the AV data is allocated from one of the hardware encoder and the software encoder to the other at the switching position. Accordingly, the hardware encoder and the software encoder encode the edited AV data in parallel. Here, the switching position is at least one of a position in the AV data at which one scene is switched to another scene, a position in the AV data at which the type of edit process is changed according to a predetermined pattern, a position in the AV data at which the amount of variation in scene between the data units before and after this position is greater than a predetermined threshold, and a position in the AV data at which amounts of information of both the data units before and after this position are less than a predetermined threshold. At the position at which one scene is switched to another scene, the position at which the type of edit process is changed according to the predetermined pattern, and the position at which the amount of variation in scene between the data units before and after the position is greater than the predetermined threshold, the variation in the image is great. Accordingly, even when the encoding process of the hardware encoder and the encoding process of the software encoder are switched at the positions, a viewer will hardly perceive a variation in image quality, if any, which is caused by a difference between the encoding process of the hardware encoder and the encoding process of the software encoder, from a video reconstructed by decoding this encoded AV data. Additionally, at the position at which amounts of information of both the data units before and after this position are less than the predetermined threshold, the amount of information in data units of the AV data is small. Accordingly, even when the encoding process of the hardware encoder and the encoding process of the software encoder are switched at this position, there is only minimal variation in image quality caused by the difference between the encoding process of the hardware encoder and the encoding process of the software encoder. Thus, the viewer will hardly perceive the variation from a video reconstructed by decoding this encoded AV data. Therefore, the video editing system according to the present invention can improve the image quality of the encoded AV data.

According to another aspect of the present invention, there is provided a method of encoding audiovisual (AV) data including audio data and/or video data, the method including the steps of: receiving the AV; detecting a switching position of a destination to which the AV data is allocated, the switching position being at least one of a position in the AV data at which one scene is switched to another scene, a position in the AV data at which the type of edit process is changed according to a predetermined pattern, a position in the AV data at which an amount of variation in scene between the data units before and after this position is greater than a predetermined threshold, and a position in the AV data at which amounts of information of both the data units before and after this position are less than a predetermined threshold; allocating a portion or another portion of the AV data to a hardware encoder or a software encoder, a destination to which the portion of the other portion of the AV data is supplied being switched at the switching position from one of the hardware encoder and the software encoder to the other, wherein the hardware encoder is configured by hardware for encoding and the software encoder uses a CPU for encoding; encoding the portion or the other portion of the AV data in parallel by the hardware encoder and the software encoder; arranging AV data encoded by the hardware encoder and AV data encoded by the software encoder in a predetermined sequence and synthesizing a series of encoded AV data; and outputting the series of encoded AV data.

According to the present invention, the switching position of the destination to which the AV data to be encoded is allocated is detected and the destination to which the AV data is allocated is switched from one of the hardware encoder and the software encoder to the other at the switching position. Accordingly, the hardware encoder and the software encoder encode the AV data in parallel. Here, the switching position is at least one of a position in the AV data at which one scene is switched to another scene, a position in the AV data at which the type of edit process is changed according to a predetermined pattern, a position in the AV data at which the amount of variation in scenes between the data units before and after this position is greater than a predetermined threshold, and a position in the AV data at which amounts of information of both the data units before and after this position are less than a predetermined threshold. At the position at which one scene is switched to another scene, the position at which the type of edit process is changed according to the predetermined pattern, and the position at which the amount of variation in scenes between the data units before and after this position is greater than the predetermined threshold, the variation in image is great. Accordingly, even when the encoding process of the hardware encoder and the encoding process of the software encoder are switched at the positions, a viewer will hardly perceive a variation in image quality, if any, which is caused by a difference between the encoding process of the hardware encoder and the encoding process of the software encoder, from a video reconstructed by decoding this encoded AV data. Additionally, at the position at which amounts of information of both the data units before and after this position are less than the predetermined threshold, the amount of information in data units of the AV data is small. Accordingly, even when the encoding process of the hardware encoder and the encoding process of the software encoder are switched at this position, there is only minimal variation in image quality caused by the difference between the encoding process of the hardware encoder and the encoding process of the software encoder. Thus, the viewer will hardly perceives the variation from a video reconstructed by decoding this encoded AV data. Therefore, the encoding method according to the present invention can improve the image quality of the encoded AV data.

According to another aspect of the present invention, there is provided a program for encoding audiovisual (AV) data including audio data and/or video data, the program making an apparatus which includes: a CPU; a hardware encoder, configured by hardware dedicated to encoding, for encoding a portion of AV data to be encoded; and a software encoder for encoding another portion of the AV data to be encoded using the CPU, perform the steps of: receiving the AV data to be encoded; detecting a switching position of a destination to which the AV data is allocated, the switching position being at least one of a position in the AV data at which one scene is switched to another scene, a position in the AV data at which the type of edit process is changed according to a predetermined pattern, a position in the AV data at which an amount of variation in scene between the data units before and after this position is greater than a predetermined threshold, and a position in the AV data at which amounts of information of both the data units before and after this position are less than a predetermined threshold; allocating the AV data to the hardware encoder or the software encoder, a destination to which the AV data is supplied being switched at the switching position from one of the hardware encoder and the software encoder to the other; encoding, in the hardware encoder or the software encoder, the supplied AV data; arranging AV data encoded by the hardware encoder and AV data encoded by the software encoder in a predetermined sequence to synthesize a series of encoded AV data; and outputting the series of encoded AV data.

According to the present invention, the switching position of the destination to which the AV data to be encoded is allocated is detected and the destination to which the AV data is allocated is switched from one of the hardware encoder and the software encoder to the other at the switching position. Accordingly, the hardware encoder and the software encoder encode the AV data in parallel. Here, the switching position is at least one of a position in the AV data at which one scene is switched to another scene, a position in the AV data at which the type of edit process is changed according to a predetermined pattern, a position in the AV data at which an amount of variation in scene between the data units before and after this position is greater than a predetermined threshold, and a position in the AV data at which amounts of information of both the data units before and after the position are less than a predetermined threshold. At the position at which one scene is switched to another scene, the position at which the type of edit process is changed according to the predetermined pattern, and the position at which the amount of variation in scene between the data units before and after this position is greater than the predetermined threshold, the variation in image is great. Accordingly, even when the encoding process of the hardware encoder and the encoding process of the software encoder are switched at the positions, a viewer will hardly perceive a variation in image quality, if any, which is caused by a difference between the encoding process of the hardware encoder and the encoding process of the software encoder, from a video reconstructed by decoding this encoded AV data. Additionally, at the position at which the amounts of information of both the data units before and after this position are less than the predetermined threshold, the amount of information in data units of the AV data is small. Accordingly, even when the encoding process of the hardware encoder and the encoding process of the software encoder are switched at this position, there is only minimal variation in image quality caused by the difference between the encoding process of the hardware encoder and the encoding process of the software encoder. Thus, the viewer will hardly perceive the variation from a video reconstructed by decoding this encoded AV data. Therefore, the program according to the present invention can improve the image quality of the encoded AV data.

Advantageous Effects of Invention

According to the present invention, it is possible to provide an encoding apparatus for encoding video and audio data to obtain good image quality using both a CPU performing another process on the video and audio data other than an encoding process and a chip or circuit dedicated to the encoding process, an encoding method thereof, and a video editing system.

BRIEF DESCRIPTION OF DRAWINGS

FIG. 16 is a diagram showing an example of CPU load indices stored in a first database according to the sixth embodiment.

DESCRIPTION OF EMBODIMENTS

Figure 1:
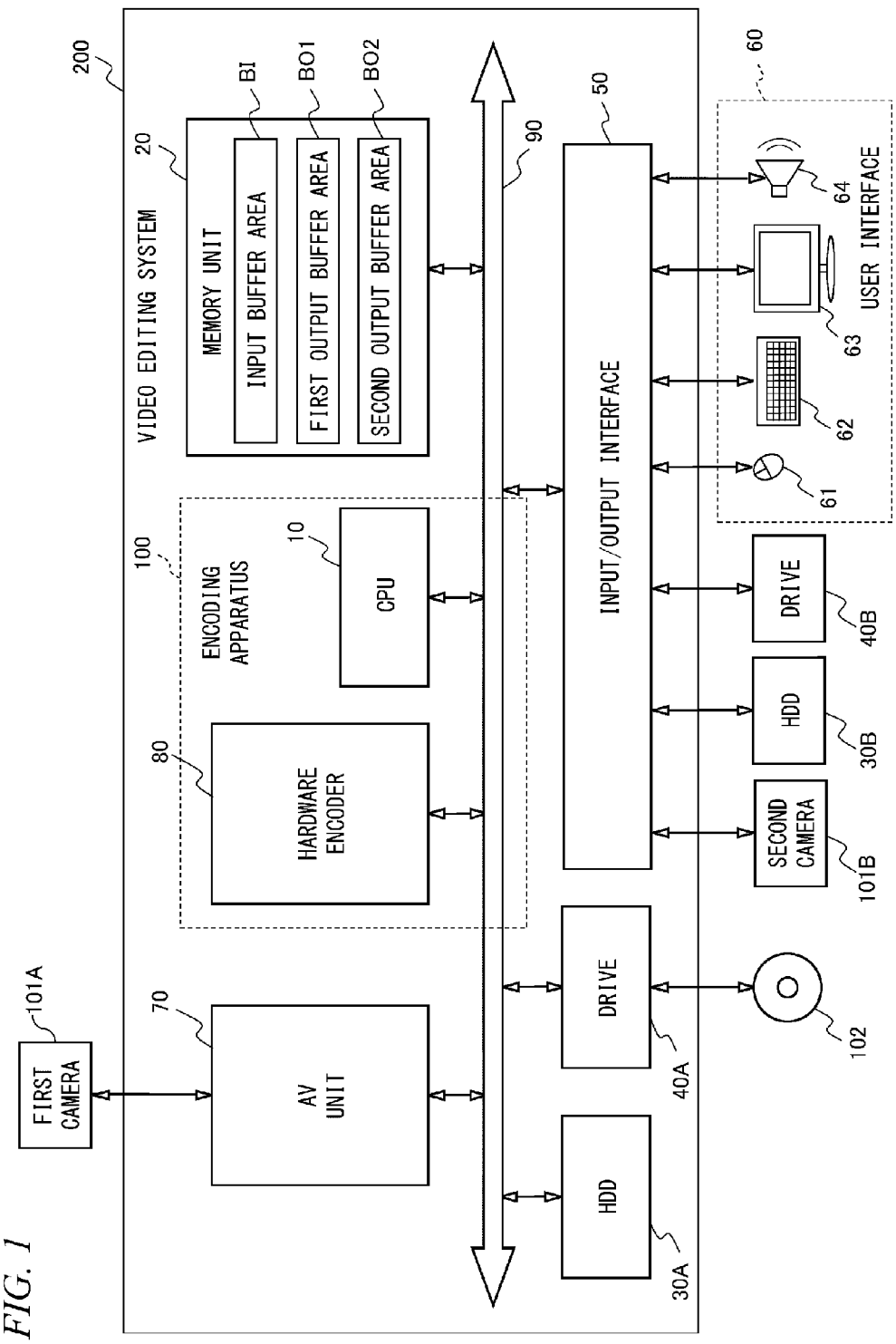
FIG. 1 is a block diagram showing hardware configurations of a video editing system and an encoding apparatus according to a first embodiment of the present invention.

Hereinafter, preferred embodiments of the present invention will be described referring to the drawings. Note that the present invention can encode both video data and audio data. Therefore, in the following description, AV data includes video data and/or audio data.

First Embodiment

FIG. 1 is a block diagram showing the configuration of an encoding apparatus 100 and a video editing system 200 according to a first embodiment of the present invention. Referring to FIG. 1, the video editing system 200 according to the first embodiment of the present invention is a nonlinear video editing system and is realized using a computer terminal such as a personal computer. The video editing system 200 is provided with an encoding apparatus 100, a memory unit 20, an HDD 30A, a drive 40A, an input/output interface 50, a user interface 60, an AV unit 70, and an internal bus 90 connecting these elements. The encoding apparatus 100 is provided with a CPU 10 and the hardware encoder 80. The video editing system 200 may be further provided with a network interface which can be connected to an external LAN or the Internet.

The CPU 10 functions as an editor 13, a data allocator 14, a software encoder 152, a synthesizer 16, an output unit 17, and a switching position detector 18, which are described later, by executing programs stored in the memory unit 20. That is, the CPU 10 controls and processes the video editing system 200 and also performs an encoding process as the software encoder 152.

Programs and data for making the CPU 10 execute processes to be described later are stored in the memory unit 20. Additionally, an input buffer area BI, a first output buffer area BO1, and a second output buffer area BO2 are reserved in the memory unit 20. The input buffer area BI is an area into which AV data to be encoded is written, the first output buffer area BO1 is an area into which AV data encoded by the hardware encoder 80 is written, and the second output buffer area BO2 is an area into which AV data encoded by the software encoder 152 is written.

The HDD 30A and the drive 40A are built in the computer terminal which realizes the video editing system 200. Note that as shown in FIG. 1, an external HDD 30B connected to the internal bus 90 via the input/output interface 50 may be provided instead of the HDD 30A, or both the HDD 30A and the HDD 30B may be provided. The HDD 30B may be connected to the input/output interface 50 via a network. A drive 40B may be similarly provided instead of or in addition to the drive 40A.

The drive 40A and the drive 40B record and play back AV data in and from a removable medium such as a DVD 102. An example of the removable medium can include an optical disk, a magnetic disk, a magneto-optical disk, and a semiconductor memory.

The input/output interface 50 connects elements 61 to 64 of the user interface 60 and a storage medium built in an external apparatus such as a second camera 101B to the internal bus 90, in addition to the HDD 30B and the drive 40B. For example, the input/output interface 50 includes an IEEE 1394 interface and inputs and outputs AV data to and from the second camera 101B using the interface. The input/output interface 50 can input and output AV data to and from various apparatuses handling the AV data such as a VTR, a switcher, and a transmission server, in addition to the second camera 101B.

The user interface 60 is connected to the internal bus 90 via the input/output interface 50. The user interface 60 includes, for example, a mouse 61, a keyboard 62, a display 63, and a speaker 64. The user interface 60 may include other input devices such as a touch panel (not shown).

The AV unit 70 includes a video interface and an audio interface. The AV unit 70 inputs and outputs AV data to and from external apparatuses such as a first camera 101A via the interfaces. The AV unit 70 can input and output AV data to and from various apparatuses handling the AV data such as a VTR, a switcher, and a transmission server, in addition to the first camera 101A.

The hardware encoder 80 is (i) a circuit, such as an IC or a module, specifically designed to execute a portion or all of the encoding process of AV data or (ii) an arithmetic circuit, such as a CPU or a DSP, which can execute a portion or all of the encoding process of AV data and a process other than the encoding process, whereby the arithmetic circuit exclusively performing a portion or all of the encoding process of AV data during the arithmetic circuit is executing the portion or all of the encoding process.

The hardware encoder 80 compresses non-compressed AV data by encoding processing. For example, in a lossy encoding scheme, the encoding process of AV data executed by the hardware encoder 80 includes:

(I) a step of division into blocks, tiles, and the like;
(II) a step of orthogonal transform, such as DCT (Discrete Cosine Transform) or wavelet transform;
(III) a quantization step; and
(IV) a lossless encoding step, such as entropy encoding.

The encoding process of AV data by the hardware encoder 80 may further include, for example, a sub-sampling step, a shuffling step, an intra-frame prediction step, and an inter-frame prediction step. Note that the encoding process of AV data by the hardware encoder 80 may be an encoding process which does not perform compression.

The hardware encoder 80 has a frame buffer built therein and encodes AV data stored therein. Alternatively, a predetermined storage area of the memory unit 20 may be used as a similar frame buffer. The encoding scheme by the hardware encoder 80 is, for example, one of but not limited to a DV scheme, an MPEG scheme, a JPEG 2000 scheme, an intra-frame scheme (for example, an AVC-Intra scheme), or a closed GOP scheme such as a closed GOP scheme in the MPEG scheme. The encoding scheme by the hardware encoder 80 is selected beforehand according to the device which is the destination to which the encoded video data is to be output. The hardware encoder 80 encodes each data unit based on information included therein. For example, in the intra-frame scheme, the data unit is one frame. Moreover, in the closed GOP scheme, the encoding data unit may be 1 GOP.

Figure 2:
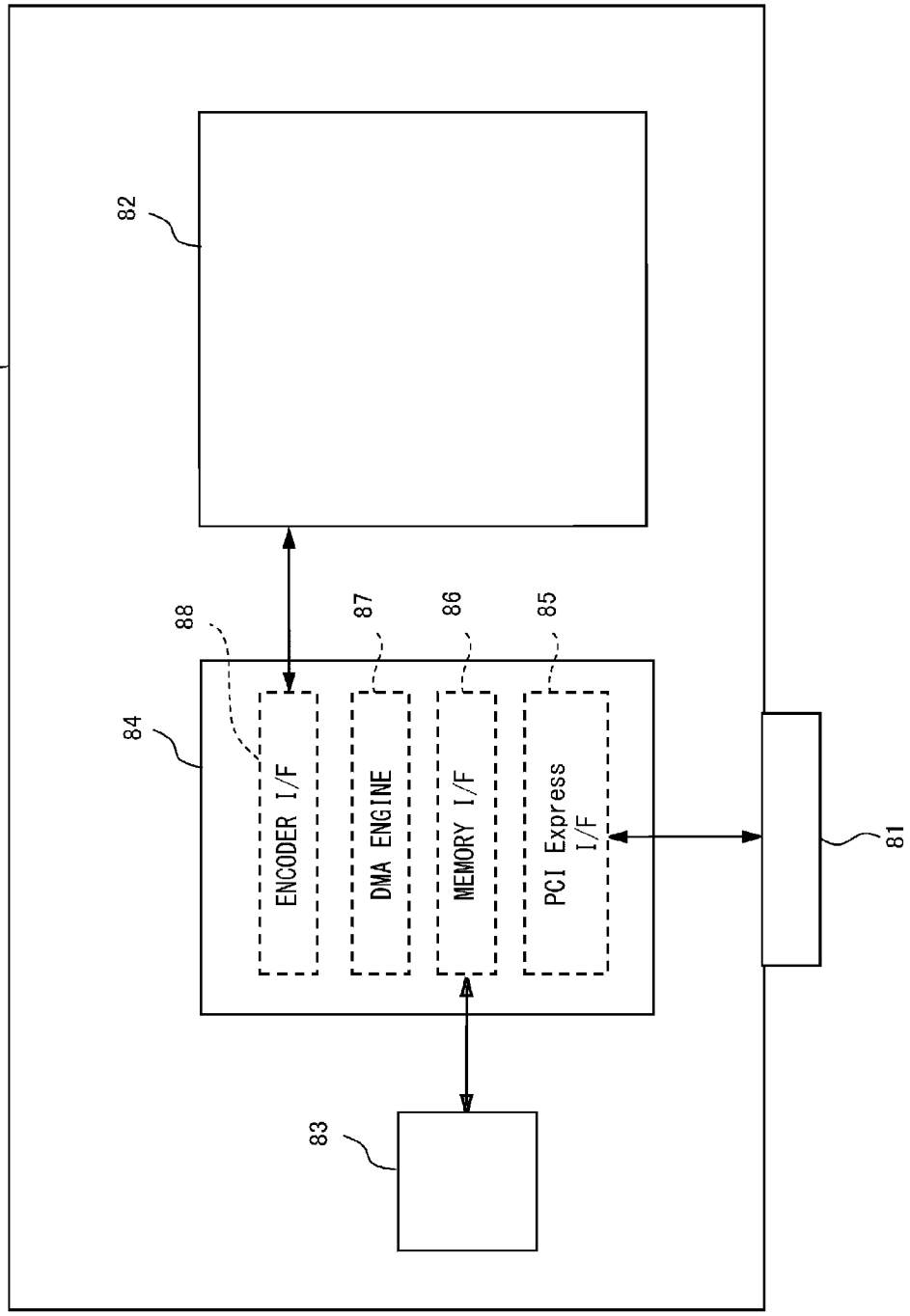
FIG. 2 is a schematic plan view of a board equipped with the hardware encoder.

FIG. 2 is an example of a schematic plan view of a board 800 on which the hardware encoder 80 shown in FIG. 1 is mounted. The board 800 is mounted in the computer terminal which realizes the video editing system 200.

Referring to FIG. 2, the board 800 includes a connector 81, a hardware encoder 82, a frame buffer 83, and an FPGA (Field Programmable Gate Array) 84. The AV unit 70 may be further mounted on the board 800.

The connector 81 is in conformity with PCI-Express and connects circuits on the board 800 to a PCI-Express bus of the computer terminal when inserted into a PCI-Express slot in the computer terminal. The bus is included in the internal bus 90.

The frame buffer 83 is an independent device of DDR2-SDRAM (Double-Data-Rate 2-Synchronous DRAM) and can store a predetermined number of frames, for example, four frames. AV data to be encoded is transferred frame by frame to the frame buffer 83 from the input buffer area BI of the memory unit 20 through the connector 81 and the FPGA 84. The hardware encoder 82 sequentially encodes the AV data from the first address of the frame buffer 83 through the FPGA 84. The AV data encoded by the hardware encoder 82 is written frame by frame into the frame buffer 83 through the FPGA 84 and is further transferred from the frame buffer 83 to the first output buffer area BO1 of the memory unit 20 via the FPGA 84 and the connector 81.

The FPGA 84 is a single chip and includes a PCI-Express interface 85, a memory interface 86, a DMA engine 87, and an encoder interface 88. The PCI-Express interface 85 connects other modules in the FPGA 84 to the PCI-Express bus of the computer terminal which constitutes the video editing system 200 through the connector 81. The memory interface 86 controls the access of the other modules in the FPGA 84 to the frame buffer 83. The DMA engine 87 controls the transfer of the AV data between the memory unit 20 and the frame buffer 83 via the PCI-Express bus in the computer terminal using the PCI-Express interface 85 and the memory interface 86. The encoder interface 88 connects the other modules in the FPGA 84 to the hardware encoder 82.

Figure 3:
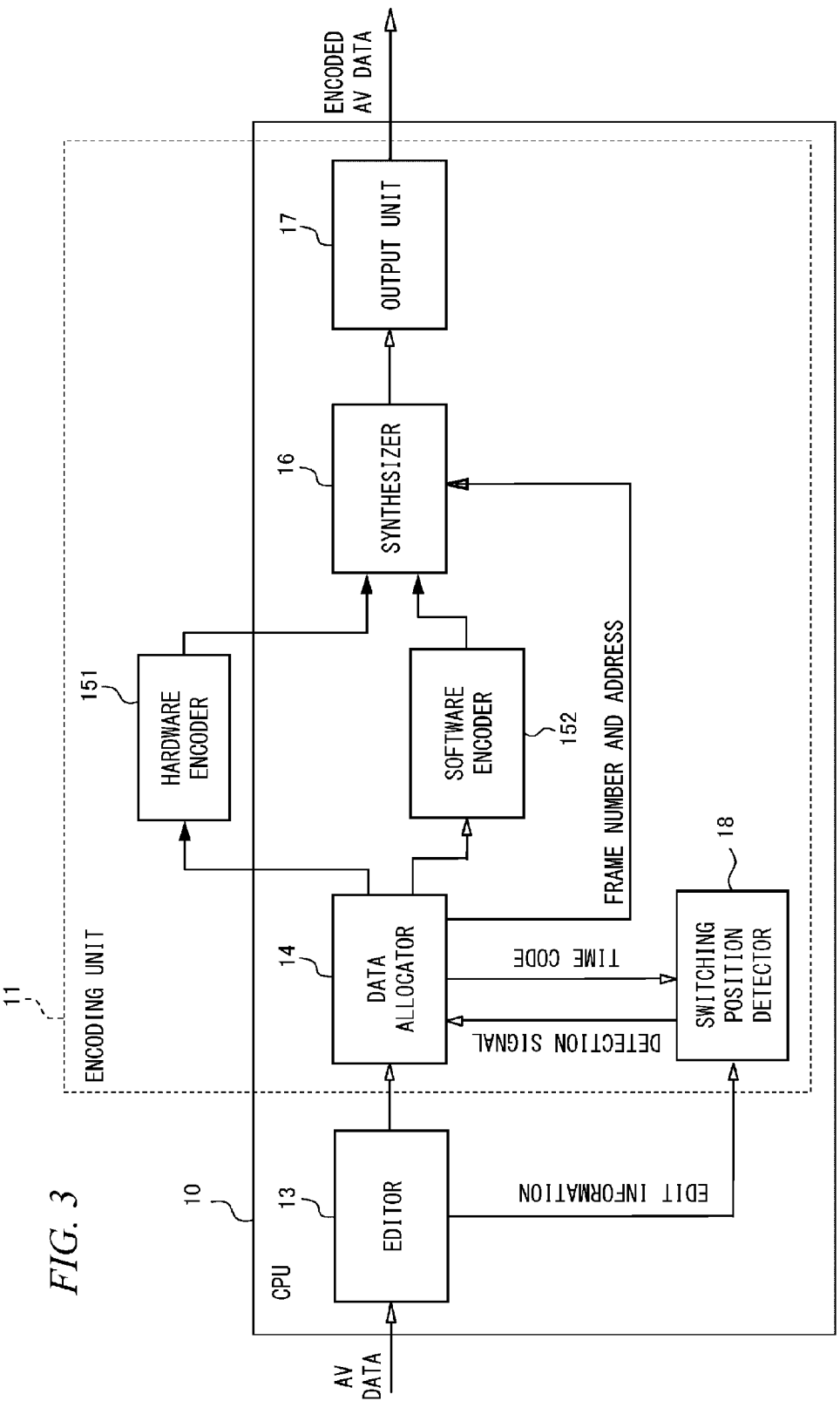
FIG. 3 is a block diagram showing a functional configuration of the video editing system according to the first embodiment of the present invention.

FIG. 3 is a block diagram showing the main functional configuration of the video editing system 200 of FIG. 1. Referring to FIG. 3, the video editing system 200 includes an editor 13 and an encoding unit 11 as the functional configuration. The encoding unit 11 includes a data allocator 14, a hardware encoder 151, a software encoder 152, a synthesizer 16, an output unit 17, and a switching position detector 18. The editor 13, the data allocator 14, the software encoder 152, the synthesizer 16, the output unit 17, and the switching position detector 18 are realized by making the CPU 10 of the video editing system 200 shown in FIG. 1 execute programs.

The editor 13 selects AV data to be edited according to a user's operation and prepares edit information thereon. Here, the edit information is information for defining details of a process of editing a series of AV data streams from the AV data to be edited. The edit information includes, for example, information, that is, clips, referring to a portion or all of material data constituting portions of the AV data streams. The edit information also includes, for each clip, identification information and the format of files including the material data of the reference source thereof, the type, image size, aspect ratio, and frame rate of the material data, such as still images or moving images, and/or time codes of the start and end positions of a portion or all of the material data in a time axis, that is, on a time line. The edit information further includes, for each clip, information for defining details of an edit process such as a decoding process or an effect process on the material data of the reference source. Here, the type of the effect process includes, for example, adjustment of color or brightness of images corresponding to the clips, special effects on all of the images corresponding to the clips, and synthesis of images of a plurality of clips.

Moreover, the editor 13 reads selected AV data based on the edit information, performs the edit process thereon, and outputs the resultant data as a series of AV data streams.

Specifically, the editor 13 first displays a list of files stored in a resource such as the DVD 102, the HDD 30A, or the HDD 30B on the display 63 included in the user interface 60. The files include, for example, video data, audio data, still images, or text data. A user selects a file including data to be edited, that is, material data, from the list by operating the mouse 61 and/or the keyboard 62. The editor 13 receives the user's selection of the file and displays the clip corresponding to the selected file on the display 63.

Figure 4:
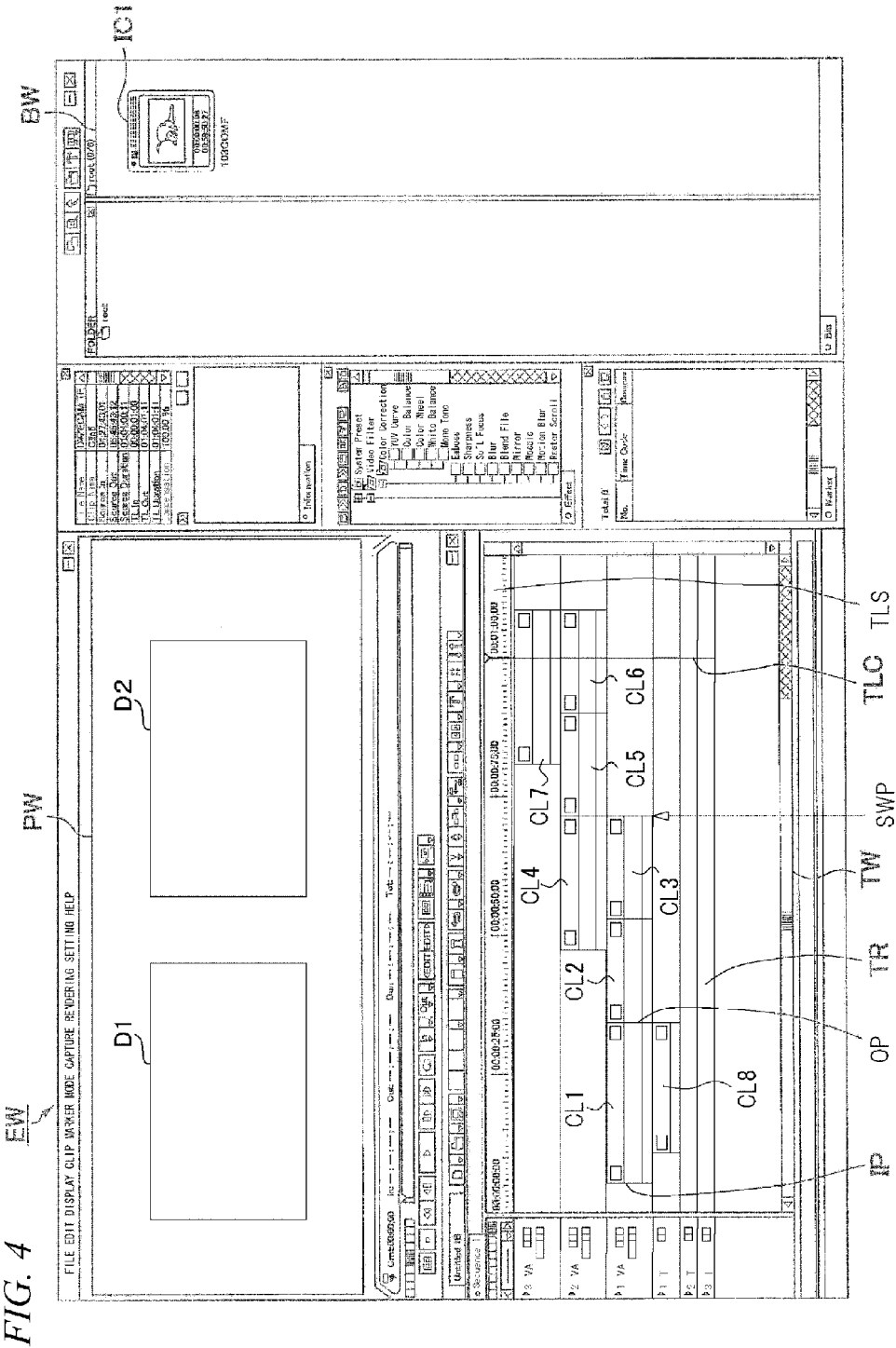
FIG. 4 is a view showing an example of an edit window displayed on the video editing system according to the first embodiment of the present invention.

FIG. 4 shows an example of an edit window EW. The editor 13 displays the edit window EW on the display 63 and receives the user's edit operation. Referring to FIG. 4, the edit window EW includes, for example, a material window BW, a time line window TW, and a preview window PW.

The editor 13 displays an icon IC1 of the clip corresponding to the selected file to be edited on the material window BW.

The editor 13 displays a plurality of tracks TR in the time line window TW and receives arrangement of the clips CL1 to CL8 on the tracks TR. In the example shown in FIG. 4, each track TR is a thin and longitudinal stripe area extending in the horizontal direction of the screen. Each track TR indicates position information in the time line. In the example shown in FIG. 4, a position on the tracks TR in the horizontal direction on the screen is associated with a position on the time line so that the position on the time line changes as the position on the tracks TR changes from left to right in the horizontal direction on the screen. The editor 13 receives the arrangement of the clips CL1 to CL8 from the material window BW to the tracks TR by, for example, the user's operation of the mouse 61.

Additionally, the editor 13 may display a time line cursor TLC and a time-axis scale TLS on the time line window TW. In the example shown in FIG. 4, the time line cursor TLC is a straight line extending in the vertical direction of the screen from the time-axis scale TLS and vertically intersecting the tracks TR. The time line cursor TLC can move in the horizontal direction in the time line window TW. The value of the time-axis scale TLS pointed by the edge of the time line cursor TLC indicates the position of an intersection of the time line cursor TLC and the tracks TR on the time line.

The editor 13 receives the setting of an in point IP as the start position and an out point OP as the end position of the clips CL1 to CL8 disposed on the tracks TR in the time line and the change of the in point IP and the out point OP of the clips CL1 to CL8 after they are arranged on the tracks TR.

The editor 13 can further receive the setting of the effect process on the clips CL1 to CL8 arranged on the tracks TR from the user. For example, the user can designate to the editor 13 the adjustment of color or brightness of images corresponding to the clips CL1 to CL8, the setting of special effects on all of the images corresponding to the clips CL1 to CL8, and the synthesis of the images of the third clip CL3 and the fourth clip CL4 arranged in parallel on different tracks TR.

The editor 13 displays images corresponding to the clips arranged at the positions in the time line indicated by the time line cursor TLC on the preview window PW. In the example shown in FIG. 4, the image D1 corresponding to the position in the sixth clip CL6 and the image D2 corresponding to the position in the seventh clip CL7, which are indicated by the time line cursor TLC, are displayed on the preview window PW. Additionally, the editor 13 displays a moving image corresponding to the designated range on the preview window PW out of the clips CL1 to CL8 arranged in the time line window TW. The user can check the result of the edit process received by the editor 13 from the images displayed on the preview window PW.

The editor 13 outputs the arrangement of the clips CL1 to CL8 on the tracks TR in the time line window TW and the edit information on the series of AV data streams edited based on the effect processes set for the clips CL1 to CL8. Furthermore, the editor 13 connects the AV data, referred to by the clips CL1 to CL8, in the sequence on the time line according to the edit information and outputs the resultant data as the series of AV data streams. The editor 13 writes the AV data streams as the AV data to be encoded into the input buffer area BI of the memory unit 20 and notifies the data allocator 14 of the writing operation.

Returning to FIG. 3, the data allocator 14 allocates the AV data written into the input buffer area BI of the memory unit 20 by the editor 13 to the hardware encoder 151 or the software encoder 152. The data allocator 14 switches the destination to which the AV data is allocated from one of the encoders 151 and 152 to the other, whenever receiving a detection signal from the switching position detector 18.

Specifically, the data allocator 14 first reserves output buffer areas BO1 and BO2 within the memory unit 20 to which the encoded AV data should be written for the encoders 151 and 152.

Then, whenever one data unit, for example, one frame, to be encoded is written into the input buffer area BI, the data allocator 14 reads the time code from the data unit and sends the read time code to the switching position detector 18. When the detection signal is returned from the switching position detector 18 in response to the output of the time code, the data allocator 14 switches the destination to which the data unit is allocated to an encoder that is different from the destination to which the immediately preceding data unit was allocated. On the other hand, when the detection signal is not returned, the data allocator 14 maintains the destination to which the data unit is allocated in the same encoder as the destination to which the immediately preceding data unit was allocated.

The data allocator 14 then sequentially transfers the data units of which the allocation destination is the hardware encoder 151 to the frame buffer of the hardware encoder 151. Moreover, the data allocator 14 correlates addresses in the first output buffer area BO1 with the transferred data units and designates the addresses as the writing destinations after the encoding in the hardware encoder 151. The hardware encoder 151 sequentially encodes the data units in the frame buffer and writes the encoded data units into the designated addresses of the first output buffer area BO1.

On the other hand, the data allocator 14 sequentially sends to the software encoder 152 the addresses of the data units of which the allocation destination is the software encoder 152 in the input buffer area BI. Additionally, the data allocator 14 correlates the addresses in the second output buffer area BO2 with the addresses in the input buffer area BI, and designates the addresses as the writing destinations after the encoding in the software encoder 152. The software encoder 152 sequentially encodes the data units corresponding to the addresses in the input buffer area BI which were received from the data allocator 14 and writes the encoded data units into the designated addresses in the second output buffer area BO2.

Moreover, the data allocator 14 sequentially allocates serial numbers, for example, frame numbers, to the data units allocated to both encoders 151 and 152 and sends the serial numbers to the synthesizer 16 along with the addresses designated as the writing destinations after encoding the data units of the respective numbers in the encoders 151 and 152.

Note that when two or more hardware encoders are provided and the hardware encoders perform encoding processes in parallel, the data allocator 14 allocates the AV data to be encoded to the hardware encoders.

The hardware encoder 151 is a device driver of the hardware encoder 80 shown in FIG. 1. The hardware encoder 151 sequentially encodes the AV data to be encoded that have been transmitted from the input buffer area BI of the memory unit 20 to the frame buffer by the data allocator 14. The encoding scheme is set by the editor 13. The hardware encoder 151 encodes the data units of the AV data based on the information included therein. For example, when the encoding scheme is an intra-frame scheme, the data unit of the encoding is one frame. When the encoding scheme is a closed GOP scheme, the data unit of the encoding is one GOP. The hardware encoder 151 transfers the encoded AV data to the addresses in the first output buffer area BO1 designated by the data allocator 14. Moreover, the hardware encoder 151 notifies the synthesizer 16 of the addresses of the transfer destinations whenever transmitting the encoded AV data to the first output buffer area BO1.

The software encoder 152 is an encoding process module executed by the CPU 10, and encodes the AV data to be encoded, which is stored in the input buffer area BI of the memory unit 20, in the sequence of addresses designated by the data allocator 14. The software encoder 152 performs the encoding process in parallel with the hardware encoder 151. Similarly to the hardware encoder 151, the software encoder 152 encodes the data units based on the information included therein.

The data unit of the software encoder 152 is common to the data unit of the hardware encoder 151. For example, when the data unit of the encoding in the hardware encoder 151 is one frame, the data unit of the encoding in the software encoder 152 is also one frame. When the data unit of the encoding in the hardware encoder 151 is one GOP, the data unit of the encoding in the software encoder 152 is also one GOP.

The encoding scheme of the software encoder 152 is common to the encoding scheme of the hardware encoder 151. For example, when the encoding scheme of the hardware encoder 151 is the intra-frame scheme, the encoding scheme of the software encoder 152 is also the intra-frame scheme. When the encoding scheme of the hardware encoder 151 is the closed GOP scheme, the encoding scheme of the software encoder 152 is also the closed GOP scheme.

The software encoder 152 writes the encoded AV data to the addresses in the second output buffer area BO2 designated by the data allocator 14. Moreover, the software encoder 152 notifies the synthesizer 16 of the writing destination addresses each time the software encoder 152 writes the encoded AV data to the second output buffer area BO2.

The synthesizer 16 arranges the data units encoded by the hardware encoder 151 and the software encoder 152 in the order of numbers allocated by the data allocator 14 and synthesizes one encoded AV data stream. Specifically, the synthesizer 16 first identifies the address corresponding to the number allocated to the data unit to be synthesized in the next time out of the addresses received from the data allocator 14. Then, when the same address as the identified address is notified from one of the encoders 151 and 152, the synthesizer 16 reads the encoded data unit from the address and adds the read data unit to the end of an array which includes other data units read in the previous time. The sequence of a series of encoded data units thus synthesized corresponds to the sequence in the time line direction indicated by the edit information. Moreover, the synthesizer 16 outputs the synthesized AV data stream to the output unit 17.

Note that when the hardware encoder 151 and the software encoder 152 encode the AV data in the unit of GOP using the closed GOP scheme as the encoding scheme, the synthesizer 16 may arrange the encoded AV data stream based on information such as GOP header included in the encoded AV data, in addition to the numbers received from the data allocator 14. Additionally, it is preferable that the data units encoded by the hardware encoder 151 and the software encoder 152 are not predictable from each other, in terms of the ease of the processing in the synthesizer 16.

The output unit 17 formats the synthesized AV data stream in a predetermined file or transmission format. The output unit 17 adds information or parameters necessary for decoding the encoded AV data and other defined information to the AV data stream and arranges all of the data in the defined format. The file format or the transmission format used in the output unit 17 is set by the editor 13. The output unit 17 writes the synthesized AV data stream to any recoding medium such as the HDD 30A, the HDD 30B, or the DVD 102 mounted on the drive 40A or the drive 40B via the internal bus 90. The output unit 17 may transmit the synthesized AV data stream to a database or an information terminal connected thereto via the network interface. The output unit 17 may output the synthesized AV data stream to an external apparatus via the AV unit 70 or the input/output interface 50.

The switching position detector 18 detects the switching positions of the allocation destinations in the AV data to be edited by the editor 13 from the edit information on the AV data. Specifically, the switching position detector 18 first receives the edit information from the editor 13. Then, the switching position detector 18 analyzes the edit information in the sequence of the time line direction, detects the switching positions in the sequence of the time line direction, and stores the time codes indicating the switching positions.

Here, the switching position of an allocation destination means the position in the AV data at which the allocation destination of the AV data is switched from one of the encoders 151 and 152 to the other when the data allocator 14 allocates the AV data edited by the editor 13 to both encoders 151 and 152. The switching position detector 18 detects at least one of (A) "a position at which one scene is switched to another scene" and (B) "a position at which the type of the edit process is changed according to a predetermined pattern" in the AV data as a switching position based on the edit information.

(A) The "position at which one scene is switched to another scene" includes a position at which the clips arranged in parallel on the time line are ended simultaneously and switched to other clips. Such a position includes, for example, the position SWP shown in the time line window TW of FIG. 4. At the position SWP, the third clip CL3 and the fourth clip CL4 arranged in parallel on the time line are both ended and the fifth clip CL5 is started simultaneously. The boundary between the clips such as the position SWP can be detected as the switching position. Note that in a section where a plurality of clips are arranged linearly on the time line, the boundary between two successive clips can be detected as the switching position.

(B) The "position at which the type of the edit process is changed according to a predetermined pattern" includes a boundary between the clips where the type of edit process such as the type of the decoding process or the effect process on the material data is switched according to a predetermined pattern. Here, the predetermined pattern is determined as follows. There is typically a difference between the encoding process of the hardware encoder 151 and the encoding process of the software encoder 152. Therefore, when two pieces of AV data corresponding to two successive clips are encoded by different encoders, visible compression distortion, that is, the image quality, can be slightly changed at a position corresponding to the boundary of the clips in an image reconstructed by decoding the encoded AV data. If the change in image quality will be hardly perceived by the viewer due to the change in the type of edit process, the change pattern of the type of edit process is determined as the predetermined pattern.

The variation in image is great before and after the boundary of the clips corresponding to one of the position (A) and the position (B). Accordingly, even when the image quality slightly varies due to the switching of the encoding process of the hardware encoder 151 and the encoding process of the software encoder 152 at the position, the change in image quality will be hardly perceived by the viewer. Therefore, when one of the boundaries is the switching position, even if the image quality is slightly changed before and after the switching position in the image reconstructed by decoding the encoded AV data, the change in image quality will be hardly perceived by the viewer.

Whenever one data unit, for example, one frame, to be encoded is written into the memory unit 20 from the editor 13, the data allocator 14 reads the time code from the data unit and sends the read time code to the switching position detector 18. The switching position detector 18 compares the time code with the time codes of the switching positions. When the time code from the data allocator 14 is equal to the time code of one of the switching positions, the switching position detector 18 outputs a detection signal to the data allocator 14. In response to the detection signal, the data allocator 14 switches the destination to which the AV data of the data unit and subsequent data units are allocated to an encoder that is different from the encoder to which the immediately preceding data unit has been allocated.

Figure 5:
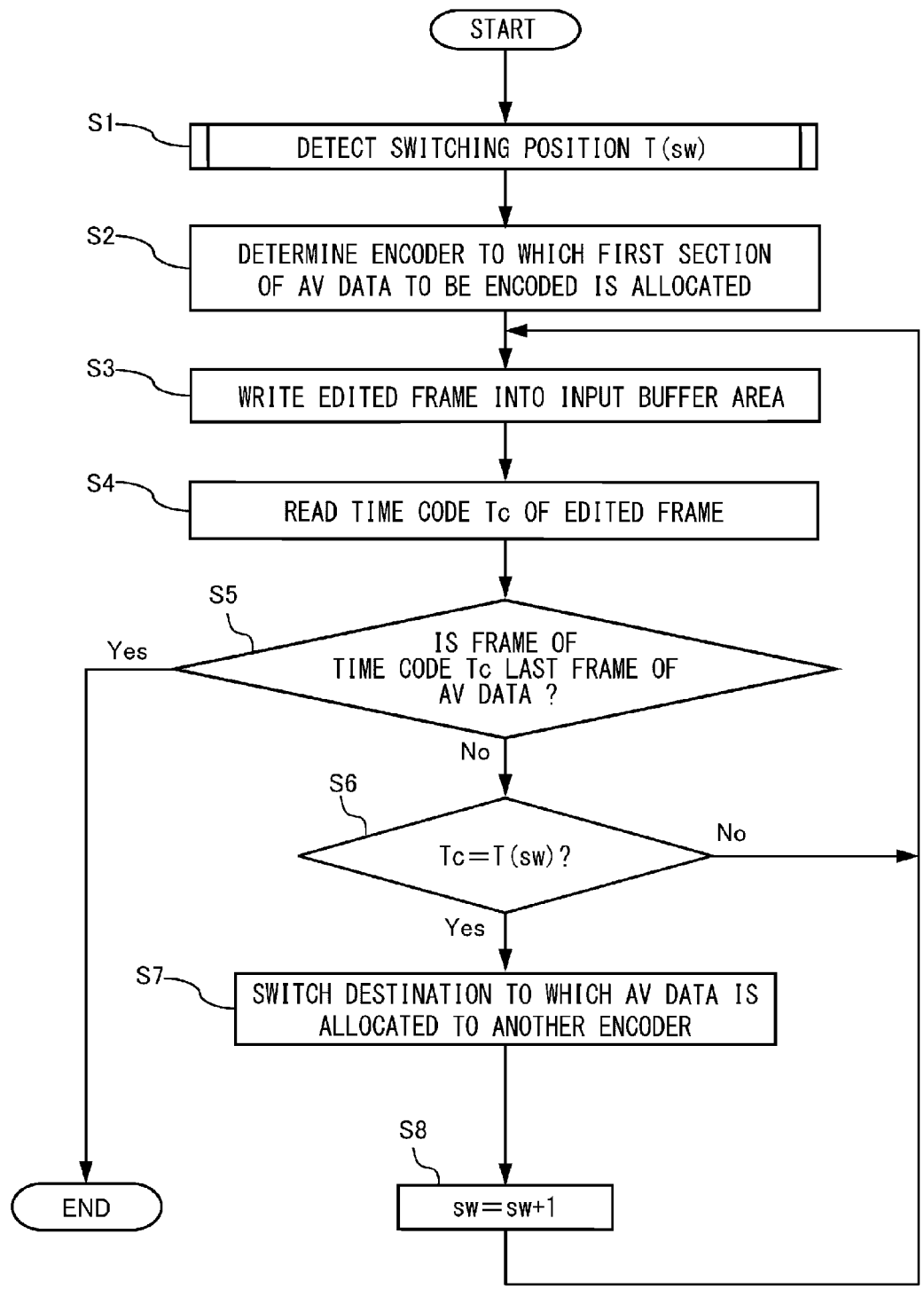
FIG. 5 is a flowchart of an AV data allocation process according to the first embodiment.

FIG. 5 is a flowchart showing the AV data allocating process according to the first embodiment. The allocating process will be described now referring to FIG. 5. Note that in the following description, it is assumed that the data unit to be encoded is one frame for the purpose of convenience.

The allocating process is performed using the edit information on the AV data to be encoded and is started, for example, when the edit information is prepared by the editor 13.

First, in step S1, the switching position detector 18 detects switching positions of the allocation destinations from the edit information on the AV data to be encoded and stores the time codes T(sw) of the detected switching positions. Here, serial numbers sw=1, 2, 3, ... are allocated to the switching positions and the time codes T(sw) in the time line direction. Note that details of the switching position detecting process will be described later.

Next, in step S2, the switching position detector 18 initializes the number sw of switching position to be detected to 1. On the other hand, the data allocator 14 determines one of the hardware encoder 151 and the software encoder 152 as the destination to which the section from the first frame of the AV data to be encoded to the first switching position T(1) is allocated.

Next, in step S3, the editor 13 writes the frames of the edited AV data into the input buffer area BI of the memory unit 20 sequentially from the first frame.

Next, in step S4, whenever the editor 13 writes one frame to be encoded into the input buffer area BI, the data allocator 14 reads the time code Tc from the frame and sends the read time code to the switching position detector 18.

Next, in step S5, the data allocator 14 determines whether or not the frame of the time code Tc is the last frame of the AV data to be encoded. When the frame is not the last frame ("NO" in step S5), the process proceeds to step S6. On the other hand, when the frame is the last frame ("YES" in step S5), the data allocator 14 allocates the frame to the encoder determined as the allocation destination at that time and then the process ends.

Next, in step S6, the switching position detector 18 compares the time code Tc received from the data allocator 14 with the time code T(sw) of the sw-th switching position. When the time code Tc from the data allocator 14 is equal to the time code T(sw) of the sw-th switching position ("YES" in step S6), the process proceeds to step S7. When the time code Tc is not equal to the time code T(sw) of the sw-th switching position ("NO" in step S6), the process returns to step S3. In this case, the data allocator 14 allocates the frame of the time code Tc to the encoder determined as the allocation destination at that time.

Next, in step S7, the switching position detector 18 outputs a detection signal. In response to the detection signal, the data allocator 14 switches the allocation destination to another encoder. Accordingly, the data allocator 14 allocates the frame having the time code Tc and frames subsequent thereto to an encoder which is different from that for the frame immediately before the time code Tc.

Next, in step S8, the switching position detector 18 increases the switching position number sw by "1" and sets the next switching position T(sw) as the detection target. Then, the processes are repeated from step S3.

Figure 6:
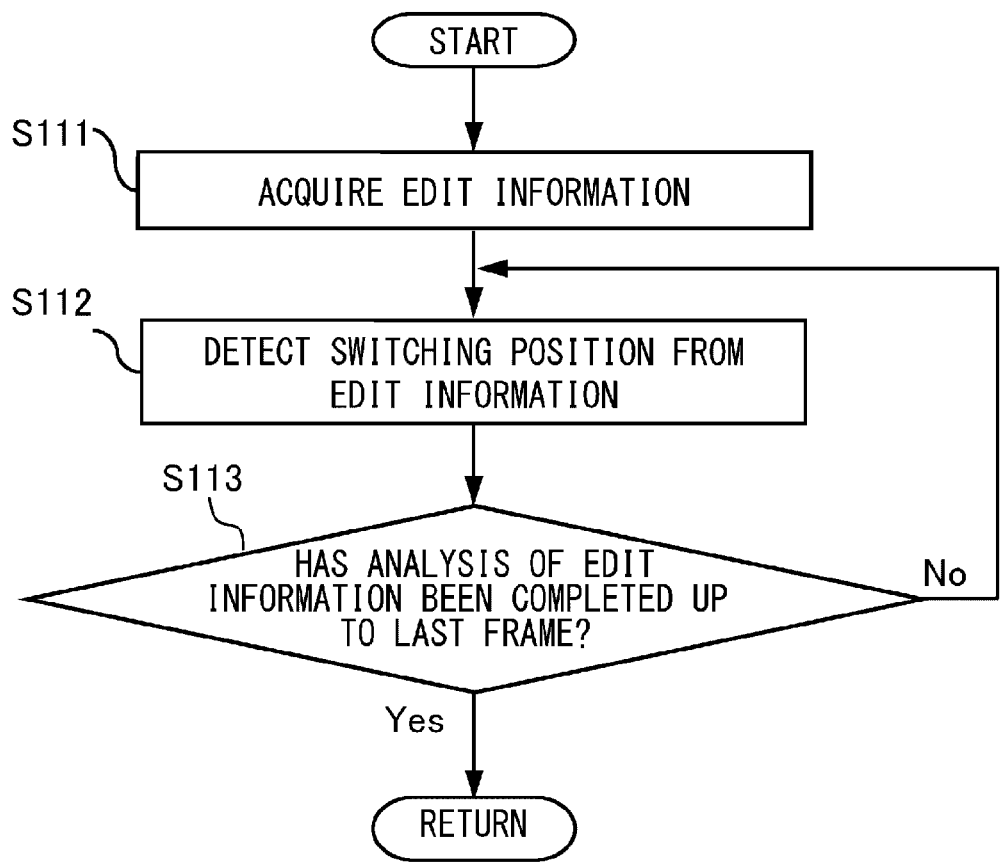
FIG. 6 is a flowchart of a switching position detecting process according to the first embodiment.

FIG. 6 is a flowchart showing the switching position detecting process according to the first embodiment. The switching position detecting process will be described now in detail referring to FIG. 6.

First, in step S111, the switching position detector 18 acquires the edit information from the editor 13. Moreover, the switching position detector 18 analyzes the edit information in the time line direction from that on the first clip.

Next, in step S112, the switching position detector 18 first analyzes at least one of a boundary position between the clips and a change pattern of the type of edit process between the clips. When the clips arranged in parallel on the time line are ended simultaneously and switched to other clips and/or when the change pattern of the type of edit process is a predetermined pattern, the switching position detector 18 detects the corresponding boundary between the clips as the switching position of the allocation destination.

Next, in step S113, the switching position detector 18 determines whether or not the edit information is analyzed up to the last frame of the AV data. When the edit information is not analyzed up to the last frame ("NO" in step S113), the process returns to step S112. When the edit information is analyzed up to the last frame ("YES" in step S113), the process proceeds to step S2 shown in FIG. 5.

The encoding apparatus 100 according to the first embodiment detects the switching position of the destination to which the AV data to be encoded is allocated from the edit information on the AV data by the use of the switching position detector 18. When the editor 13 writes the edited AV data into the input buffer area BI of the memory unit 20, the data allocator 14 switches the allocation destination of the AV data from one of the hardware encoder 151 and the software encoder 152 to the other at the respective switching positions. Accordingly, both encoders 151 and 152 encode the AV data in parallel. The switching position is at least one of a position at which one scene is switched to another scene and a position at which the type of edit process is changed according to a predetermined pattern. At these positions, the variation in image is great. Accordingly, even when the encoding process of the hardware encoder 151 and the encoding process of the software encoder 152 are switched, a viewer will hardly perceive the variation in image quality, if any, which is caused by the difference between the encoding process of the hardware encoder 151 and the encoding process of the software encoder 152, from a video reconstructed by decoding the encoded AV data. Therefore, the encoding apparatus 100 can improve the image quality of the AV data encoded in parallel by both encoders 151 and 152. Note that since the encoding apparatus 100 encodes the portion of the AV data representing a series of scenes or the portion of the AV data subjected to the same edit process from one switching position to the next switching position by the use of the same encoder, uniform image quality can be achieved.

Note that the editor 13 may allow a user to designate a partial range of the AV data to be edited and allow the user to set an allowance for a frequency of allocating the AV data to both encoders 151 and 152 in the designated range. Here, the allowance for a frequency represents an upper limit of the number of switching positions which may be detected from the designated range of the AV data or a lower limit of the ratio of the interval between switching positions to the length of the range in the time line direction. In the range where the allowance for a frequency is high, the upper limit of the number of switching positions is set to be great, or the lower limit of the ratio of the interval between switching positions to the length of the range in the time line direction is set to be small. Therefore, since the frequency at which the data allocator 14 switches the destination to which the AV data is allocated can increase, the entire encoding process can increase in speed by the parallel process of both encoders 151 and 152. In contrast, in the range where the allowance for a frequency is low, the upper limit of the number of switching positions is set to be small, or the lower limit of the ratio of the interval between switching positions to the length of the range in the time line direction is set to be great. Therefore, since the frequency at which the data allocator 14 switches the destination to which the AV data is allocated decreases, it is possible to improve the uniformity of the image quality.

Specifically, for example, the editor 13 allows the user to designate a portion or all of the clips CL1 to CL8 displayed in the time line window TW of FIG. 4 with the time line cursor TLC or the like and displays the video in the designated range on the preview window PW. The user inputs the allowance for a frequency of allocating the range to both encoders 151 and 152 into the editor 13 while predicting the influence of the allocation of the AV data to both encoders 151 and 152 on the image quality of the video based on the video displayed on the preview window PW. The user sets the allowance for a frequency to be low for the range of AV data in which the variation in image quality caused by the difference in encoding process between both encoders 151 and 152 is easily visible and to the contrary, sets the allowance for a frequency to be high for the range in which the variation in image quality is hardly visible. For example, in FIG. 4, the allowance for a frequency of allocating the range from the first clip CL1 to the third clip CL3 to both encoders 151 and 152 may be set lower than that of allocating the range starting from the fifth clip CL5.

The editor 13 notifies the switching position detector 18 of the allowance for a frequency of allocation to both encoders 151 and 152, which has been set by the user for each portion of the AV data to be edited, as a portion of the edit information. When receiving the edit information from the editor 13, the switching position detector 18 first reads the allowance for a frequency of allocating the AV data to both encoders 151 and 152 from the edit information and determines a detection criterion of the switching position for ranges of the AV data which have a common allowance for a frequency. The detection criterion represents, for example, the upper limit of the number of switching positions which may be detected from the range or the lower limit of the ratio of the interval between switching positions to the length of the range in the time line direction. The switching position detector 18 then detects the switching position from the edit information based on the detection criterion. As a result, the upper limit of the number of switching positions or the lower limit of the interval between switching positions is adjusted for the ranges of the AV data which have a common allowance for a frequency for allocating the AV data to both encoders 151 and 152.

Moreover, the switching position detector 18 may analyze the interval between detected switching positions, loosen the detection criterion of the switching position in the section of the AV data in which some intervals exceed a predetermined threshold, and repeatedly detect the switching positions from the edit information. For example, when the amount of data of a section defined by two neighboring switching positions is equal to the capacity of the frame buffer of the hardware encoder 151, the interval between the switching positions is determined as the threshold. In this case, the switching position detector 18 repeats the change of the detection criterion and the detection of the switching position based on the detection criterion until all the detected intervals between switching positions are less than or equal to the threshold. Accordingly, since the amount of data of each section of the AV data defined by the switching positions is less than or equal to the capacity of the frame buffer of the hardware encoder 151, it is possible to perform the entire encoding process at a high speed by the parallel process of both encoders 151 and 152.

The encoding apparatuses 100 according to second to eleventh embodiments of the present invention to be described below are built in the non-linear video editing system 200, similar to that of the first embodiment. Additionally, the video editing system 200 is similar to that according to the first embodiment except for the encoding unit. Therefore, the same elements are referenced by the same reference symbols and the description of the first embodiment is cited for details thereof.

Second Embodiment

Figure 7:
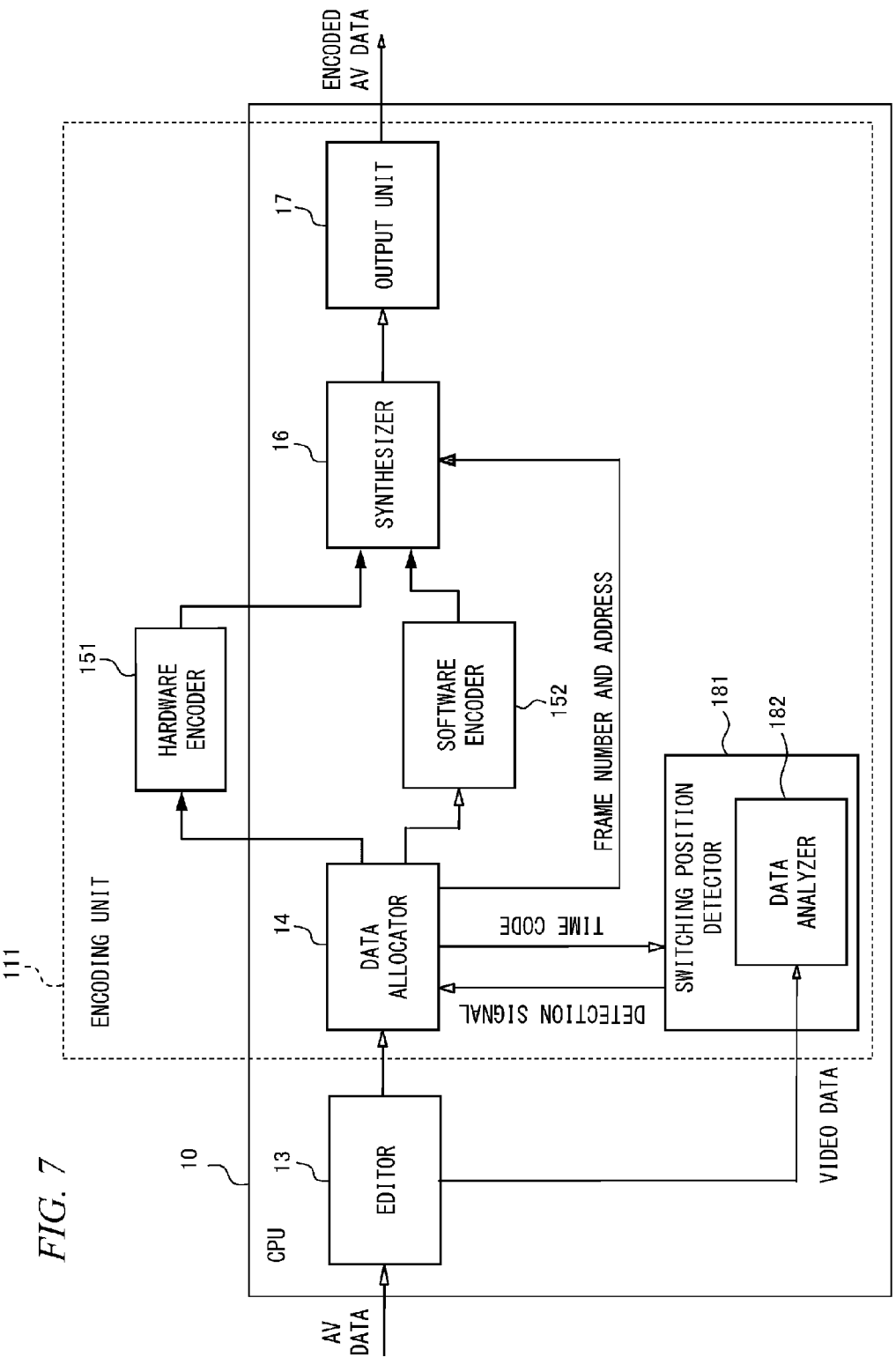
FIG. 7 is a block diagram showing an editor and an encoding unit according to a second embodiment of the present invention.

FIG. 7 is a block diagram showing an editor 13 and an encoding unit 111 according to a second embodiment of the present invention. Referring to FIG. 7, the encoding unit 111 includes a data allocator 14, a hardware encoder 151, a software encoder 152, a synthesizer 16, an output unit 17, and a switching position detector 181. The encoding unit 111 includes the same elements as shown in FIG. 3 except for the switching position detector 181. In FIG. 7, the same elements are referenced by the same reference symbols as shown in FIG. 3. Moreover, the description of the elements shown in FIG. 3 is cited for the details of the same elements. Furthermore, the operation of the switching position detector 181 includes the same portions as the operation of the switching position detector 18 shown in FIG. 3. Therefore, only the portions of the switching position detector 181 different from the switching position detector 18 shown in FIG. 3 will be described, and the description of the switching position detector 18 shown in FIG. 3 is cited for the details of the same portions.

The switching position detector 181 includes a data analyzer 182, detects switching positions of allocation destinations from the AV data edited by the editor 13 by the use of the data analyzer 182, and stores time codes indicating the switching positions. Specifically, the switching position detector 181 first receives edited video data from the editor 13, analyzes the video data by the use of the data analyzer 182, and detects the switching position from the video data. After the switching position detector 181 has completed the detection of the switching positions from all of the AV data edited by the editor 13, the editor 13 writes the edited AV data into the input buffer area BI of the memory unit 20 sequentially from the beginning thereof. Thereafter, similarly to the switching position detector 18 according to the first embodiment, the switching position detector 181 compares a time code received from the data allocator 14 with the time codes of the switching positions and outputs a detection signal to the data allocator 14 when the time code from the data allocator 14 is equal to the time code of any one of the switching positions.

The data analyzer 182 detects, as the switching position of the allocation destination, at least one of (C) "a position at which the amount of variation in scene between data units before and after this position is greater than a predetermined threshold" and (D) "a position at which the amounts of information of both data units before and after this position are smaller than a predetermined threshold" from the video data.

Here, the amount of variation in scene is, for example, at least one of the amount of variation in video data of the entire screen, the amount of variation in color components, the amount of variation in motion of the entire screen, and the amount of variation in motion of a specific object in the screen. On the other hand, the amounts of information is, for example, the sum or average of high-frequency transform coefficients which are acquired from the data units by the DCT, or the bit rate after the encoding which is estimated by the software encoder 152.

The data analyzer 182 first calculates the difference between two successive data units, for example, between two successive frames, when detecting (C) "the position at which the amount of variation in scenes between the data units before and after this position is greater than a predetermined threshold" from the video data. The difference may be calculated for the overall frames or for specific blocks. The data analyzer 181 then evaluates the amount of variation in scene from the calculated difference.

Moreover, the data analyzer 182 compares the evaluated amount of variation in scene with a predetermined threshold and detects the boundary between the data units from which the amount of variation is calculated as the switching position when the amount of variation exceeds the threshold. Here, the threshold is determined as follows. When two successive data units are encoded by different encoders and a viewer will hardly perceive the variation in image quality in the video reconstructed by decoding the encoded data units due to the variation in scenes between the data units, the amount of variation in that scene is determined as the threshold.

Therefore, when the position of (C) is the switching position, even if the image quality of the video reconstructed by decoding the encoded AV data slightly varies due to the difference between the encoding processes of both encoders 151 and 152, the viewer will hardly perceive the variation in image quality from the video.

When detecting (D) the "position at which the sum or average of high-frequency transform coefficients which are acquired by the DCT is smaller than a predetermined threshold in both data units before and after this position" from the video data, the data analyzer 182 first extracts several blocks from the respective data units, for example, the respective frames, and performs the DCT on one or both of the brightness component and the chrominance component of the blocks. Here, most of the high-frequency transform coefficients of the transform coefficients acquired from one frame by the DCT are often 0. In an existing scheme of compressing video data, this tendency is considered and a greater number of bits for quantization are allocated to the low-frequency transform coefficients than the high-frequency transform coefficients, whereby the amount of data after the encoding is reduced. In this way, in the existing scheme of compressing the video data, the high-frequency transform coefficients are coarsely quantized or discarded. Therefore, it is generally considered that compression distortions are easily visible in a frame including many high-frequency components. Accordingly, the data analyzer 182 can determine whether or not the compression distortion is easily visible in the frame by estimating the distribution of the high-frequency transform coefficients of the blocks extracted from one frame. Moreover, the data analyzer 182 detects the present frame as the switching position when determining that compression distortion will be hardly visible in both the immediately preceding frame and the present frame.

The data analyzer 182 estimates the distribution of the high-frequency transform coefficients of the respective blocks as follows. The data analyzer 182 first selects at least one high-frequency transform coefficient to be estimated from the transform coefficients of the blocks and compares the sum or average thereof with a predetermined threshold. Here, the sum or average of high-frequency transform coefficients acquired by the DCT from a general video in which the actual compression distortion is hardly visible is used as the threshold. When the sum or average of high-frequency transform coefficients to be estimated is smaller than the threshold, the data analyzer 182 determines that the high-frequency components are small in the block, that is, the compression distortion will be hardly visible. The data analyzer 182 estimates the overall blocks extracted from one frame in the same way. When it is determined that the compression distortion will be hardly visible in all the blocks or a predetermined number of blocks or more, the data analyzer 182 determines that the compression distortion will be hardly visible in the frame.

When detecting (D) the "position at which the bit rate after the encoding estimated by the software encoder 152 is smaller than a predetermined threshold in both data units before and after this position" from the video data, the data analyzer 182 first extracts several blocks from each data unit, for example, each frame, to be encoded. The data analyzer 182 then makes the software encoder 152 perform an encoding process on the extracted blocks up to the step immediately before a lossless encoding step such as entropy encoding and estimate the bit rate of the encoded data. The data analyzer 182 then compares the estimated bit rate with a predetermined threshold. Here, a target bit rate of the encoding process of the software encoder 152 is used as the threshold. When the estimated bit rate of an extracted block exceeds the target bit rate, the data analyzer 182 determines that the compression distortion is easily visible in the frame from which the block is extracted. Moreover, the data analyzer 182 detects the present frame as the switching position when having determined that the compression distortion will be hardly visible in both the immediately preceding frame and the present frame.

In a certain scheme of compressing video data, the DCT may not be used as the orthogonal transform. For example, in the JPEG 2000, the wavelet transform is used as the orthogonal transform instead of the DCT. Moreover, visible compression distortion varies depending on the compression scheme and varies depending on the method of selecting compression parameters and/or the target bit rate even when the same compression scheme is used. Even when the encoders 151 and 152 employ various compression schemes, particularly, a compression scheme that does not use the DCT as the orthogonal transform, the data analyzer 182 can detect a position at which the compression distortion will be hardly visible from the AV data in conformity with the compression scheme actually used in the encoders 151 and 152 by making the software encoder 152 estimate the bit rate after the encoding as described above.

In any data unit before and after the position of (D), for example, in a middle portion of a scene having continuous black pictures, the compression distortion, if any, will be hardly visible. Therefore, when the position of (D) is the switching position, even if the image quality of the video reconstructed by decoding the encoded AV data slightly varies due to the difference between the encoding processes of both encoders 151 and 152, the viewer will hardly perceive the variation in image quality from the video. Moreover, when the position of (D) is the switching position, even if a plurality of switching positions are detected with relatively small intervals and the encoders to which the AV data is allocated in encoding the AV data are relatively frequently switched, the variation in image quality of the video due to the difference between the encoding processes of both encoders 151 and 152 will be hardly perceived by the viewer as a flickering of the screen.

Figure 8:
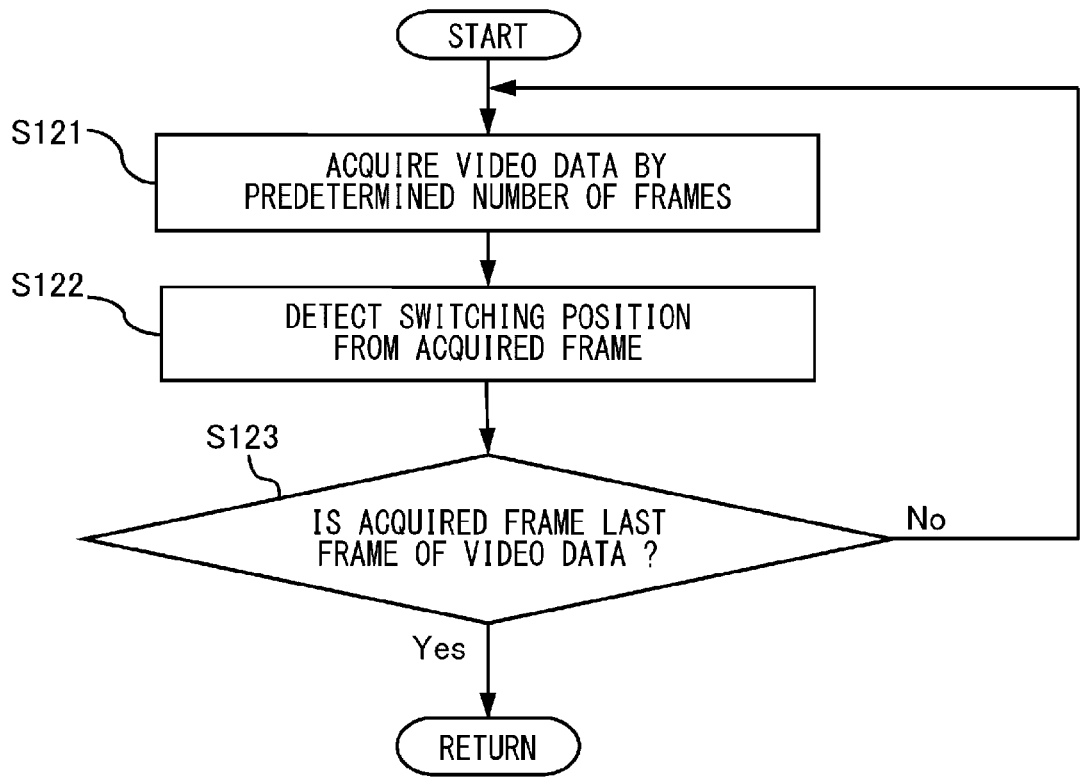
FIG. 8 is a flowchart showing a switching position detecting process according to the second embodiment.

FIG. 8 is a flowchart showing the switching position detecting process according to the second embodiment. The switching position detecting process will be described now in detail referring to FIG. 8. Note that in the following description, it is assumed that the data unit to be encoded is one frame for the purpose of convenience. The steps of the AV data allocating process subsequent to the switching position detecting process shown in FIG. 8 are similar to the steps according to the first embodiment shown in FIG. 5. The description regarding FIG. 5 is cited for the details of the same steps.

First, in step S121, the switching position detector 181 acquires edited video data from the editor 13 by a predetermined number of frames.

Next, in step S122, the data analyzer 182 analyzes the frames of the video data acquired from the editor 13 and detects at least one of a position at which the amount of variation in scene between two successive frames is greater than a predetermined threshold and a position at which the amounts of information of both two successive frames are smaller than a predetermined threshold as a switching position.

Next, in step S123, the switching position detector 181 determines whether or not the frame acquired from the editor 13 is the last frame of the video data to be encoded. When the frame is not the last frame ("NO" in step S123), the process returns to step S121. When the frame is the last frame ("YES" in step S123), the process proceeds to step S2 shown in FIG. 5.

The encoding apparatus according to the second embodiment detects the switching position of the destination to which the AV data to be encoded is allocated from the AV data by the use of the switching position detector 181. When the editor 13 writes the edited AV data into the input buffer area BI of the memory unit 20, the data allocator 14 switches the allocation destination of the AV data from one of the hardware encoder 151 and the software encoder 152 to the other at each switching position. Accordingly, both encoders 151 and 152 encode the AV data in parallel. The switching position is at least one of a position at which the amount of variation in scenes between the data units before and after this position is greater than a predetermined threshold and a position at which the amounts of information of both data units before and after this position are less than a predetermined threshold. At the position at which the amount of variation in scenes between the data units before and after this position is greater than a predetermined threshold, the variation in image is great. Accordingly, even when the encoding process of the hardware encoder 151 and the encoding process of the software encoder 152 are switched, a viewer will hardly perceive a variation in image quality, if any, which is caused by the difference between the encoding process of the hardware encoder 151 and the encoding process of the software encoder 152, from the video reconstructed by decoding the encoded AV data. Additionally, at the position at which the amounts of information of both data units before and after this position are less than the predetermined threshold, the amounts of information of the data units of the AV data are small. Accordingly, even when the encoding process of the hardware encoder 151 and the encoding process of the software encoder 152 are switched at this position, there is only minimal variation in image quality caused by the difference between the encoding process of the hardware encoder 151 and the encoding process of the software encoder 152. Thus, the viewer will hardly perceive the variation from a video reconstructed by decoding this encoded AV data. Therefore, the encoding apparatus according to the second embodiment can improve the image quality of the AV data encoded in parallel by both encoders 151 and 152. Note that since the encoding apparatus encodes the portion of the AV data representing a series of scenes or the portion of the AV data of which the compression distortion is easily visible by the use of the same encoder from one switching position to the next switching position, uniform image quality can be achieved.

Note that the switching position detector 181 may determine whether or not some intervals between the switching positions detected by the data analyzer 182 exceed a predetermined threshold. Here, for example, when the amount of data of the section defined by two neighboring switching positions is equal to the capacity of the frame buffer of the hardware encoder 151, the interval between these switching positions is used as the threshold. Moreover, the switching position detector 181 may make the data analyzer 182 repeatedly detect the switching positions from the section of the AV data in which the interval between the switching positions exceeds a predetermined threshold while changing the threshold of the amount of variation in the scene or the threshold of the amounts of information. In this case, the switching position detector 181 repeats the change of the threshold and the detection of the switching position based on the threshold until all the intervals between the detected switching positions are less than or equal to the threshold. Accordingly, since the amount of data of each section of the AV data defined by the switching positions is less than or equal to the capacity of the frame buffer of the hardware encoder 151, it is possible to perform the entire encoding process at a high speed by the parallel process of both encoders 151 and 152.

Third Embodiment

Figure 9:
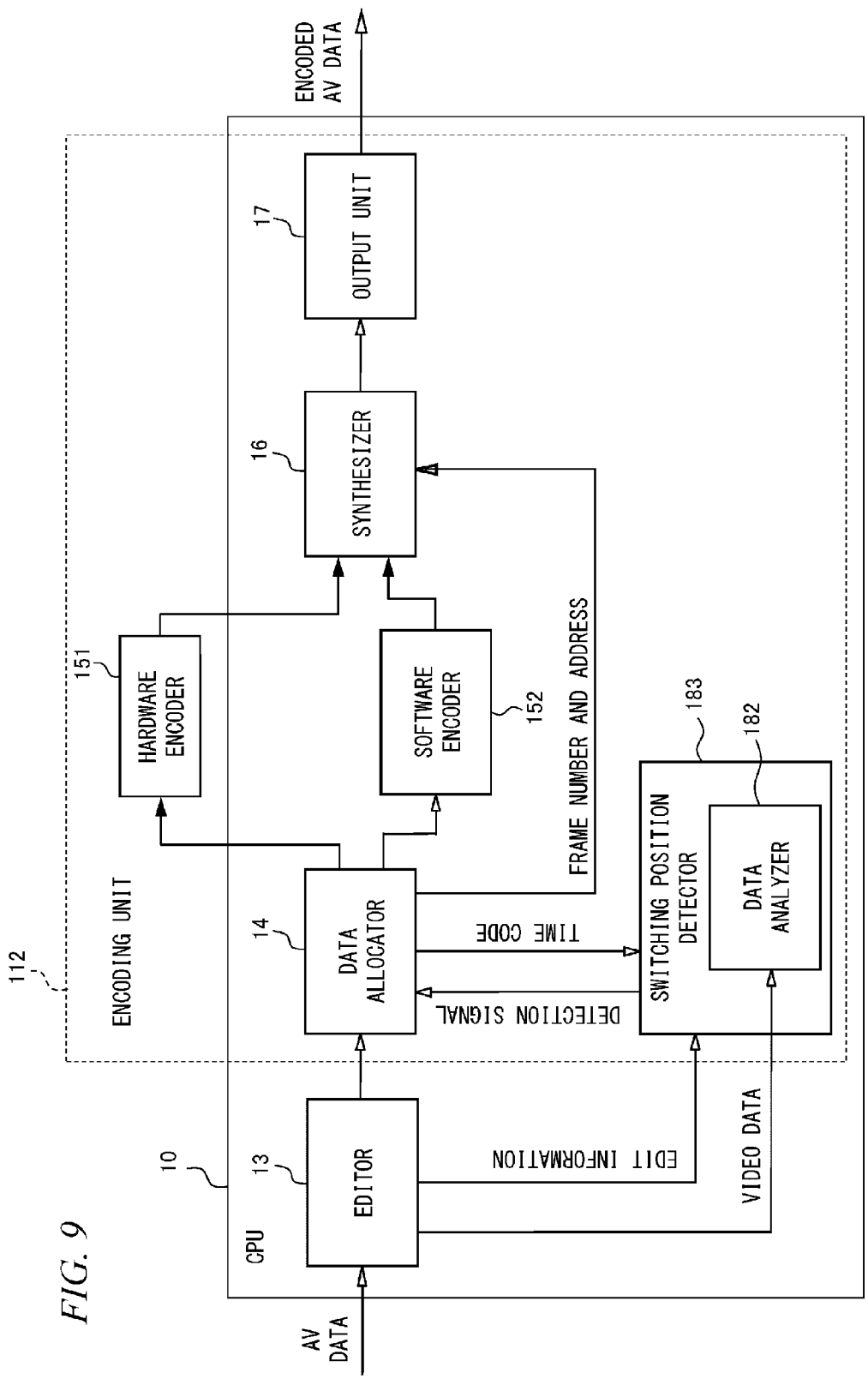
FIG. 9 is a block diagram showing an editor and an encoding unit according to a third embodiment of the present invention.

FIG. 9 is a block diagram showing an editor 13 and an encoding unit 112 according to a third embodiment of the present invention. Referring to FIG. 9, the encoding unit 112 includes a data allocator 14, a hardware encoder 151, a software encoder 152, a synthesizer 16, an output unit 17, and a switching position detector 183. The encoding unit 112 includes the same elements as shown in FIGS. 3 and 7 except for the switching position detector 183. In FIG. 9, the same elements are referenced by the same reference symbols as shown in FIGS. 3 and 7. Additionally, the description of the elements shown in FIGS. 3 and 7 is cited for details of the same elements. Moreover, the operation of the switching position detector 183 includes the same portions as the operations of the switching position detectors 18 and 181 shown in FIGS. 3 and 7. Therefore, only the portions of the switching position detector 183 different from the switching position detectors 18 and 181 shown in FIGS. 3 and 7 will be described, and the description of the switching position detectors 18 and 181 shown in FIGS. 3 and 7 is cited for the details of the same portions.

The switching position detector 183 first receives the edit information from the editor 13, detects switching positions of allocation destinations from the edit information, and stores time codes indicating the switching positions. Here, similarly to the switching position in the first embodiment, the switching position is at least one of (A) "a position at which one scene is switched to another scene" and (B) "a position at which the type of edit process is changed according to a predetermined pattern".

Moreover, the switching position detector 183 analyzes the interval between the detected switching positions. When some intervals exceed a predetermined threshold, for example, when the amount of data of a section defined by two neighboring switching positions with the interval is greater than the capacity of the frame buffer of the hardware encoder 151, the switching position detector 183 analyzes video data of the section by the use of the data analyzer 182 and additionally detects a new switching position from the section. Here, similarly to the switching position in the second embodiment, the switching position is at least one of (C) "a position at which the amount of variation in scene between data units before and after this position is greater than a predetermined threshold" and (D) "a position at which the amounts of information of both data units before and after this position are smaller than a predetermined threshold".

The switching position detector 183 repeatedly detects the switching position in the section with the interval exceeding the threshold by the use of the data analyzer 182 until all the intervals between the detected switching positions are less than or equal to the threshold.

Figure 10:
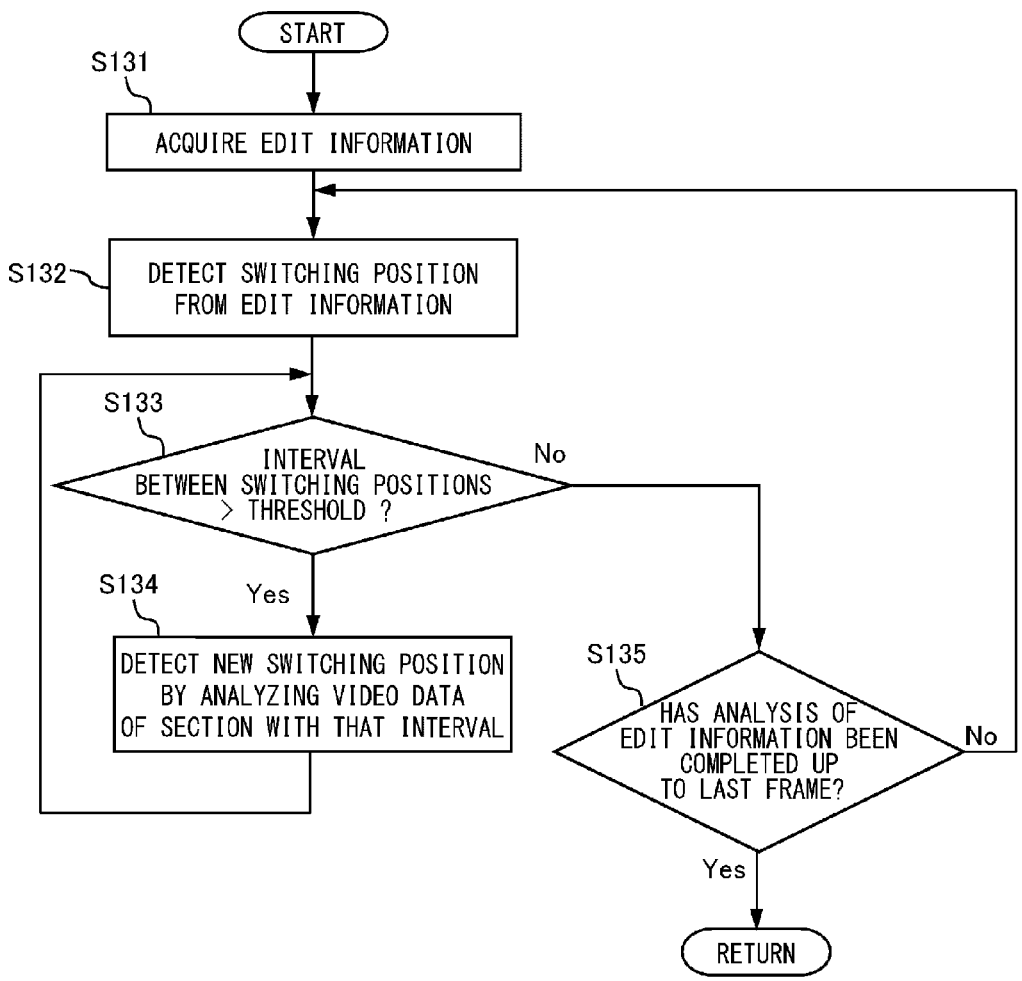
FIG. 10 is a flowchart showing a switching position detecting process according to the third embodiment.

FIG. 10 is a flowchart showing the switching position detecting process according to the third embodiment. The switching position detecting process will be described now in detail referring to FIG. 10. Note that in the following description, it is assumed that the data unit to be encoded is one frame for the purpose of convenience. Additionally, the steps of the AV data allocating process subsequent to the switching position detecting process shown in FIG. 10 are similar to the steps according to the first embodiment shown in FIG. 5. The description regarding FIG. 5 is cited for the details of the same steps.

First, in step S131, the switching position detector 183 acquires the edit information from the editor 13. Moreover, the switching position detector 183 analyzes the edit information in the time line direction from that on the first clip.

Next, in step S132, the switching position detector 183 first analyzes at least one of the position of a boundary between the clips and a change pattern of the type of edit process between the clips. When the clips arranged in parallel on the time line are ended simultaneously and switched to other clips and/or when the change pattern of the type of the edit process is a predetermined pattern, the switching position detector 183 detects the corresponding boundary between the clips as the switching position of the allocation destination.

Next, in step S133, the switching position detector 183 compares the interval between a new switching position and the immediately preceding switching position thereof with a predetermined threshold whenever detecting the new switching position. When the interval exceeds the threshold ("YES" in step S133), the process proceeds to step S134. When the interval is less than or equal to the threshold ("NO" in step S133), the process proceeds to step S135.

Next, in step S134, the data analyzer 182 acquires video data of the section defined by the new switching position and the immediately preceding switching position thereof from the editor 13 and analyzes the acquired video data. When the data analyzer 182 detects at least one of a position at which the amount of variation in scene between two successive frames is greater than a predetermined threshold and a position at which the amounts of information of both successive two frames are smaller than a predetermined threshold from the video data of the section, the data analyzer 182 detects the boundary between the frames as a new switching position. When the new switching position is detected, the process returns to step S133.

On the other hand, in step S135, the switching position detector 183 determines whether or not the edit information is analyzed up to the last frame of the AV data. When the edit information is not analyzed up to the last frame ("NO" in step S135), the process returns to step S132. When the edit information is analyzed up to the last frame ("YES" in step S135), the process proceeds to step S2 shown in FIG. 5.

The encoding apparatus according to the third embodiment detects the switching positions of allocation destinations from the edit information, similarly to the encoding apparatus according to the first embodiment. Moreover, when some intervals between the detected switching positions exceed the predetermined threshold, the encoding apparatus detects a new switching position from the AV data of the section defined by the switching positions with the interval, similarly to the encoding apparatus according to the second embodiment. When the editor 13 writes the edited AV data into the input buffer area BI of the memory unit 20, the data allocator 14 switches the allocation destination of the AV data from one of the hardware encoder 151 and the software encoder 152 to the other at each switching position. Accordingly, both encoders 151 and 152 encode the AV data in parallel. In this encoding apparatus, a viewer will hardly perceive the variation in image quality, if any, which is caused by the difference between the encoding processes of the hardware encoder 151 and the software encoder 152, from the video reconstructed by decoding the encoded AV data, similarly to the encoding apparatuses according to the first and second embodiments. Therefore, the encoding apparatus according to the third embodiment can improve the image quality of the AV data encoded in parallel by both encoders 151 and 152. Note that since this encoding apparatus encodes a portion of the AV data representing a series of scenes, a portion of the AV data subjected to the same edit process, or a portion of the AV data of which the compression distortion is easily visible by the use of the same encoder from one switching position to the next switching position, uniform image quality can be achieved.

Moreover, when some intervals between the switching positions detected from the edit information exceed the predetermined threshold, a new switching position is detected from the AV data of the section defined by the switching positions with the interval. Accordingly, since the amount of data of each section of the AV data defined by the switching positions is less than or equal to the capacity of the frame buffer of the hardware encoder 151, it is possible to perform the entire encoding process at a high speed by the parallel process of both encoders 151 and 152. Additionally, comparing the data analyzer 181 according to the third embodiment with the data analyzer 181 according to the second embodiment, the amount of video data to be detected generally decreases and thus the processing speed of the switching position detecting process increases.

Fourth Embodiment

Figure 11:
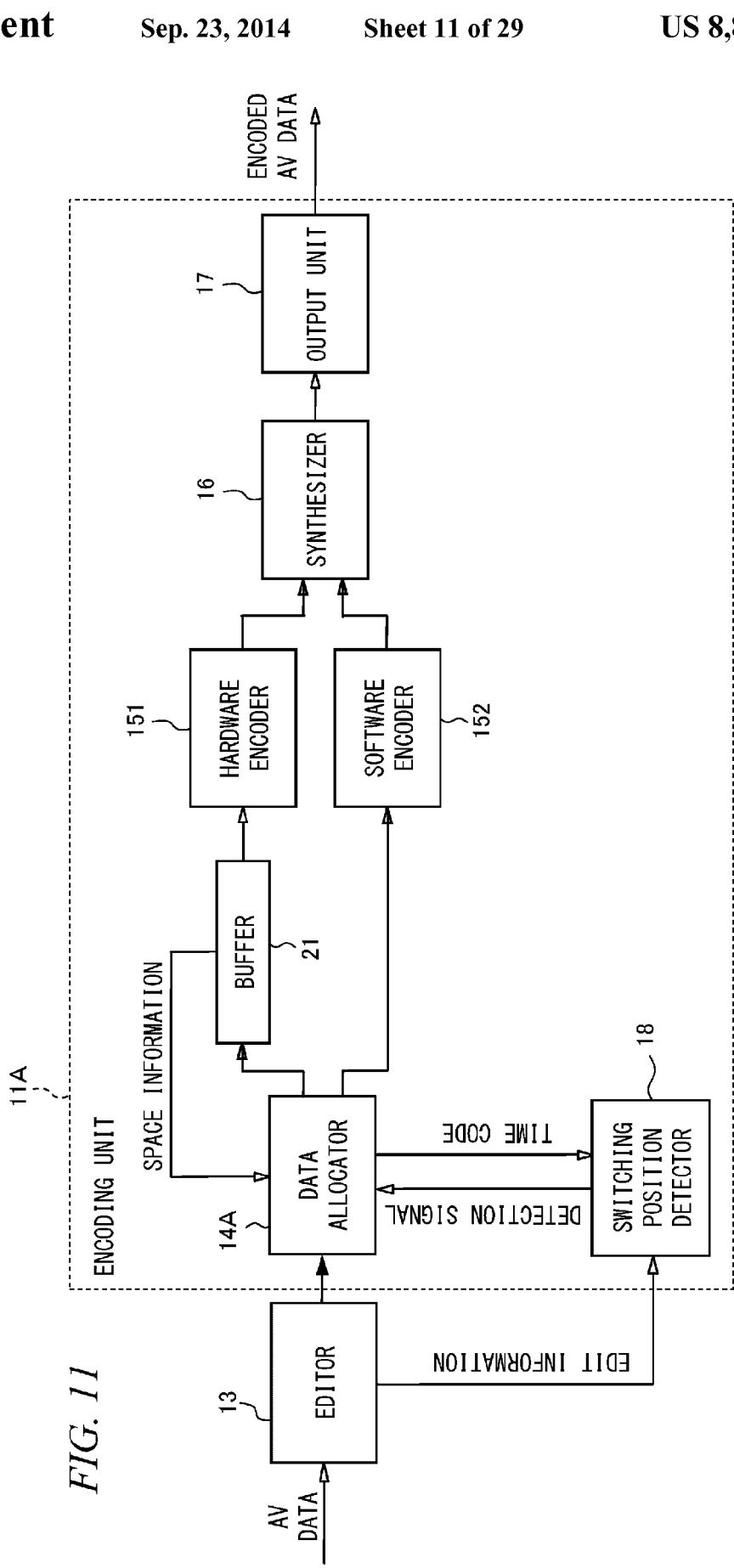
FIG. 11 is a block diagram showing an editor and an encoding unit according to a fourth embodiment of the present invention.

FIG. 11 is a block diagram showing an editor 13 and an encoding unit 11A according to a fourth embodiment of the present invention. Referring to FIG. 11, the encoding unit 11A includes a data allocator 14A, a hardware encoder 151, a software encoder 152, a synthesizer 16, an output unit 17, a switching position detector 18, and a buffer 21. The encoding unit 11A includes the same elements as shown in FIG. 3, except for the data allocator 14A and the buffer 21. In FIG. 11, the same elements are referenced by the same reference symbols as shown in FIG. 3. Additionally, the description of the elements shown in FIG. 3 is cited for details of the same elements. Moreover, the operation of the data allocator 14A includes the same portions as the operation of the data allocator 14 shown in FIG. 3. Therefore, only the portions of the data allocator 14A different from the data allocator 14 shown in FIG. 3 will be described, and the description of the data allocator 14 shown in FIG. 3 is cited for the details of the same portions.

In FIG. 11, the buffer 21 is disposed between the data allocator 14A and the hardware encoder 151. The buffer 21 is the storage area of the frame buffer of the hardware encoder 80, for example, the frame buffer 83 shown in FIG. 2. In this case, the capacity of the buffer 21 is, for example, several frames. Alternatively, the buffer 21 may be a storage area of the memory unit 20. In this case, the capacity of the buffer 21 is, for example, several tens frames.

The data allocator 14A sequentially transfers AV data to be allocated to the hardware encoder 151 to the buffer 21. The hardware encoder 151 encodes the AV data sequentially from the first address of the buffer 21 by a predetermined data unit, for example, by one frame.

In response to the detection signal from the switching position detector 18, the data allocator 14A reads space information from the buffer 21 and checks the size of an empty area of the buffer 21, for example, the number of empty frame buffers, from the space information. When the size exceeds a predetermined threshold, for example, one frame, the data allocator 14A allocates the AV data written into the input buffer area BI to the hardware encoder 151 from the time when receiving the detection signal to the time when receiving a new detection signal. That is, the data allocator 14A writes the AV data into the buffer 21. On the other hand, when the size of the empty area of the buffer 21 is less than or equal to the predetermined threshold, for example, one frame, the data allocator 14A allocates the AV data written into the input buffer area BI to the software encoder 152 from the time when receiving the detection signal to the time when receiving a new detection signal. That is, the data allocator 14A does not write the AV data to the buffer 21, but sends an address in the input buffer area BI in which the AV data is stored to the software encoder 152. Thereafter, the data allocator 14A continues to allocate the AV data to be encoded to the software encoder 152 until the size of the empty area of the buffer 21 exceeds the threshold again.

Figure 12:
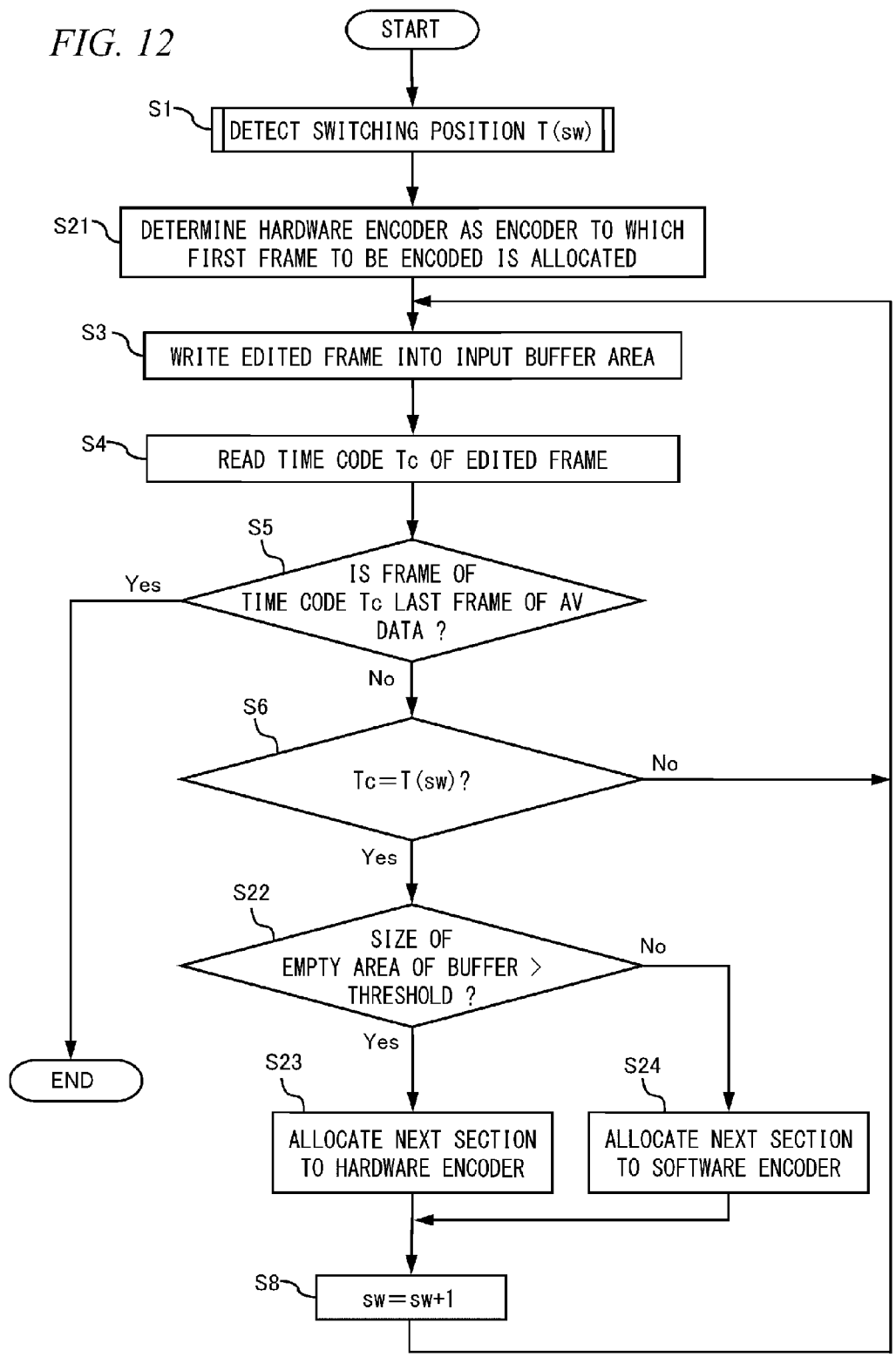
FIG. 12 is a flowchart showing an AV data allocating process by the encoding unit according to the fourth embodiment.

FIG. 12 is a flowchart showing an AV data allocating process in the encoding unit 11A shown in FIG. 11. The allocating process will be described now in detail referring to FIG. 12. Note that in the following description, it is assumed that the data unit to be encoded is one frame for the purpose of convenience. Additionally, FIG. 12 includes the same steps as the steps shown in FIG. 5. Therefore, in FIG. 12, the same steps are referenced by the same reference symbols as shown in FIG. 5. Moreover, the description regarding FIG. 5 is cited for the details of the same steps.

For example, when the edit information on the AV data to be encoded is prepared by the editor 13, the following processes are started.

First, in step S1, the switching position detector 18 detects switching positions of the allocation destinations from the edit information on the AV data to be encoded and stores the time codes T(sw) representing the detected switching positions.

Next, in step S21, the switching position detector 18 initializes the number sw of switching position to be detected to 1. On the other hand, the data allocator 14A determines the hardware encoder 151 as the destination to which the section from the first frame of the AV data to be encoded to the first switching position T(1) is allocated.

Next, in step S3, the editor 13 writes the frames of the edited AV data into the input buffer area BI of the memory unit 20 sequentially from the first frame.

Next, in step S4, whenever the editor 13 writes one frame to be encoded into the input buffer area BI, the data allocator 14A reads the time code Tc from the frame and sends the read time code to the switching position detector 18.

Next, in step S5, the data allocator 14A determines whether or not the frame of the time code Tc is the last frame of the AV data to be encoded. When the frame is not the last frame ("NO" in step S5), the process proceeds to step S6. On the other hand, when the frame is the last frame ("YES" in step S5), the data allocator 14A allocates the frame to the encoder determined as the allocation destination at that time and then the process ends.

Next, in step S6, the switching position detector 18 compares the time code Tc received from the data allocator 14A with the time code T(sw) of the sw-th switching position. When the time code Tc from the data allocator 14A is equal to the time code T(sw) of the sw-th switching position ("YES" in step S6), the process proceeds to step S22. When the time code Tc is not equal to the time code T(sw) of the sw-th switching position ("NO" in step S6), the process returns to step S3. In this case, the data allocator 14A allocates the frame of the time code Tc to the encoder determined as the allocation destination at that time.

Next, in step S22, the switching position detector 18 outputs a detection signal. In response to the detection signal, the data allocator 14A reads the space information from the buffer 21 and checks the size of the empty area of the buffer 21 from the space information. When the size exceeds the predetermined threshold ("YES" in step S22), the process proceeds to step S23. When the size is less than or equal to the predetermined threshold ("NO" in step S22), the process proceeds to step S24.

Next, in step S23, the data allocator 14A continues to set the hardware encoder 151 as the destination to which the AV data of the section from the switching position indicated by the detection signal to the next switching position is allocated. That is, the data allocator 14A transfers the AV data of the section from the input buffer area BI to the buffer 21. Then, the process proceeds to step S8.

On the other hand, in step S24, the data allocator 14A switches the destination to which the AV data from the switching position indicated by the detection signal to the next switching position is allocated from the hardware encoder 151 to the software encoder 152. That is, the data allocator 14A sends the address in the input buffer area BI in which the AV data of the section is stored to the software encoder 152. Then, the process proceeds to step S8.

Next, in step S8, the switching position detector 18 increases the switching position number sw by "1" and sets the next switching position T(sw) as the detection target. Then, the processes are repeated from step S3.

The encoding apparatus according to the fourth embodiment detects the switching positions of the allocation destinations from the edit information by the use of the switching position detector 18, similarly to the encoding apparatus according to the first embodiment. When the editor 13 writes the edited AV data into the input buffer area BI of the memory unit 20, the data allocator 14A switches the destination to which the AV data is allocated from one of the hardware encoder 151 and the software encoder 152 to the other at one of the switching positions, according to the size of the empty area of the buffer 21. Accordingly, both encoders 151 and 152 encode the AV data in parallel. In this encoding apparatus, a viewer will hardly perceive the variation in image quality, if any, which is caused by the difference between the encoding processes of the hardware encoder 151 and the software encoder 152, from the video reconstructed by decoding the encoded AV data, similarly to the encoding apparatus according to the first embodiment. Therefore, the encoding apparatus according to the fourth embodiment can improve the image quality of the AV data encoded in parallel by both encoders 151 and 152. Note that similarly to the encoding apparatus according to the first embodiment, since this encoding apparatus encodes the portion of the AV data representing a series of scenes or the portion of the AV data subjected to the same edit process from one switching position to the next switching position by the use of the same encoder, uniform image quality can be achieved.

The encoding apparatus according to the fourth embodiment first allocates the AV data to be encoded to the hardware encoder 151 by the use of the data allocator 14A and then writes the allocated AV data into the buffer 21. When the size of the empty area of the buffer 21 decreases to the threshold, this encoding apparatus allocates the AV data to be encoded to the software encoder 152 from the next switching position by the use of the data allocator 14A. Accordingly, since the encoding process is performed on the AV data by the software encoder 152 while the encoding process is being performed on the AV data by the hardware encoder 151, this encoding apparatus can perform the encoding process at a higher speed, compared with the case where the encoding process is performed by only the hardware encoder 151.

Fifth Embodiment

Figure 13:
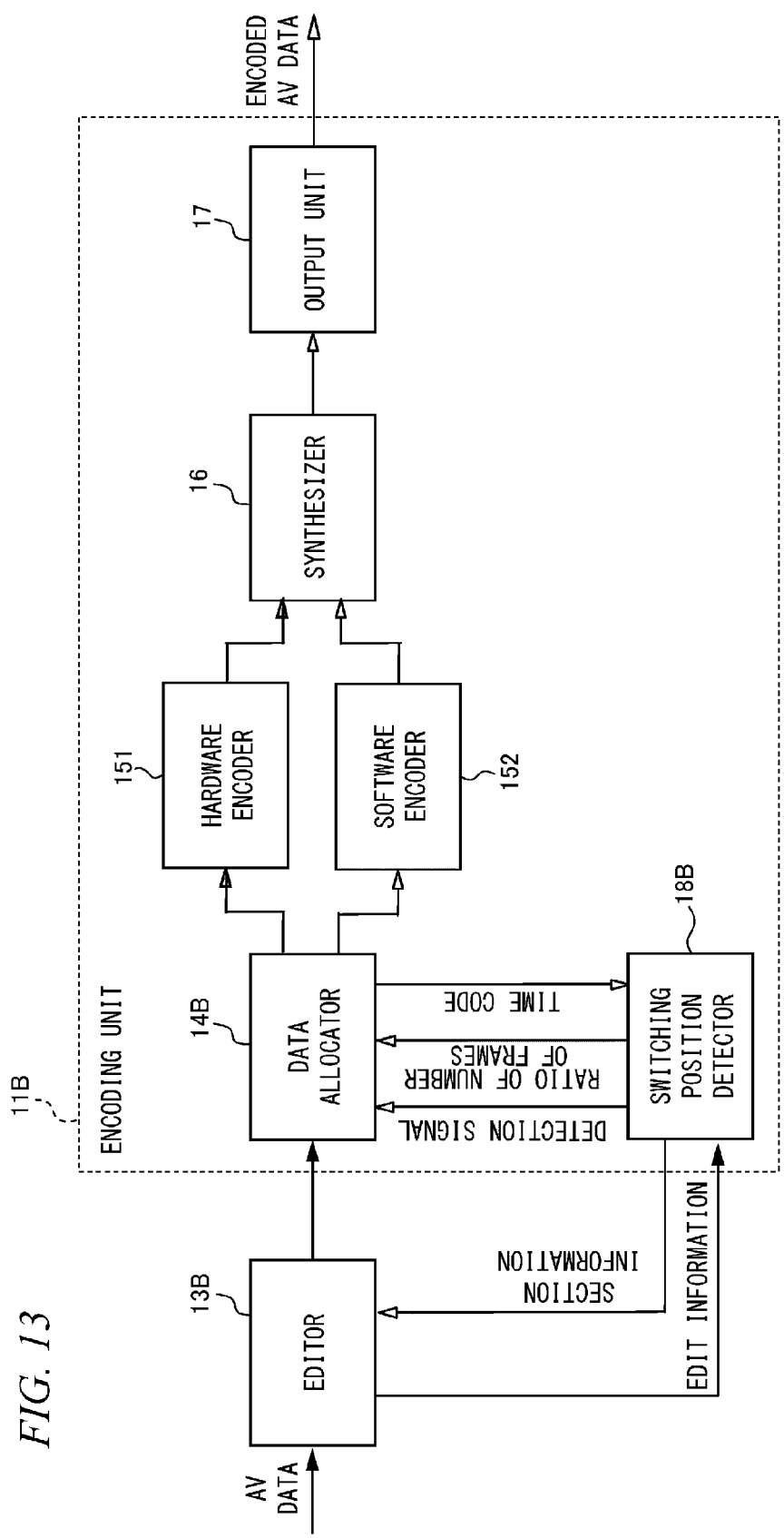
FIG. 13 is a block diagram showing an editor and an encoding unit according to a fifth embodiment of the present invention.

FIG. 13 is a block diagram showing an editor 13B and an encoding unit 11B according to a fifth embodiment of the present invention. Referring to FIG. 13, the encoding unit 11B includes a data allocator 14B, a hardware encoder 151, a software encoder 152, a synthesizer 16, an output unit 17, and a switching position detector 18B. The encoding unit 11B includes the same elements as shown in FIG. 3, except for the data allocator 14B and the switching position detector 18B. In FIG. 13, the same elements are referenced by the same reference symbols as shown in FIG. 3. Additionally, the description of the elements shown in FIG. 3 is cited for details of the same elements. Moreover, the operations of the editor 13B, the data allocator 14B, and the switching position detector 18B include the same portions as the operations of the editor 13, the data allocator 14, and the switching position detector 18 shown in FIG. 3. Therefore, only portions of the editor 13B, the data allocator 14B, and the switching position detector 18B different from the editor 13, the data allocator 14, and the switching position detector 18 shown in FIG. 3 will be described, and the description of the editor 13, the data allocator 14, and the switching position detector 18 shown in FIG. 3 is cited for the details of the same portions.

Referring to FIG. 13, the switching position detector 18B determines the ratio of the number of data units, for example, the ratio of the number of frames, to be supplied to the encoders 151 and 152 per unit time for each section to be encoded by the hardware encoder 151 or the software encoder 152 based on the length of the section of the AV data defined by neighboring switching positions. The switching position detector 18B determines the ratio every two successive sections. Particularly, the switching position detector 18B sends data indicating the determined switching positions and ratio to the editor 13B as section information. Additionally, the switching position detector 18B supplies data indicating the ratio for the sections before and after the switching position indicated by a detection signal to the data allocator 14B at the time of outputting the detection signal.

The editor 13B receives the section information from the switching position detector 18B and alternately outputs two successive sections of the edited AV data at the ratio of the number of data units determined for the sections based on the section information. For example, when the data unit is one frame and the ratio of the number of frames determined for the two successive sections is 2:1, the editor 13B outputs one frame of the latter section out of the two successive sections every time two frames of the former section are successively output. When all the frames of the former section are output, the editor 13B alternately outputs the remaining frames of the latter section and its subsequent section at the ratio of the number of data units determined for these two sections.

Whenever one data unit, for example, one frame, to be encoded is written into the input buffer area BI of the memory unit 20 by the editor 13B, the data allocator 14B reads the time code from the data unit and sends the read time code to the switching position detector 18B. When receiving the detection signal and the data indicating the ratio of the number of data units from the switching position detector 18B, which has responded to the time code, the data allocator 14B alternately allocates the data unit and subsequent data units, which are written into the input buffer area BI, to both encoders 151 and 152 at the ratio indicated by the data until receiving a new detection signal. For example, when the data unit is one frame and the ratio of the number of frames indicated by the data is 2:1, the data allocator 14B allocates one frame to the software encoder 152 every time two frames are successively allocated to the hardware encoder 151 sequentially from the switching position indicated by the detection signal.

Figure 14:
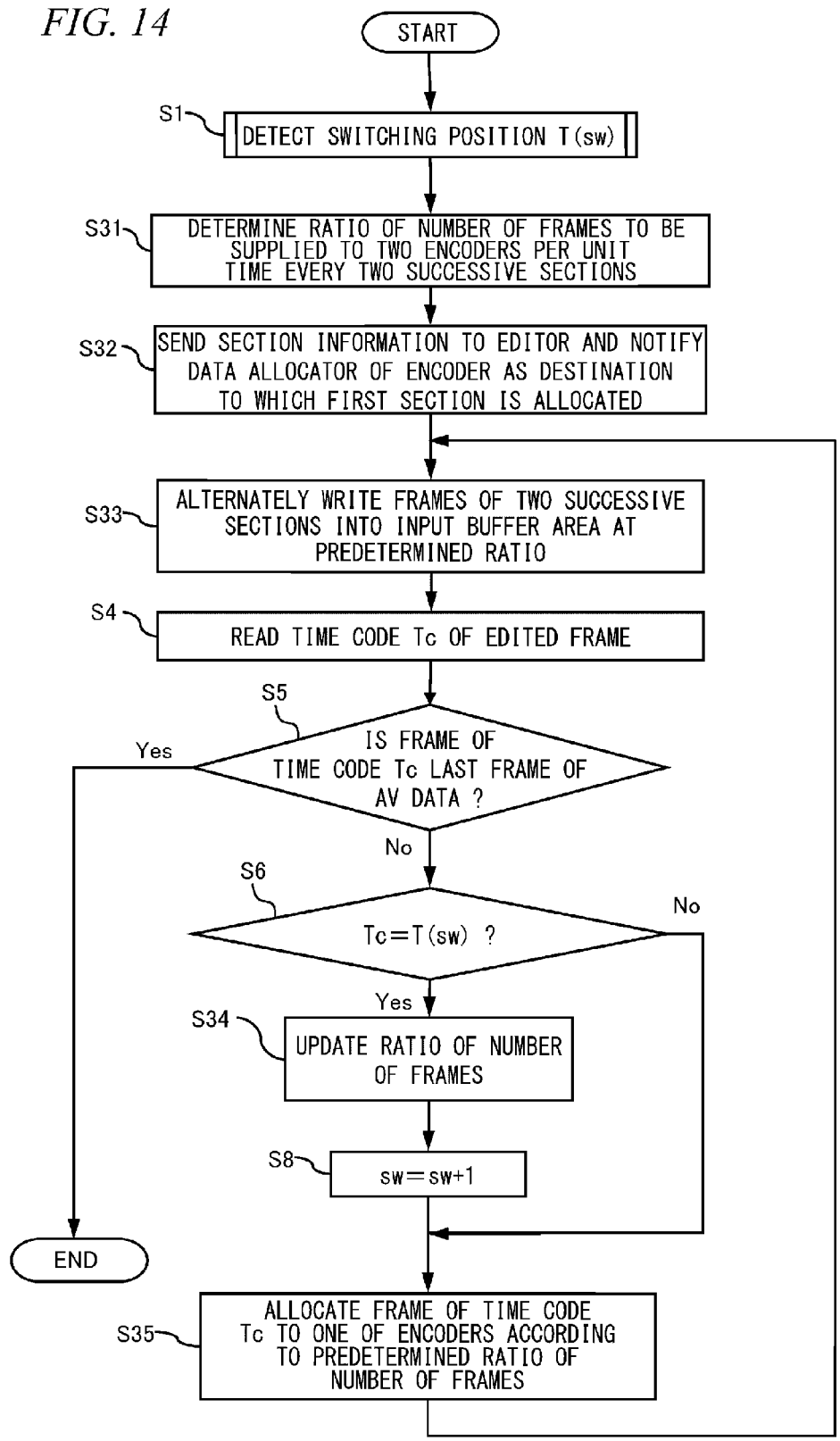
FIG. 14 is a flowchart showing an AV data allocating process by the encoding unit according to the fifth embodiment.

FIG. 14 is a flowchart showing an AV data allocating process in the encoding unit 11B shown in FIG. 13. The allocating process will be described now referring to FIG. 14. Note that in the following description, it is assumed that the data unit to be encoded is one frame for the purpose of convenience. Additionally, FIG. 14 includes the same steps as the steps shown in FIG. 5. Therefore, in FIG. 14, the same steps are referenced by the same reference symbols as shown in FIG. 5. Moreover, the description regarding FIG. 5 is cited for the details of the same steps.

For example, when the edit information on the AV data to be encoded is prepared by the editor 13B, the following processes are started.

First, in step S1, the switching position detector 18B detects switching positions of the allocation destinations from the edit information on the AV data to be encoded and stores the time codes T(sw) representing the detected switching positions.

Next, in step S31, the switching position detector 18B determines the ratio of the number of frames to be supplied to the hardware encoder 151 and the software encoder 152 per unit time every two successive sections of the AV data to be encoded. Here, the switching position detector 18B determines one of the hardware encoder 151 and the software encoder 152 as the destination to which the first section from the first frame of the AV data to the first switching position T(1) is allocated.

Next, in step S32, the switching position detector 18B sends the section information to the editor 13B and notifies the data allocator 14B of the destination to which the first section to be encoded is allocated. Moreover, the switching position detector 18B initializes the switching position number sw to be detected to 1.

Next, in step S33, the editor 13B alternately writes frames included in the two successive sections in the edited AV data to the input buffer area BI of the memory unit 20 at the ratio of the number of frames determined for the two sections based on the section information.

Next, in step S4, whenever the editor 13B writes one frame to be encoded into the input buffer area BI, the data allocator 14B reads the time code Tc from the frame and sends the read time code to the switching position detector 18B.

Next, in step S5, the data allocator 14B determines whether or not the frame of the time code Tc is the last frame of the AV data to be encoded. When the frame is not the last frame ("NO" in step S5), the process proceeds to step S6. On the other hand, when the frame is the last frame ("YES" in step S5), the data allocator 14B allocates the frames to one of the hardware encoder 151 and the software encoder 152 according to the ratio of the number of frames to be allocated to both encoders 151 and 152 and then the process ends.

Next, in step S6, the switching position detector 18B compares the time code Tc received from the data allocator 14B with the time code T(sw) of the sw-th switching position. When the time code Tc from the data allocator 14B is equal to the time code T(sw) of the sw-th switching position ("YES" in step S6), the process proceeds to step S34. When the time code Tc is not equal to the time code T(sw) of the sw-th switching position ("NO" in step S6), the process proceeds to step S35.

Next, in step S34, the switching position detector 18B sends the detection signal and the data indicating the ratio of the number of frames for the sections before and after the switching position indicated by the detection signal, to the data allocator 14B. In response to the detection signal, the data allocator 14B updates the ratio at which the frame of the time code Tc and its subsequent frames written into the input buffer area BI are allocated to both encoders 151 and 152 to the ratio of the number of frames indicated by the data. Then, the process proceeds to step S8.

Next, in step S8, the switching position detector 18B increases the switching position number sw by "1" and sets the next switching position T(sw) as the detection target. Then, the process proceeds to step S35.

Next, in step S35, the data allocator 14B allocates the frame of the time code Tc to one of the hardware encoder 151 and the software encoder 152 according to the ratio of the number of frames allocated to both encoders 151 and 152. Then, the processes are repeated from step S33.

The encoding apparatus according to the fifth embodiment detects the switching positions of the allocation destinations from the edit information by the use of the switching position detector 18B, similarly to the encoding apparatus according to the first embodiment. When the editor 13B alternately writes two successive sections of the AV data divided by the switching position into the input buffer area BI of the memory unit 20 at the ratio of the number of data units set by the switching position detector 18B, the data allocator 14B alternately supplies the written AV data to the hardware encoder 151 and the software encoder 152 at the same ratio of the number of data units, and, in particular, switches the destination to which the AV data is allocated from one of the encoders 151 and 152 to the other at each switching position. Accordingly, both encoders 151 and 152 encode the AV data in parallel. In this encoding apparatus, a viewer will hardly perceive the variation in image quality, if any, which is caused by the difference between the encoding processes of the hardware encoder 151 and the software encoder 152, from the video reconstructed by decoding the encoded AV data, similarly to the encoding apparatus according to the first embodiment. Therefore, the encoding apparatus according to the fifth embodiment can improve the image quality of the AV data encoded in parallel by both encoders 151 and 152. Note that similarly to the encoding apparatus according to the first embodiment, since this encoding apparatus encodes the portion of the AV data representing a series of scenes or the portion of the AV data subjected to the same edit process from one switching position to the next switching position by the use of the same encoder, uniform image quality can be achieved.

The encoding apparatus according to the fifth embodiment alternately supplies two sections of the AV data to the encoders 151 and 152 as the allocation destination thereof at a predetermined ratio of the number of data units. Moreover, this encoding apparatus sets the ratio of the number of data units according to the length of each section and updates the ratio of the number of data units to the value set for the section starting from the switching position whenever the data unit at the switching position is written into the input buffer area BI of the memory unit 20. Accordingly, this encoding apparatus can make both encoders 151 and 152 perform the encoding processes in parallel while reducing the time during which both encoders 151 and 152 wait for the input of the data units to be encoded or while suppressing occurrence of the time. As a result, this encoding apparatus can perform the entire encoding process at a higher speed than the encoding process using only the hardware encoder 151.

Sixth Embodiment

Figure 15:
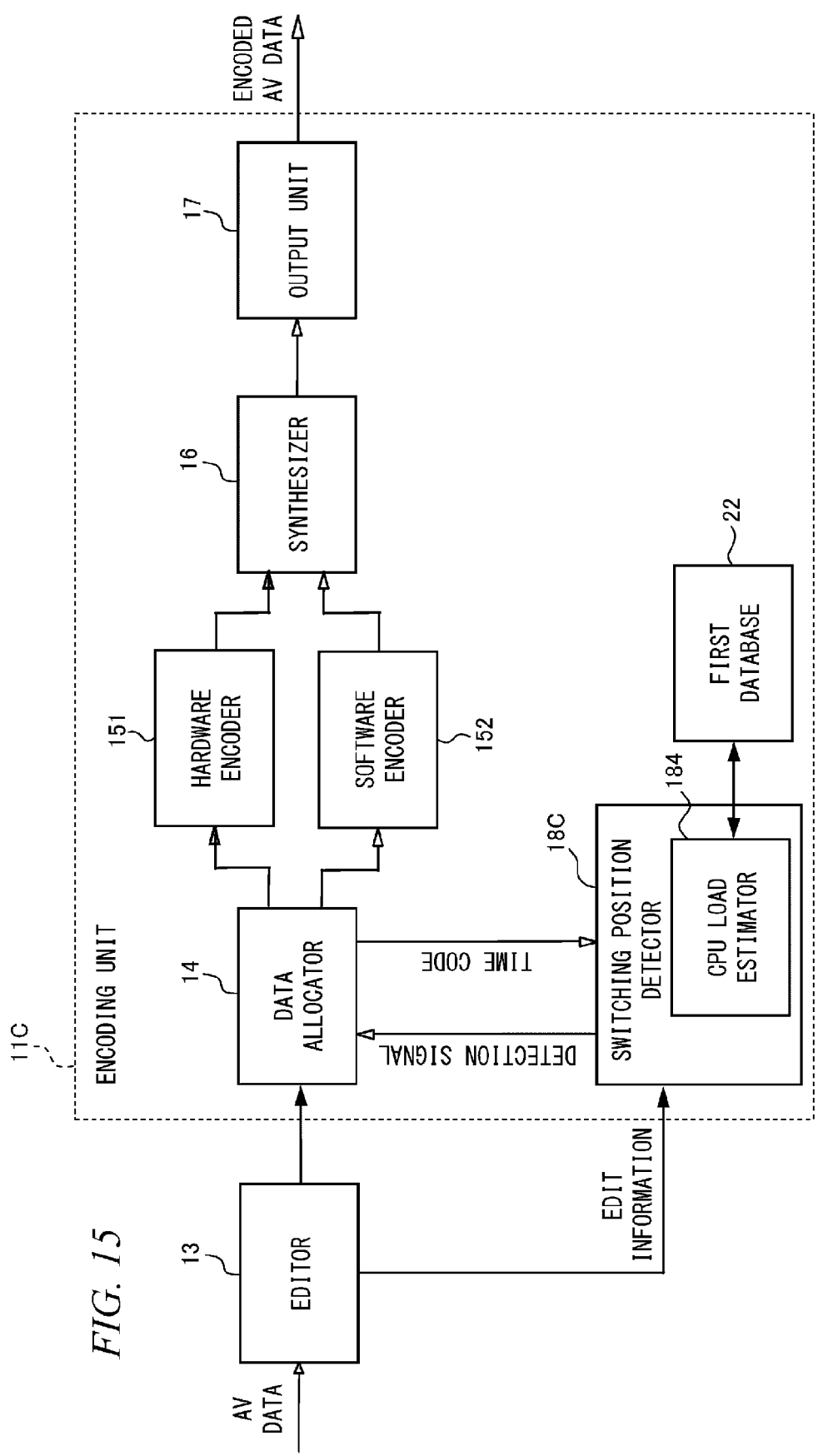
FIG. 15 is a block diagram showing an editor and an encoding unit according to a sixth embodiment of the present invention.

FIG. 15 is a block diagram showing an editor 13 and an encoding unit 11C according to a sixth embodiment of the present invention. Referring to FIG. 15, the encoding unit 11C includes a data allocator 14, a hardware encoder 151, a software encoder 152, a synthesizer 16, an output unit 17, a switching position detector 18C, and a first database 22. The encoding unit 11C includes the same elements as shown in FIG. 3, except for the switching position detector 18C and the first database 22. In FIG. 15, the same elements are referenced by the same reference symbols as shown in FIG. 3. Additionally, the description of the elements shown in FIG. 3 is cited for details of the same elements. The operation of the switching position detector 18C includes the same portions as the operation of the switching position detector 18 shown in FIG. 3. Therefore, only a portion of the switching position detector 18C different from the switching position detector 18 shown in FIG. 3 will be described, and the description of the switching position detector 18 shown in FIG. 3 is cited for the details of the same portions.

Referring to FIG. 15, the switching position detector 18C further includes a CPU load estimator 184. The CPU load estimator 184 predicts the load of the CPU 10 caused by the edit process of the editor 13 from the edit information as follows.

The CPU load estimator 184 calculates the average of time line processing indices for every section of the AV data defined by the switching positions based on the edit information. Here, the time line processing index is defined as a throughput of the CPU 10, that is, a CPU load index, necessary for the editor 13 to edit one data unit of the AV data. Hereinafter, it is assumed that the data unit is one frame for the purpose of convenience.

The CPU load estimator 184 first identifies the types of edit processes performed in parallel in each section from the edit information and calculates the CPU load indices respectively corresponding to the types. Here, the CPU load indices are estimated in advance for every type of the edit process and are stored as the first database 22 in the memory unit 20.

FIG. 16 is a table showing an example of the CPU load indices. Referring to FIG. 16, assuming that the CPU load index in a video data decoding process based on an AVC-Intra scheme is 100, the CPU load indices of other various kinds of processes performed by the CPU 10 are estimated. The CPU load estimator 184 searches the first database 22 for the CPU load indices corresponding to the types of identified edit processes. Moreover, the CPU load estimator 184 determines the value obtained by adding the searched CPU load indices in each section and dividing each sum by the number of data units of each section, as the average of the time line processing indices TE of each section.

For example, it is assumed that the edit information indicates that the edit process performed on a given section is expressed by "two pieces of material data of AVC-Intra 50 are synthesized by picture in picture and one title is inserted." The CPU load estimator 184 first identifies "decoding of material data of AVC-Intra 50", "effect process by picture in picture", and "addition of a title" as the types of concurrent edit processes in the section. Then, the CPU load estimator 184 searches the first database 22 for the CPU load indices corresponding to the identified types of the edit processes to obtain the values of 100, 5, and 5. Moreover, the CPU load estimator 184 determines the time line processing index TE from the searched CPU load indices of 100, 5, and 5 using the following expression: TE=100×2+5+5=210. Here, since two data units of the AVC-Intra 50 material data are used for each data unit of the edited AV data, the CPU load index for the decoding process on the material data is estimated as twice the value 100 per one data unit.

The switching position detector 18C compares the average of the time line processing indices of each section predicted by the CPU load estimator 184 with a predetermined threshold. Here, when the speed of the encoding process of the software encoder 152 performed in parallel with the edit process of the editor 13, that is, the number of data units to be able to be encoded per unit time, is equal to the encoding processing speed of the hardware encoder 151, the time line processing index in the edit process is determined as the threshold. When the predicted average of the time line processing indices exceeds the threshold, it can be considered that there is a heavy load on the CPU 10 caused by the edit process in the section, and thus the switching position detector 18C sets the destination to which the section is allocated to the hardware encoder 151. On the other hand, when the average is less than or equal to the threshold, it can be considered that the load of the CPU 10 caused by the edit process in the section is light, and thus the switching position detector 18C sets the destination to which the section is allocated to the software encoder 152. In this way, the switching position detector 18C determines the destinations to which the sections of the AV data to be encoded are allocated in advance based on the edit information and stores the determined destinations in correlation with the time codes of the sections.

Whenever receiving the time code of the data unit to be encoded from the data allocator 14, the switching position detector 18C compares the time code with the time codes of the switching positions. Moreover, when the time code from the data allocator 14 is equal to the time code of one of the switching positions, the switching position detector 18C checks whether or not the encoders as the destinations to which the sections before and after the switching position are allocated are different from each other. When the destinations are different, the switching position detector 18C outputs a detection signal to the data allocator 14. In response to the detection signal, the data allocator 14 switches the destination to which the section of the data unit and subsequent sections are allocated to an encoder which is different from the destination to which the immediately preceding section is allocated.

Figure 17:
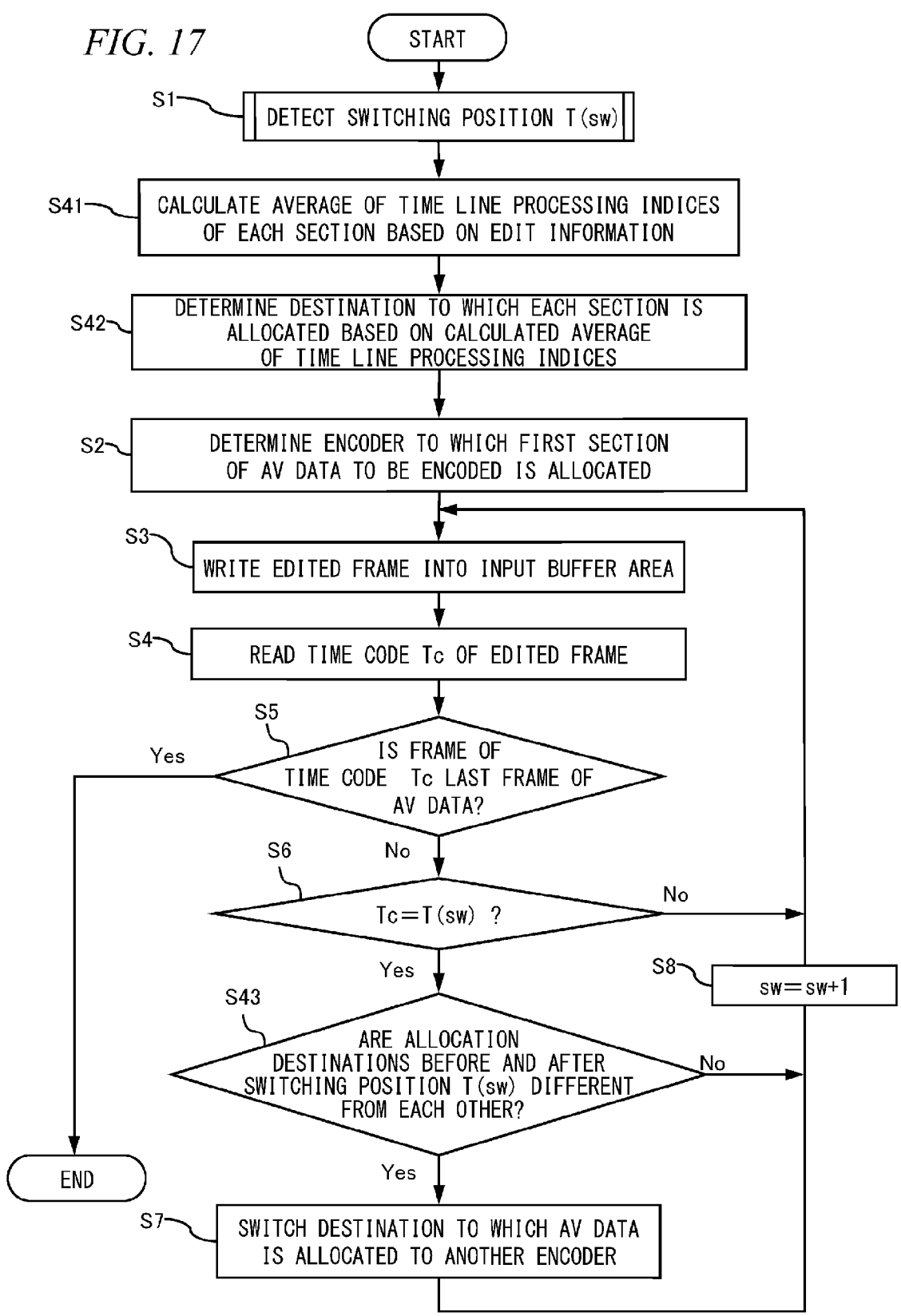
FIG. 17 is a flowchart showing an AV data allocating process by the encoding unit according to the sixth embodiment.

FIG. 17 is a flowchart showing an AV data allocating process in the encoding unit 11C shown in FIG. 15. The allocating process will be described now referring to FIG. 17. In the following description, it is assumed that the data unit to be encoded is one frame for the purpose of convenience. Additionally, FIG. 17 includes the same steps as the steps shown in FIG. 5. Therefore, in FIG. 17, the same steps are referenced by the same reference symbols as shown in FIG. 5. Moreover, the description regarding FIG. 5 is cited for the details of the same steps.

For example, when the edit information on the AV data to be encoded is prepared by the editor 13, the following processes are started.

First, in step S1, the switching position detector 18C detects switching positions of the allocation destinations from the edit information on the AV data to be encoded and stores the time codes T(sw) representing the detected switching positions.

Next, in step S41, the CPU load estimator 184 calculates the average of time line processing indices for every section of the AV data defined by the switching positions based on the edit information.

Next, in step S42, the switching position detector 18C compares the average of the time line processing indices of each section calculated by the CPU load estimator 184 with a predetermined threshold. Moreover, when the average exceeds the threshold, the switching position detector 18C determines the hardware encoder 151 as the destination to which each section is allocated, and when the average is less than or equal to the threshold, the switching position detector 18C determines the software encoder 152 as the destination. The switching position detector 18C stores the determined destinations to which the sections are allocated in correlation with the time codes of the sections. Additionally, the switching position detector 18C notifies the data allocator 14 of the destination to which the first section is allocated.

Next, in step S2, the switching position detector 18C initializes the number sw of switching position to be detected to 1. On the other hand, the data allocator 14 determines one of the hardware encoder 151 and the software encoder 152 as the destination to which the first section of the AV data to be encoded is allocated.

Next, in step S3, the editor 13 writes the frames of the edited AV data into the input buffer area BI of the memory unit 20 sequentially from the first frame.

Next, in step S4, whenever the editor 13 writes one frame to be encoded into the input buffer area BI, the data allocator 14 reads the time code Tc from the frame and sends the read time code to the switching position detector 18C.

Next, in step S5, the data allocator 14 determines whether or not the frame of the time code Tc is the last frame of the AV data to be encoded. When the frame is not the last frame ("NO" in step S5), the process proceeds to step S6. On the other hand, when the frame is the last frame ("YES" in step S5), the data allocator 14 allocates the frame to the encoder determined as the allocation destination at that time and then the process ends.

Next, in step S6, the switching position detector 18C compares the time code Tc received from the data allocator 14 with the time code T(sw) of the sw-th switching position. When the time code Tc from the data allocator 14 is equal to the time code T(sw) of the sw-th switching position ("YES" in step S6), the process proceeds to step S43. When the time code Tc is not equal to the time code T(sw) of the sw-th switching position ("NO" in step S6), the process returns to step S3. In this case, the data allocator 14 allocates the frame of the time code Tc to the encoder determined as the allocation destination at that time.

Next, in step S43, the switching position detector 18C checks the allocation destination stored in correlation with the time code T(sw) of the sw-th switching position. When the allocation destination is different from the destination to which the section immediately before the switching position is allocated ("YES" in step S43), the process proceeds to step S7. When the allocation destination is the same as the destination to which the section immediately before the switching position is allocated ("NO" in step S43), the process proceeds to step S8. In this case, the data allocator 14 allocates the frame of the time code Tc to the encoder determined as the allocation destination at that time.

Next, in step S7, the switching position detector 18C outputs a detection signal. In response to the detection signal, the data allocator 14 switches the allocation destination to another encoder. Accordingly, the data allocator 14 allocates the frame of the time code Tc and subsequent frames to an encoder which is different from that for the frame immediately before the time code Tc.

Next, in step S8, the switching position detector 18C increases the switching position number sw by "1" and detects the next switching position T(sw) as the detection target. Then, the processes are repeated from the step S3.

The encoding apparatus according to the sixth embodiment detects the switching positions of the allocation destinations from the edit information by the use of the switching position detector 18C, similarly to the encoding apparatus according to the first embodiment. When the editor 13 writes the edited AV data into the input buffer area BI of the memory unit 20, the data allocator 14 switches the allocation destination of the AV data from one of the hardware encoder 151 and the software encoder 152 to the other at the predetermined switching positions. Accordingly, both encoders 151 and 152 encode the AV data in parallel. In this encoding apparatus, a viewer will hardly perceive the variation in image quality, if any, which is caused by the difference between the encoding processes of the hardware encoder 151 and the software encoder 152, from the video reconstructed by decoding the encoded AV data, similarly to the encoding apparatus according to the first embodiment. Therefore, the encoding apparatus according to the sixth embodiment can improve the image quality of the AV data encoded in parallel by both encoders 151 and 152. Note that similarly to the encoding apparatus according to the first embodiment, since this encoding apparatus encodes the portion of the AV data representing a series of scenes or the portion of the AV data subjected to the same edit process from one switching position to the next switching position by the use of the same encoder, uniform image quality can be achieved.

Moreover, the encoding apparatus according to the sixth embodiment predicts the load of the CPU 10 caused by the edit process for every section of the AV data by the use of the switching position detector 18C and determines the destinations to which the sections are allocated based on the predicted load. Accordingly, the software encoder 152 can encode the AV data without imposing an excessive load on the CPU 10. As a result, this encoding apparatus can perform the entire encoding process at a higher speed than the encoding process using only the hardware encoder 151.

Seventh Embodiment

Figure 18:
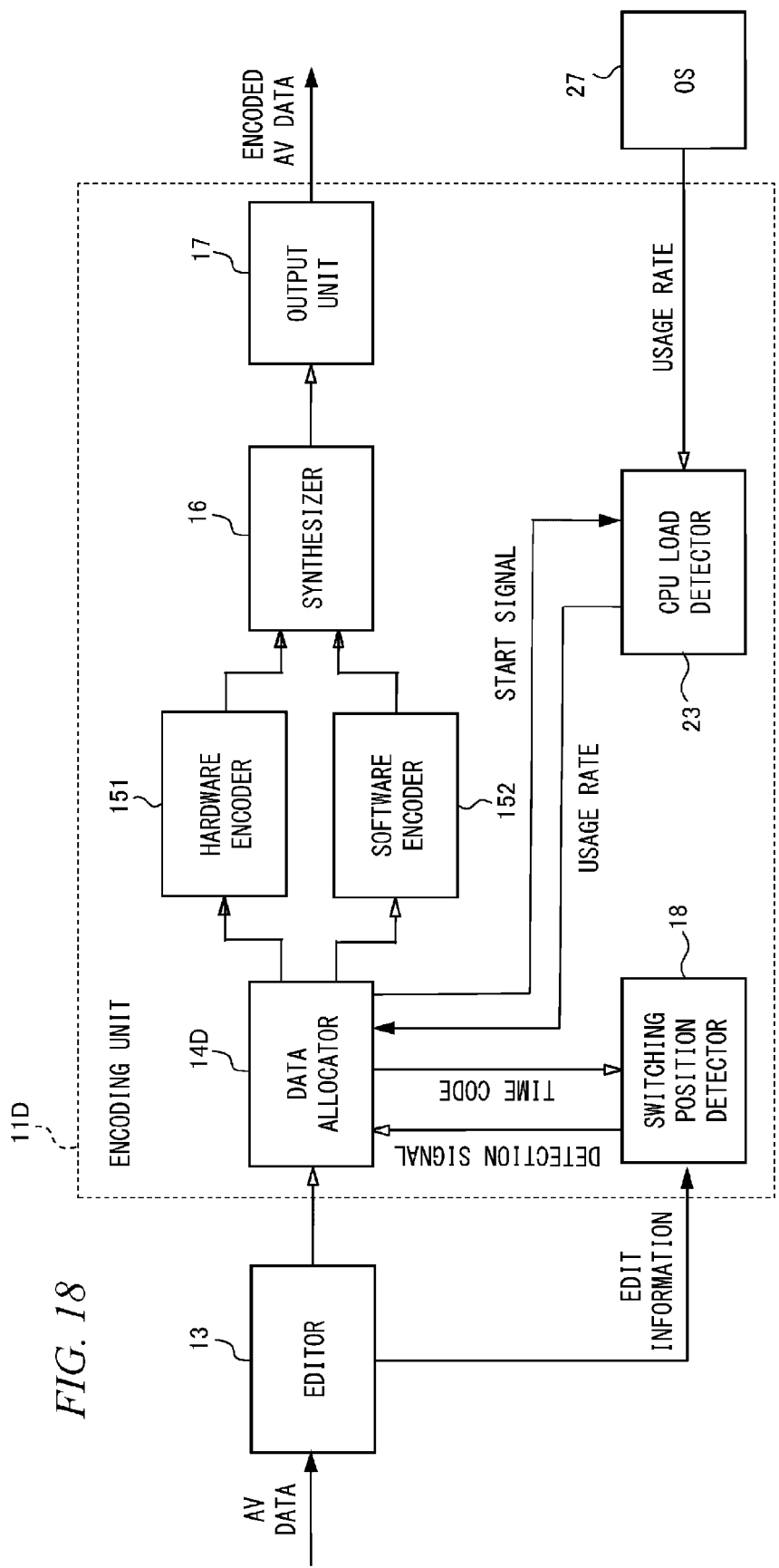
FIG. 18 is a block diagram showing an editor and an encoding unit according to a seventh embodiment of the present invention.

FIG. 18 is a block diagram showing an editor 13 and an encoding unit 11D according to a seventh embodiment of the present invention. Referring to FIG. 18, the encoding unit 11D includes a data allocator 14D, a hardware encoder 151, a software encoder 152, a synthesizer 16, an output unit 17, a switching position detector 18, and a CPU load detector 23. The encoding unit 11D includes the same elements as shown in FIG. 3, except for the data allocator 14D and the CPU load detector 23. In FIG. 18, the same elements are referenced by the same reference symbols as shown in FIG. 3. Additionally, the description of the elements shown in FIG. 3 is cited for details of the same elements. Moreover, the operation of the data allocator 14D includes the same portions as the operation of the data allocator 14 shown in FIG. 3. Therefore, only a portion of the data allocator 14D different from the data allocator 14 shown in FIG. 3 will be described and the description of the data allocator 14 shown in FIG. 3 is cited for the details of the same portions.

Referring to FIG. 18, the CPU load detector 23 operates by making the CPU 10 control other elements of the computer terminal according to a predetermined program. The CPU load detector 23 measures a usage rate of the CPU 10 using API provided by an OS 27 of the computer terminal. Particularly, the CPU load detector 23 performs the measuring operation for a predetermined time from the time when it receives a predetermined start signal from the data allocator 14D and outputs the measured usage rate of the CPU 10 to the data allocator 14D.

The data allocator 14D stops its operation of allocating the AV data for a predetermined time whenever receiving the detection signal from the switching position detector 18 and determines one of the encoders 151 and 152 as the destination to which the AV data starting from the switching position indicated by the detection signal is allocated based on the usage rate of the CPU 10 for the predetermined time.

Specifically, when receiving the detection signal from the switching position detector 18, the data allocator 14D outputs a start signal to the CPU load detector 23 and stops the operation of allocating the AV data for a predetermined time from the time of the output. Accordingly, the operation of the editor 13 for writing the AV data into the input buffer area BI is performed prior to the encoding process on the AV data by both encoders 151 and 152 by the predetermined time. Here, the predetermined time is set sufficiently shorter than the time for writing each section of the AV data divided by the switching positions into the input buffer area BI.

When the predetermined time has passed, the data allocator 14D receives the usage rate of the CPU 10 from the CPU load detector 23 and compares the received usage rate with a predetermined threshold. When the usage rate exceeds the threshold, it can be considered that there is a heavy load on the CPU 10 caused by the edit process of the editor 13 in the section of the AV data starting from the switching position indicated by the detection signal. Accordingly, the data allocator 14D determines the hardware encoder 151 as the destination to which the section of the AV data is allocated. On the other hand, when the usage rate of the CPU 10 is less than or equal to the threshold, it can be considered that there is a light load on the CPU 10 caused by the edit process of the editor 13 in the section of the AV data starting from the switching position indicated by the detection signal. Accordingly, the data allocator 14D determines the software encoder 152 as the destination to which the section of the AV data is allocated.

Figure 19:
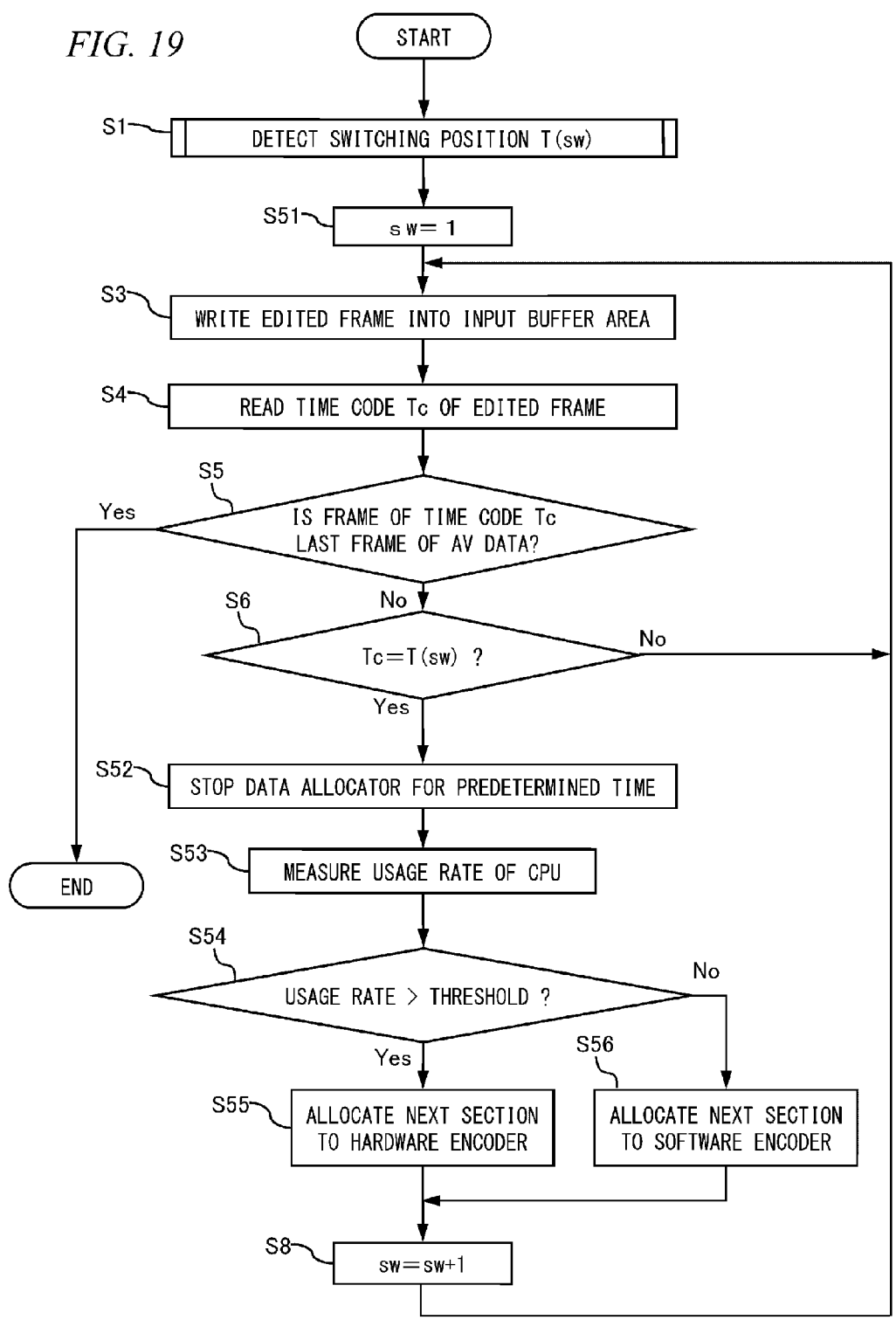
FIG. 19 is a flowchart showing an AV data allocating process by the encoding unit according to the seventh embodiment.

FIG. 19 is a flowchart showing an AV data allocating process in the encoding unit 11D shown in FIG. 18. The AV allocating process will be described now referring to FIG. 19. Note that in the following description, it is assumed that the data unit to be encoded is one frame for the purpose of convenience. Additionally, FIG. 19 includes the same steps as the steps shown in FIG. 5. Therefore, in FIG. 19, the same steps are referenced by the same reference symbols as shown in FIG. 5. Moreover, the description regarding FIG. 5 is cited for the details of the same steps.

For example, when the edit information on the AV data to be encoded is prepared by the editor 13, the following processes are started.

First, in step S1, the switching position detector 18 detects switching positions of the allocation destinations from the edit information on the AV data to be encoded and stores the time codes T(sw) representing the detected switching positions.

Next, in step S51, the switching position detector 18 initializes the number sw of switching position to be detected to 1.

Next, in step S3, the editor 13 writes the frames of the edited AV data into the input buffer area BI of the memory unit 20 sequentially from the first frame.

Next, in step S4, whenever the editor 13 writes one frame to be encoded into the input buffer area BI, the data allocator 14D reads the time code Tc from the frame and sends the read time code to the switching position detector 18.

Next, in step S5, the data allocator 14D determines whether or not the frame of the time code Tc is the last frame of the AV data to be encoded. When the frame is not the last frame ("NO" in step S5), the process proceeds to step S6. On the other hand, when the frame is the last frame ("YES" in step S5), the data allocator 14D allocates the frame to the encoder determined as the allocation destination at that time and then the process ends.

Next, in step S6, the switching position detector 18 compares the time code Tc received from the data allocator 14D with the time code T(sw) of the sw-th switching position. When the time code Tc from the data allocator 14D is the time code of the first frame of the AV data to be encoded or is equal to the time code T(sw) of the sw-th switching position ("YES" in step S6), the process proceeds to step S52. When the time code Tc is not equal to the time code T(sw) of the sw-th switching position ("NO" in step S6), the process returns to step S3. In this case, the data allocator 14D allocates the frame of the time code Tc to the encoder determined as the allocation destination at that time.

Next, in step S52, the switching position detector 18 outputs the detection signal. In response to the detection signal, the data allocator 14D outputs the start signal to the CPU load detector 23 and stops the operation of allocating the AV data for a predetermined time from the time of the output.

Next, in step S53, in response to the start signal, the CPU load detector 23 measures the usage rate of the CPU 10. When the predetermined time has passed since the start signal is received, the CPU load detector 23 outputs the measured usage rate of the CPU 10 to the data allocator 14D.

Next, in step S54, the data allocator 14D receives the usage rate of the CPU 10 from the CPU load detector 23 and compares the receive usage rate with a predetermined threshold. When the usage rate exceeds the threshold ("YES" in step S54), the process proceeds to step S55. When the usage rate is less than or equal to the threshold ("NO" in step S54), the process proceeds to step S56.

Next, in step S55, the data allocator 14D allocates the section including the frame of the time code Tc=T(sw) to the hardware encoder 151. Then, the process proceeds to step S8.

On the other hand, in step S56, the data allocator 14D allocates the section including the frame of the time code Tc=T(sw) to the software encoder 152. Then, the process proceeds to step S8.

Next, in step S8, the switching position detector 18 increases the switching position number sw by "1" and sets the next switching position T(sw) as the detection target. Then, the processes are repeated from step S3.

The encoding apparatus according to the seventh embodiment detects the switching positions of the allocation destinations from the edit information by the use of the switching position detector 18, similarly to the encoding apparatus according to the first embodiment. When the editor 13 writes the edited AV data into the input buffer area BI of the memory unit 20, the data allocator 14D switches the destination to which the AV data is allocated from one of the hardware encoder 151 and the software encoder 152 to the other at one of the switching positions, according to the usage rate of the CPU 10. Accordingly, both encoders 151 and 152 encode the AV data in parallel. In this encoding apparatus, a viewer will hardly perceive the variation in image quality, if any, which is caused by the difference between the encoding process of the hardware encoder 151 and the encoding process of the software encoder 152, from the video reconstructed by decoding the encoded AV data, similarly to the encoding apparatus according to the first embodiment. Therefore, the encoding apparatus according to the seventh embodiment can improve the image quality of the AV data encoded in parallel by both encoders 151 and 152. Note that similarly to the encoding apparatus according to the first embodiment, since this encoding apparatus encodes the portion of the AV data representing a series of scenes or the portion of the AV data subjected to the same edit process from one switching position to the next switching position by the use of the same encoder, uniform image quality can be achieved.

Moreover, whenever the editor 13 writes the AV data of the switching position into the input buffer area BI of the memory unit 20, the encoding apparatus according to the seventh embodiment stops the allocation process of the data allocator 14D for a predetermined time and measures the usage rate of the CPU 10 by the use of the CPU load detector 23. The data allocator 14D determines the destination to which the section of the AV data started from the switching position is allocated according to the usage rate of the CPU 10 at that time. Accordingly, the software encoder 152 can encode the AV data without imposing an excessive load on the CPU 10. As a result, this encoding apparatus can perform the entire encoding process at a higher speed than the encoding process using only the hardware encoder 151.

Eighth Embodiment

Figure 20:
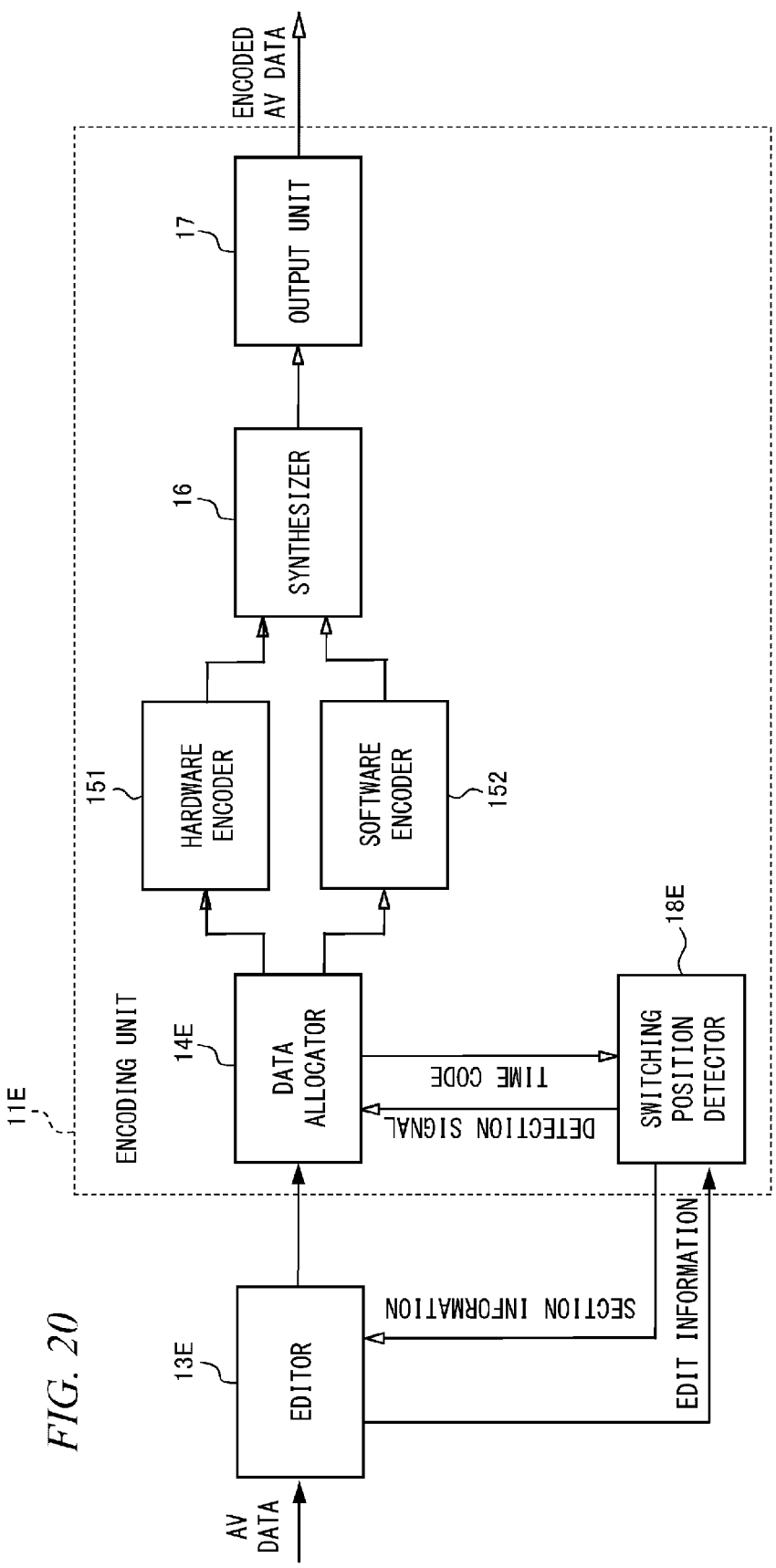
FIG. 20 is a block diagram showing an editor and an encoding unit according to an eighth embodiment of the present invention.

FIG. 20 is a block diagram showing an editor 13E and an encoding unit 11E according to an eighth embodiment of the present invention. Referring to FIG. 20, the encoding unit 11E includes a data allocator 14E, a hardware encoder 151, a software encoder 152, a synthesizer 16, an output unit 17, and a switching position detector 18E. The encoding unit 11E includes the same elements as shown in FIG. 3, except for the data allocator 14E and the switching position detector 18E. In FIG. 20, the same elements are referenced by the same reference symbols as shown in FIG. 3. Moreover, the description of the elements shown in FIG. 3 is cited for details of the same elements. Furthermore, the operations of the editor 13E, the data allocator 14E, and the switching position detector 18E include the same portions as the operations of the editor 13, the data allocator 14, and the switching position detector 18 shown in FIG. 3. Therefore, only portions of the editor 13E, the data allocator 14E, and the switching position detector 18E different from the editor 13, the data allocator 14, and the switching position detector 18 shown in FIG. 3 will be described and the description of the editor 13, the data allocator 14, and the switching position detector 18 shown in FIG. 3 is cited for the details of the same portions.

Referring to FIG. 20, the editor 13E receives the section information from the switching position detector 18E. Here, the section information includes data indicating the switching position detected from the edit information. The editor 13E divides the AV data to be encoded into a plurality of sections at the switching positions based on the section information, outputs the sections from the head to the tail, and also outputs the sections from the tail to the head. However, in the respective sections, the edited AV data is output in the time line direction. Hereinafter, it is assumed that a group of sections output from the head to the tail is called a first section group and the group of sections output from the last to the first is called a second section group. Whenever the output of one section is completed, the editor 13E adds one of the sections which has not yet output to the first section group or the second section group and starts the output of the section. Specifically, when the output of the last section of the first section group is completed and the next section is not output yet, the editor 13E adds the section to the tail of the first section group and outputs the added section. On the other hand, when the output of the first section of the second section group is completed and the immediately preceding section is not output yet, the editor 13E adds the section to the head of the second section group and outputs the added section.

Moreover, the editor 13E alternately writes the data units of the last section of the first section group and the first section of the second section group to the input buffer area BI at a predetermined ratio. For example, when the data unit is one frame and the ratio is 2:1, the editor 13E outputs one frame from the first section of the second section group whenever successively outputting two frames from the last section of the first section group. Then, when the number of sections including the data unit which has not yet output in the input buffer area BI is one, the editor 13E successively outputs the remaining data units of the section.

The data allocator 14E alternately supplies the AV data written into the input buffer area BI by the editor 13E to both encoders 151 and 152 at a predetermined ratio of the number data units. The ratio is equal to the ratio of the number of data units when the editor 13E alternately writes the last section of the first section group and the first section of the second section group into the input buffer area BI. For example, when the data unit is one frame and the ratio is 2:1, the data allocator 14E supplies one frame to the software encoder 152 whenever successively supplying two frames from the input buffer area BI to the hardware encoder 151. Thereafter, the data allocator 14E repeats the allocation operation until receiving the detection signal from the switching position detector 18E.

On the other hand, the data allocator 14E reads the time code from the data unit written into the input buffer area BI and sends the read time code to the switching position detector 18E. When receiving the detection signal from the switching position detector 18E, which has responded to the time code, the data allocator 14E supplies all the data units written into the input buffer area BI after the data unit to an encoder which is different from the destination to which the data unit is allocated. Note that the detection signal indicates that the number of sections including the data units which have not yet output from the editor 13E is one, as described later.

The switching position detector 18E notifies the editor 13E of the switching positions detected from the edit information as the section information. On the other hand, the switching position detector 18E initializes the section number of the tail of the first section group to 1, which is the section number of the head of all of the AV data to be encoded, and sets the time code of the last data unit of the section with the section number 1, that is, the time code of the data unit located immediately before the first switching position as the first time code. Moreover, the switching position detector 18E initializes the section number of the first section of the second section group to the number of the last section of all of the AV data to be encoded, that is, the total number of sections and sets the time code of the last data unit of the section with the section number as the second time code.

Whenever receiving a time code from the data allocator 14E, the switching position detector 18E determines whether or not the first time code and the second time code should be updated and whether or not the detection signal should be output, as follows.

The switching position detector 18E first compares the time code from the data allocator 14E with the first time code. When the time code from the data allocator 14E is smaller than the first time code, the switching position detector 18E does not output the detection signal.

Moreover, when the time code from the data allocator 14E is equal to the first time code, the switching position detector 18E checks the value of a predetermined flag. Here, as described later, when the number of sections including data units which have not yet output from the editor 13E is one, the switching position detector 18E sets the flag. Therefore, when the flag is already set, the switching position detector 18E does not output the detection signal. Note that in this case, the time code from the data allocator 14E is the time code of the most recent data unit written into the input buffer area BI by the editor 13E. On the other hand, when the flag is not set yet, the switching position detector 18E increases the number of the last section of the first section group by "1" and updates the first time code to the time code of the last data unit of the section located immediately after the first section group. Thereafter, the switching position detector 18E compares the updated number of the last section of the first section group with the number of the first section of the second section group. When the former number is smaller than the latter number, the switching position detector 18E does not output the detection signal. When the former number is equal to the latter number, it means that only one section including data units which have not yet output from the editor 13E remains. Accordingly, the switching position detector 18E outputs the detection signal to the data allocator 14E and sets the flag. Note that in this case, when the editor 13E completes the output of all of the data units in the last section of the first section group, a section located immediately after the section is already being output as the first section of the second section group.

When the time code from the data allocator 14E is greater than the first time code, the switching position detector 18E compares the time code from the data allocator 14E with the second time code. When the time code from the data allocator 14E is smaller than the second time code, the switching position detector 18E does not output the detection signal. Moreover, when the time code from the data allocator 14E is equal to the second time code, the switching position detector 18E decreases the number of the first section of the second section group by "1" and updates the second time code to the time code of the last data unit of the section located immediately before the second section group. Thereafter, the switching position detector 18E compares the updated number of the first section of the second section group with the number of the last section of the first section group. When the former number is greater than the latter number, the switching position detector 18E does not output the detection signal. When the former number is equal to the latter number, it means that only one section including data units which have not yet output from the editor 13E remains. Accordingly, the switching position detector 18E outputs the detection signal to the data allocator 14E and sets the flag. Note that in this case, when the editor 13E completes the output of all of the data units in the first section of the second section group, a section located immediately before the section is already being output as the last section of the first section group.

According to the above-mentioned configuration, one of the hardware encoder 151 and the software encoder 152 encodes the AV data to be encoded in the direction from the head to the tail and the other encodes the AV data in the direction from the tail to the head in parallel therewith.

Note that the switching position detector 18E may change the ratio of the number of data units to be supplied to the encoders 151 and 152 per unit time in each section encoded in parallel by the hardware encoder 151 and the software encoder 152 according to the length of each section of the AV data, similarly to the switching position detector 18B according to the fifth embodiment. That is, the switching position detector 18E may change the ratio every combination of two sections which can be encoded in parallel as the first section group and the second section group, such as a combination of the first section and the last section. In this case, the switching position detector 18E sends the ratio to the editor 13E as a part of the section information. The editor 13E alternately outputs the data units of the first section group and the second section group at the ratio indicated by the section information. On the other hand, whenever the time code from the data allocator 14E is equal to the time code of each switching position, the switching position detector 18E notifies the data allocator 14E of the ratio set for the section immediately before or immediately after the switching position. Accordingly, all of the sections of each of the first section group and the second section group can be encoded by the same encoder.

The switching position detector 18E may also include a CPU load estimator 184, similarly to the switching position detector 18C according to the sixth embodiment. Accordingly, the switching position detector 18E predicts the loads of the CPU 10 respectively caused by the edit processes on the first section and the last section of the AV data to be encoded from the edit information, before the editor 13E performs the edit process. Moreover, the switching position detector 18E compares the predicted loads of the CPU 10 on the first section and the last section with each other. When the predicted load of the CPU 10 on the first section is heavier than that on the last section, the switching position detector 18E makes the data allocator 14E allocate the first section group to the hardware encoder 151. In contrast, when the predicted load of the CPU 10 on the first section is lighter than that on the last section, the switching position detector 18E makes the data allocator 14E allocate the first section group to the software encoder 152.

Alternatively, the editor 13E may alternately output the first section group and the second section group in the unit of sections. In this case, whenever the time code from the data allocator 14E is equal to the time code of the data unit located immediately before each switching position, that is, at the tail of each section, the switching position detector 18E outputs the detection signal. On the other hand, the data allocator 14E switches the allocation destination from the data unit subsequently written into the input buffer area BI whenever receiving the detection signal, similarly to the data allocator 14 shown in FIG. 3.

Figure 21:
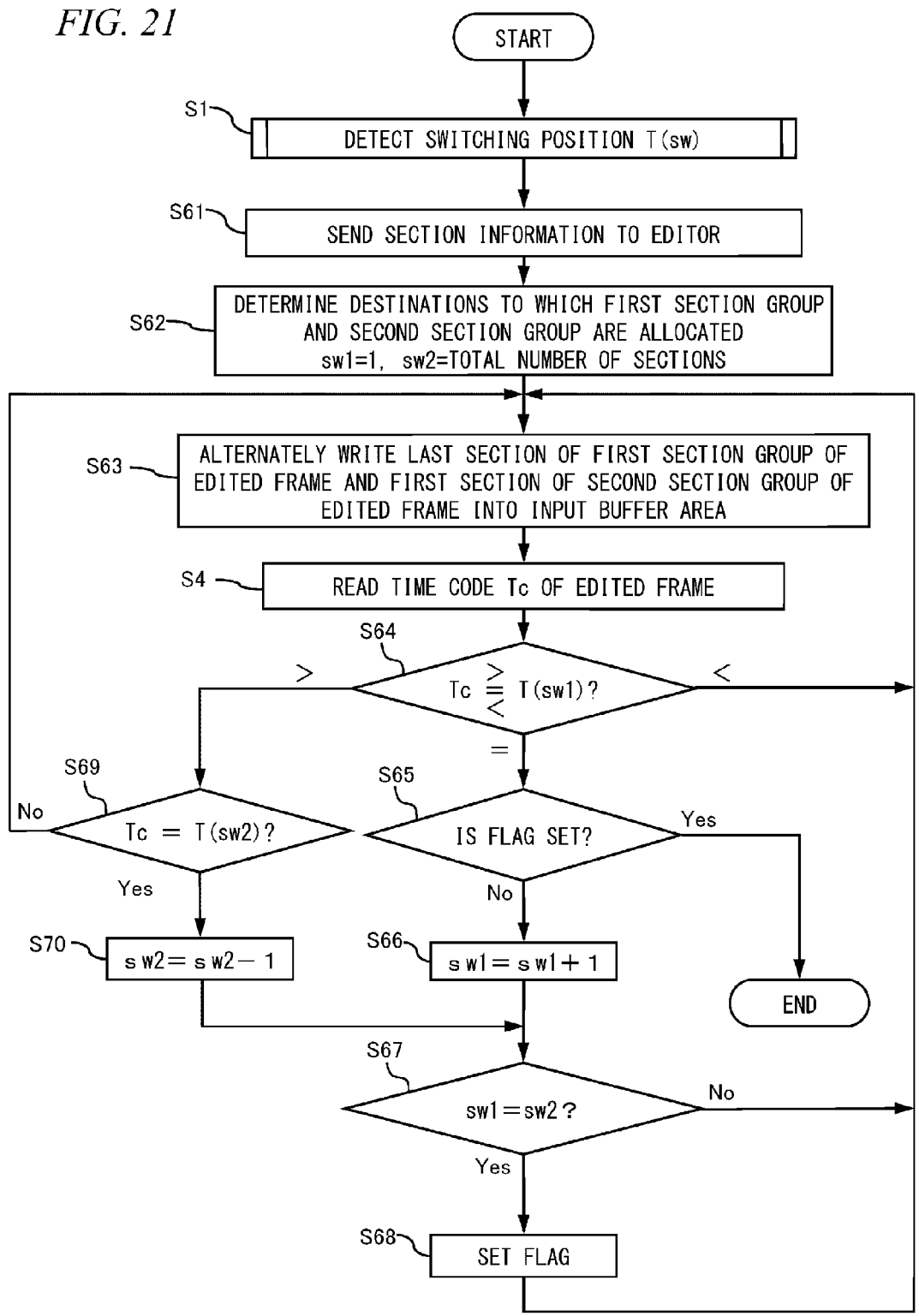
FIG. 21 is a flowchart showing an AV data allocating process according to the eighth embodiment.

FIG. 21 is a flowchart showing the AV data allocating process of the encoding unit 11E shown in FIG. 20. The allocation process is described now referring to FIG. 21. Note that in the following description, it is assumed that the data unit to be encoded is one frame. Additionally, FIG. 21 includes the same steps as shown in FIG. 5. Therefore, in FIG. 21, the same steps are referenced by the same reference symbols as shown in FIG. 5. Moreover, the description regarding FIG. 5 is cited for details of the same steps.

For example, when the edit information on the AV data to be encoded is prepared by the editor 13E, the following processes are started.

First, in step S1, the switching position detector 18E detects switching positions of allocation destinations from the edit information on the AV data to be encoded. Moreover, the switching position detector 18E stores the time code T(sw) of the frame located immediately before the detected sw-th (where sw=1, 2, 3, . . . ) switching position, that is, the last frame of the sw-th section.

Next, in step S61, the switching position detector 18E sends the section information indicating the detected switching positions to the editor 13E.

Next, in step S62, the switching position detector 18E initializes the section number sw1 of the last section of the first section group to 1 and initializes the section number sw2 of the first section of the second section group to the total number of sections. Accordingly, the first time code T(sw1) is initialized to the time code T(1) of the last frame of the first section of all of the AV data to be encoded and the second time code T(sw2) is initialized to the time code of the last frame of all of the AV data. Moreover, the switching position detector 18E determines the destination to which the first section group is allocated and the destination to which the second section group is allocated and notifies the data allocator 14E of the determined destinations. Hereinafter, for the purpose of convenience, it is assumed that the destination to which the first section group is allocated is the hardware encoder 151 and the destination to which the second section group is allocated is the software encoder 152. Note that even when the destinations are set to the contrary, the following description can apply.

Next, in step S63, the editor 13E alternately writes the frames of the first section group and the second section group of the edited AV data into the input buffer area BI of the memory unit 20 at a predetermined ratio. On the other hand, the data allocator 14E alternately allocates the frames written into the input buffer area BI to both encoders 151 and 152 at the same ratio. Accordingly, the first section group is allocated to the hardware encoder 151 and the second section group is allocated to the software encoder 152.

Next, in step S4, whenever the editor 13E writes one frame to be encoded to the input buffer area BI, the data allocator 14E reads the time code Tc from the frame and sends the read time code to the switching position detector 18E.

Next, in step S64, the switching position detector 18E compares the time code Tc from the data allocator 14E with the first time code T(sw1). When the time code Tc from the data allocator 14E is smaller than the first time code T(sw1) ("<" in step S64), the process returns to step S63. In this case, the frame of the time code Tc is allocated to the destination to which the first section group is allocated, that is, the hardware encoder 151. When both time codes Tc and T(sw1) are equal to each other ("=" in step S64), the process proceeds to step S65. In this case, the frame of the time code Tc is allocated to the destination to which the first section group is allocated, that is, the hardware encoder 151. When the time code Tc from the data allocator 14E is greater than the first time code T(sw1) (">" in step S64), the process proceeds to step S69. In this case, the frame of the time code Tc is allocated to the destination to which the second section group is allocated, that is, the software encoder 152.

Next, in step S65, the switching position detector 18E checks the value of the flag. When the flag is not set ("NO" in step S65), the process proceeds to step S66. On the other hand, when the flag is set ("YES" in step S65), the frame of the time code Tc is the most recent frame written into the input buffer area BI by the editor 13E. Therefore, the frame is allocated to the encoder determined as the allocation destination at that time and then the process ends.

Next, in step S66, the switching position detector 18E increases the number sw1 of the last section of the first section group by "1". Accordingly, the first time code T(sw1) is updated to the time code of the last frame of the section located immediately after the first section group.

Next, in step S67, the switching position detector 18E compares the number sw1 of the last section of the first section group with the number sw2 of the first section of the second section group. When the former number sw1 is not equal to the latter number sw2, that is, when sw1 is smaller than sw2 ("No" in step S67), the process returns to step S63. When both numbers sw1 and sw2 are equal to each other ("Yes" in step S67), the process proceeds to step S68.

Next, in step S68, the switching position detector 18E outputs the detection signal to the data allocator 14E and sets the flag. Thereafter, the process returns to step S63.

On the other hand, in step S69, the switching position detector 18E compares the time code Tc from the data allocator 14E with the second time code T(sw2). When the time code Tc from the data allocator 14E is smaller than the second time code T(sw2) ("NO" in step S69), the process returns to step S63. When both time codes Tc and T(sw2) are equal to each other ("YES" in step S69), the process proceeds to step S70.

Next, in step S70, the switching position detector 18E decreases the number sw2 of the first section of the second section group by "1". Accordingly, the second time code T(sw2) is updated to the time code of the last frame of the section located immediately before the second section group. Thereafter, the process proceeds to step S67.

The encoding apparatus according to the eighth embodiment detects the switching positions of the allocation destinations from the edit information by the use of the switching position detector 18E, similarly to the encoding apparatus according to the first embodiment. The editor 13E outputs a plurality of sections of the AV data divided by the switching positions in the direction from the head to the tail and also outputs a plurality of sections in the direction from the tail to the head. When the editor 13E alternately writes the first section group output in the direction from the head to the tail and the second section group output in the direction from the tail to the head into the input buffer area BI of the memory unit 20 at a predetermined ratio of the number of data units, the data allocator 14E alternately supplies the written AV data to the hardware encoder 151 and the software encoder 152 at the same ratio of the number of data units. Accordingly, one of the encoders 151 and 152 encodes the first section group of the AV data and the other encodes the second section group in parallel therewith. As a result, the data allocator 14E switches the destination to which the AV data is allocated from one of the encoders 151 and 152 to the other at the switching position of the boundary between the first section group and the second section group. Accordingly, in this encoding apparatus, a viewer will hardly perceive the variation in image quality, if any, which is caused by the difference between the encoding process of the hardware encoder 151 and the encoding process of the software encoder 152, from the video reconstructed by decoding the encoded AV data, similarly to the encoding apparatus according to the first embodiment. Therefore, the encoding apparatus according to the eighth embodiment can improve the image quality of the AV data encoded in parallel by both encoders 151 and 152. Note that since this encoding apparatus encodes the portion of the AV data representing a series of scenes or the portion of the AV data subjected to the same edit process from one switching position to the next switching position by the use of the same encoder, uniform image quality can be achieved.

The encoding apparatus according to the eighth embodiment supplies the AV data to be encoded to one of the hardware encoder 151 and the software encoder 152 in the direction from the head to the tail and supplies the AV data to the other in the direction from the tail to the head in parallel therewith. Accordingly, this encoding apparatus can make both encoders 151 and 152 perform the encoding processes in parallel with each other while reducing the time during which the encoders 151 and 152 wait for the input of the data units to be encoded or while suppressing the occurrence of the time. As a result, this encoding apparatus can perform the entire encoding process at a higher speed than the encoding process using only the hardware encoder 151.

Ninth Embodiment

Figure 22:
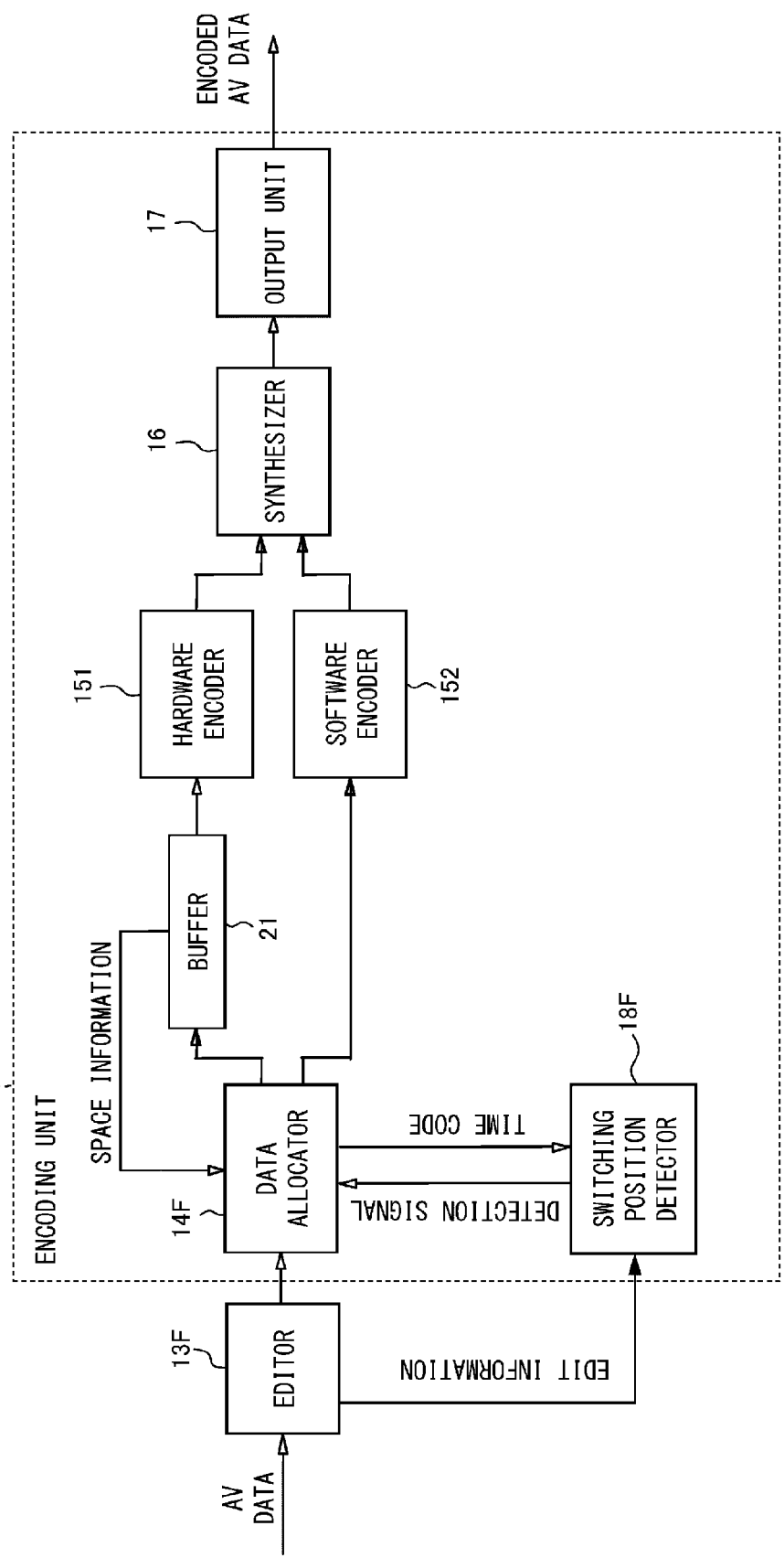
FIG. 22 is a block diagram showing an editor and an encoding unit according to a ninth embodiment of the present invention.

FIG. 22 is a block diagram showing an editor 13F and an encoding unit 11F according to a ninth embodiment of the present invention. Referring to FIG. 22, the encoding unit 11F includes a data allocator 14F, a hardware encoder 151, a software encoder 152, a synthesizer 16, an output unit 17, a switching position detector 18F, and a buffer 21. The encoding unit 11F includes the same elements as shown in FIG. 3, except for the data allocator 14F, the switching position detector 18F, and the buffer 21. In FIG. 22, the same elements are referenced by the same reference symbols as shown in FIG. 3. Additionally, the description of the elements shown in FIG. 3 is cited for details of the same elements. Moreover, the operations of the editor 13F, the data allocator 14F, and the switching position detector 18F includes the same portions as the operations of the editor 13, the data allocator 14, and the switching position detector 18 shown in FIG. 3. Therefore, only portions of the editor 13F, the data allocator 14F, and the switching position detector 18F different from the editor 13, the data allocator 14, and the switching position detector 18 shown in FIG. 3 will be described and the description of the editor 13, the data allocator 14, and the switching position detector 18 shown in FIG. 3 is cited for the details of the same portions.

In FIG. 22, the buffer 21 is disposed between the data allocator 14F and the hardware encoder 151. The buffer 21 is the frame buffer built in the hardware encoder 80, for example, a memory area of the frame buffer 83 shown in FIG. 2. In this case, the capacity of the buffer 21 is, for example, several frames. Alternatively, the buffer 21 may be a memory area of the memory unit 20. In this case, the capacity of the buffer 21 is, for example, several tens frames.

The data allocator 14F sequentially transfers the AV data to be allocated to the hardware encoder 151 to the buffer 21. The hardware encoder 151 encodes the AV data sequentially from the first address of the buffer 21 by a predetermined data unit, for example, by one frame.

The editor 13F can allow a user to fix the destination to which the range designated by the user out of the clips CL1 to CL8 in the time line window TW shown in FIG. 4 is allocated to one of the hardware encoder 151 and the software encoder 152. For example, the range during which the image quality of the AV data should be maintained as uniform as possible is set as a section of which the allocation destination should be fixed to one of the encoder 151 and the encoder 152, that is, a fixed section. Since the fixed section is encoded by the same encoder, the image quality is kept uniform. Moreover, the editor 13F supplies the fixed sections of the AV data and the information indicating the encoder 151 or 152 as the destinations to which the fixed sections are allocated as a part of the edit information to the switching position detector 18F.

Additionally, the editor 13F can allow the user to freely switch the destination to which the range designated by the user out of the clips CL1 to CL8 in the time line window TW shown in FIG. 4 is allocated to either the hardware encoder 151 or the software encoder 152. For example, the range of the AV data in which acceleration of encoding processes by making both encoders 151 and 152 perform the encoding processes in parallel with each other should be given priority over uniformity in image quality, is set as a section of which the allocation destination can be freely switched to either one of the encoders 151 and 152, that is, a free switching section. Since in the free switching section, data units are allocated to the encoders 151 and 152 at an interval that is shorter than the interval between the switching positions, the encoding process on these sections can be accelerated. The editor 13F supplies the information indicating the free switching sections of the AV data as a part of the edit information to the switching position detector 18F.

The switching position detector 18F acquires the edit information from the editor 13F and first detects the fixed sections and the free switching sections in the AV data to be encoded from the acquired edit information. Then, the switching position detector 18F detects the switching positions of allocation destinations from the edit information on sections in the AV data which are neither fixed sections nor free switching sections, similarly to the switching position detector 18 according to the first embodiment shown in FIG. 3.

Whenever receiving a time code from the data allocator 14F, the switching position detector 18F first determines whether or not the position indicated by the time code is included in a fixed section or in a free switching section. When the position indicated by the time code is included in a fixed section or in a free switching section, the switching position detector 18F notifies the data allocator 14F of that fact. On the other hand, when the position indicated by the time code is outside a fixed section and outside a free switching section, the switching position detector 18F outputs a detection signal to the data allocator 14F whenever the time code is equal to the time code of one of switching positions, similarly to the switching position detector 18 shown in FIG. 3.

Whenever the editor 13F writes a data unit to be encoded into the input buffer area BI of the memory unit 20, the data allocator 14F reads the time code from the data unit and sends the read time code to the switching position detector 18F.

When the data allocator 14F is notified from the switching position detector 18F, which has responded to the time code, that the position indicated by the time code is included in a fixed section, the data allocator 14F supplies the data unit of the time code to one of the hardware encoder 151 and the software encoder 152 which is fixed as the allocation destination.

When the data allocator 14F is notified from the switching position detector 18F, which has responded to the time code, that the position indicated by the time code is included in a free switching section, the data allocator 14F first reads the space information from the buffer 21 and checks the size of an empty area of the buffer 21, for example, the number of empty frame buffers, from the space information. When the size exceeds a predetermined threshold, for example, one frame, the data allocator 14F allocates the data unit of the time code to the hardware encoder 151. On the other hand, when the size of the empty area of the buffer 21 is less than or equal to the predetermined threshold, for example, one frame or less, the data allocator 14F allocates the data unit of the time code to the software encoder 152.

When the data allocator 14F is not notified from the switching position detector 18F, which has responded to the time code, that the position indicated by the time code is included in a fixed section or in a free switching section, the data allocator 14F operates similarly to the data allocator 14 shown in FIG. 3. That is, when receiving an additional detection signal from the switching position detector 18F, the data allocator 14F switches the destination to which the data unit of the time code and subsequent data units are allocated to an encoder which is different from the destination to which the data unit immediately before the time code is allocated.

Figure 23:
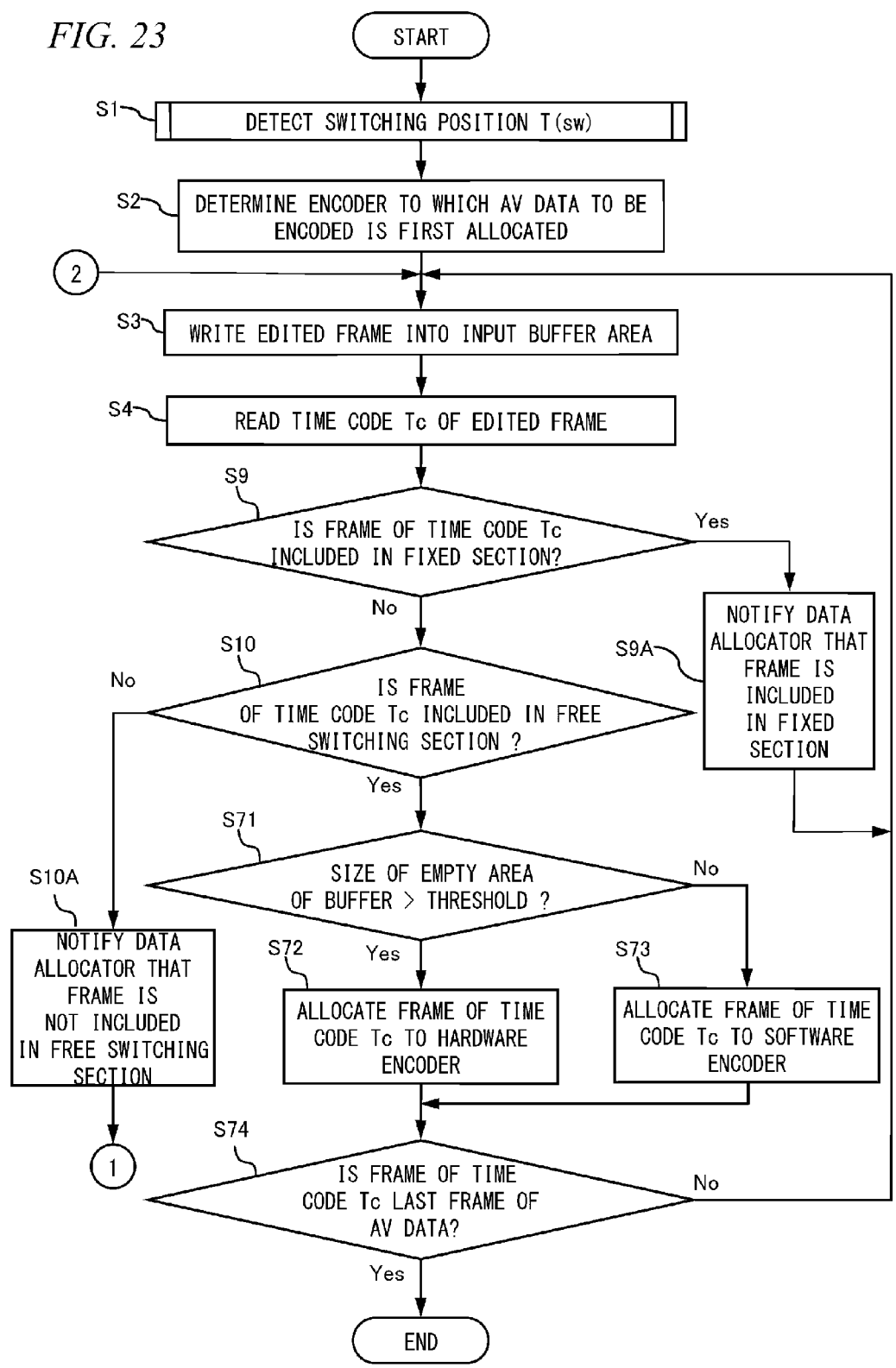
FIG. 23 is a flowchart showing a portion of the AV data allocating process by the encoding unit according to the ninth embodiment.
Figure 24:
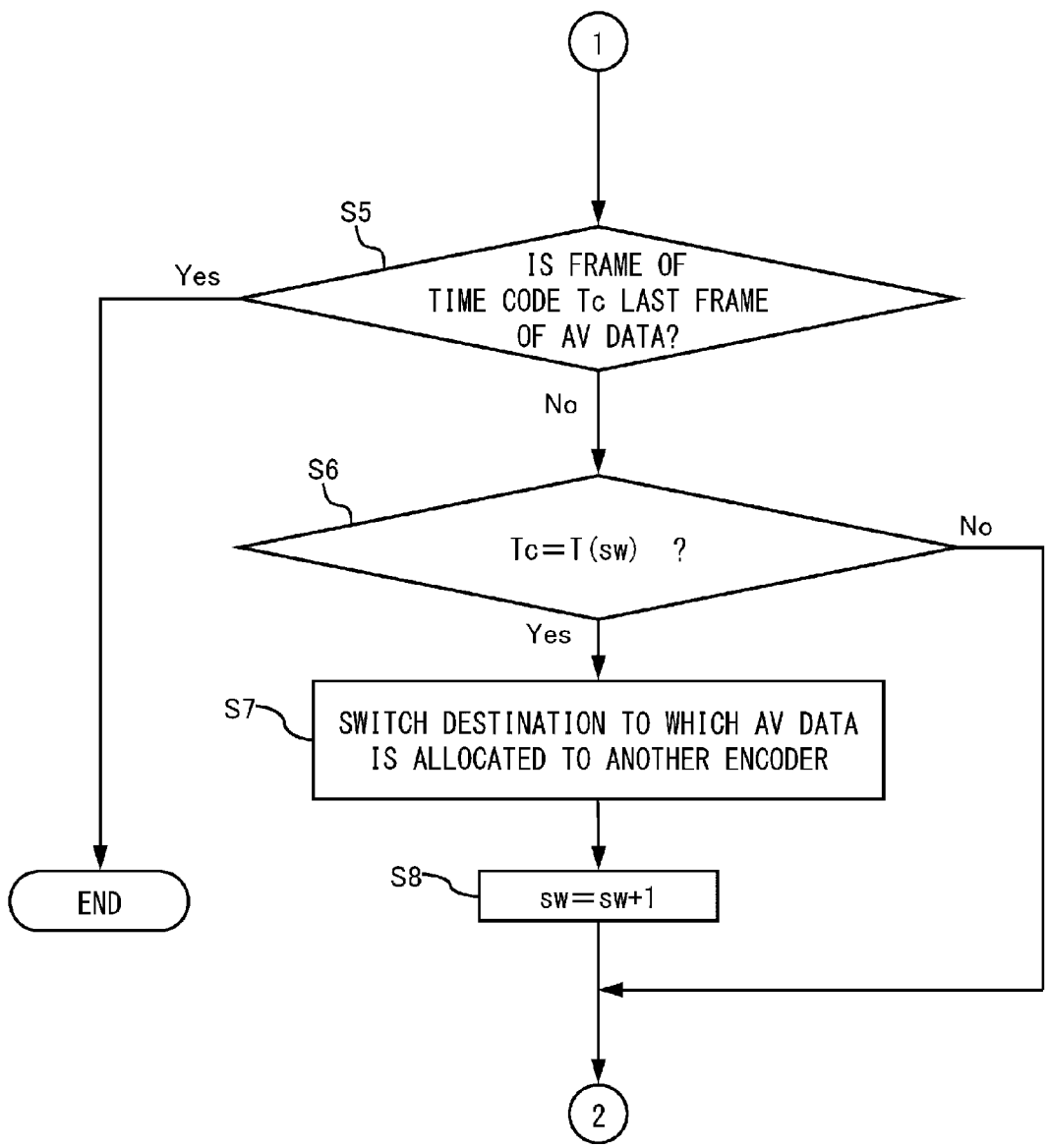
FIG. 24 is a flowchart showing the remaining portion of the AV data allocating process by the encoding unit according to the ninth embodiment.

FIGS. 23 and 24 are flowcharts showing an AV data allocating process in the encoding unit 11F shown in FIG. 22. The allocating process will be described now referring to FIGS. 23 and 24. Note that in the following description, it is assumed that the data unit to be encoded is one frame for the purpose of convenience. Additionally, FIGS. 23 and 24 include the same steps as the steps shown in FIG. 5. Therefore, in FIGS. 23 and 24, the same steps are referenced by the same reference symbols as shown in FIG. 5. Moreover, the description regarding FIG. 5 is cited for the details of the same steps.

For example, when the edit information on the AV data to be encoded is prepared by the editor 13F, the following processes are started.

First, in step S1, the switching position detector 18F detects the fixed sections and the free switching sections from the edit information on the AV data to be encoded and detects the switching positions of the allocation destinations from the edit information on the sections which are neither fixed sections nor free switching sections. Moreover, the switching position detector 18F stores the time codes indicating the ranges of the fixed sections and the free switching sections and the time codes T(sw) indicating the switching positions.

Figure 25:
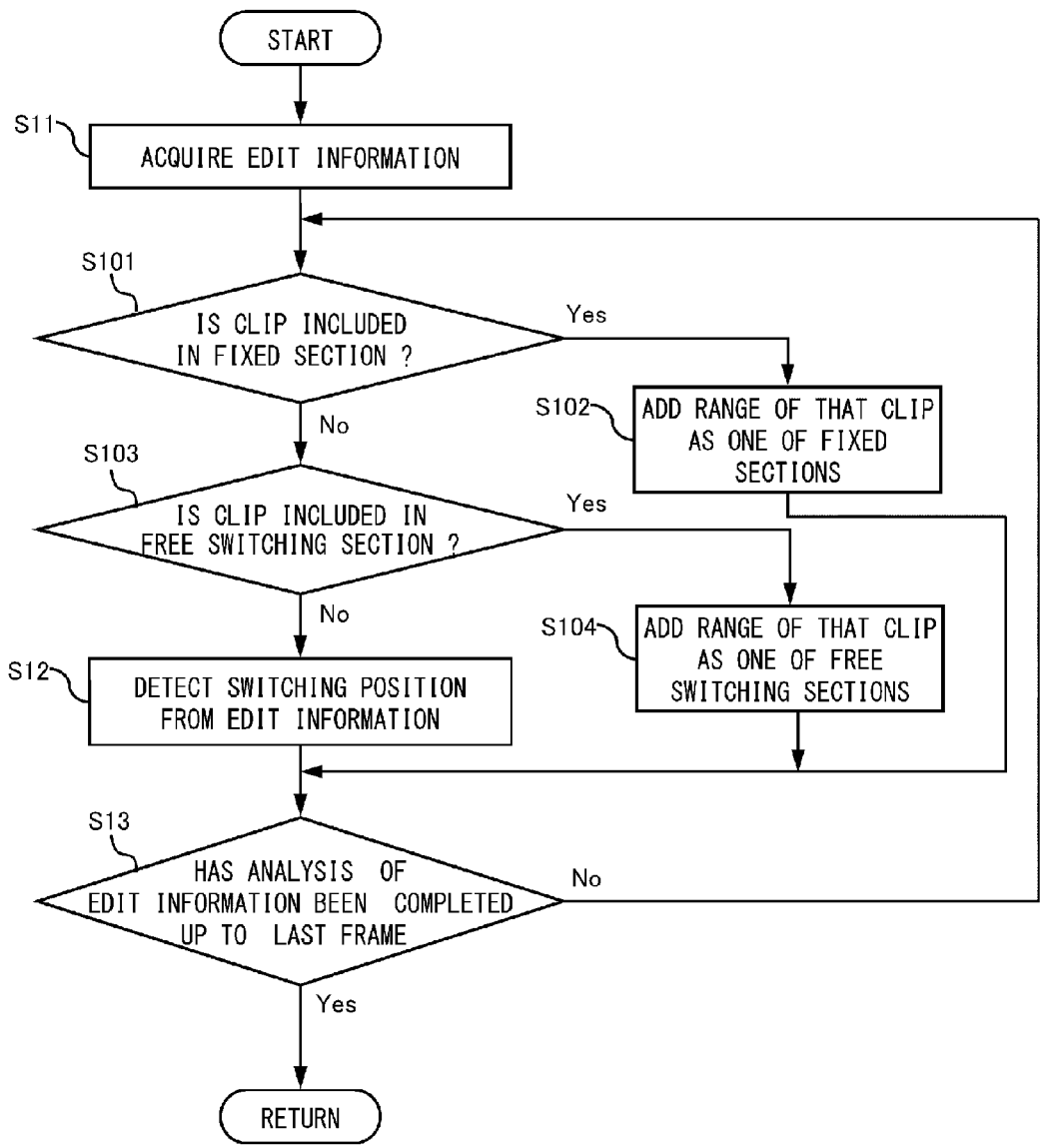
FIG. 25 is a flowchart showing a switching position detecting process according to the ninth embodiment.

FIG. 25 is a flowchart showing a process of detecting the fixed sections, the free switching sections, and the switching positions in step S1 shown in FIG. 23. The detecting process will be described now referring to FIG. 25.

First, in step S11, the switching position detector 18F acquires the edit information from the editor 13F and analyzes the edit information sequentially from the first clip.

Next, in step S101, the switching position detector 18F determines whether or not each clip is included in a fixed section based on the edit information. When the clip is included in a fixed section ("YES" in step S101), the process proceeds to step S102. When the clip is not included in a fixed section ("NO" in step S101), the process proceeds to step S103.

In step S102, the switching position detector 18F adds the time codes indicating the range of the clip as one of the time codes indicating the ranges of fixed sections. Then, the process proceeds to step S13.

On the other hand, in step S103, the switching position detector 18F determines whether or not the clip is included in a free switching section based on the edit information. When the clip is included in a free switching section ("YES" in step S103), the process proceeds to step S104. When the clip is not included in a free switching section ("NO" in step S103), the process proceeds to step S12.

In step S104, the switching position detector 18F adds the time codes indicating the range of the clip as one of the time codes indicating the ranges of free switching sections. Then, the process proceeds to step S13.

Next, in step S12, the switching position detector 18F first analyzes at least one of a position of the boundary between the clips and a change pattern of the type of the edit process between the clips. When the clips arranged in parallel on the time line are ended simultaneously and are changed to other clips and/or when the change pattern of the type of the edit process is a predetermined pattern, the switching position detector 18F detects the corresponding boundary between the clips as the switching position of the allocation destination.

Next, in step S13, the switching position detector 18F determines whether or not the edit information is analyzed up to the last frame of the AV data. When the edit information is not analyzed up to the last frame ("NO" in step S13), the processes are repeated from step S101. When the edit information is analyzed up to the last frame ("YES" in step S13), the process proceeds to step S2 shown in FIG. 23.

Returning to FIG. 23, in step S2, the switching position detector 18F initializes the number sw of the switching position to be detected to 1. On the other hand, the data allocator 14F determines one of the hardware encoder 151 and the software encoder 152 as the allocation destination of the first frame of the AV data to be encoded. Particularly, when the first frame is included in a fixed section, the allocation destination is set to the encoder fixed in the fixed section. When the first frame is included in a free switching section, the allocation destination is set to the hardware encoder 151.

Next, in step S3, the editor 13F writes the frames of the edited AV data into the input buffer area BI of the memory unit 20 sequentially from the first frame.

Next, in step S4, whenever the editor 13F writes one frame to be encoded into the input buffer area BI, the data allocator 14F reads the time code Tc from the frame and sends the read time code to the switching position detector 18F.

Next, in step S9, the switching position detector 18F determines whether or not the frame of the time code Tc is included in a fixed section. When the frame is included in a fixed section ("YES" in step S9), the process proceeds to step S9A. On the other hand, when the frame is not included in a fixed section ("NO" in step S9), the process proceeds to step S10.

Next, in step S9A, the switching position detector 18F notifies the data allocator 14F that the frame of the time code Tc is included in a fixed section. Accordingly, the data allocator 14F sets the encoder fixed in the fixed section as the destination to which the frame of the time code Tc is allocated. Then, the processes are repeated from step S3.

On the other hand, in step S10, the switching position detector 18F determines whether or not the frame of the time code Tc is included in a free switching section. When the frame is not included in a free switching section ("NO" in step S10), the process proceeds to step S10A. On the other hand, when the frame is included in a free switching section ("YES" in step S10), the process proceeds to step S71.

Next, in step S10A, the switching position detector 18F notifies the data allocator 14F that the frame of the time code Tc is not included in a free switching section. Accordingly, the processes proceed in the order of steps S5 to S8 shown in FIG. 24. Here, all steps S5 to S8 shown in FIG. 24 are completely equal to steps S5 to S8 shown in FIG. 5. Therefore, the description regarding FIG. 5 is cited for the details of steps S5 to S8. After step S8, the processes are repeated from step S3.

On the other hand, in step S71, the data allocator 14F determines whether or not the number of empty frame buffers is greater than a predetermined threshold from the space information of the buffer 21. When the number of empty frame buffers is greater than the threshold ("YES" in step S71), the process proceeds to step S72. When the number of empty frame buffers is less than or equal to the threshold ("NO" in step S71), the process proceeds to step S73.

In step S72, the data allocator 14F allocates the frame of the time code Tc to the hardware encoder 151 and transfers the frame to the buffer 21. Then, the process proceeds to step S74.

On the other hand, in step S73, the data allocator 14F allocates the frame of the time code Tc to the software encoder 152. Then, the process proceeds to step S74.

Next, in step S74, the data allocator 14F determines whether or not the frame of the time code Tc is the last frame of the AV data to be encoded. When the frame is not the last frame ("NO" in step S74), the processes are repeated from step S3. When the frame is the last frame ("YES" in step S74), the process ends.

The encoding apparatus according to the ninth embodiment can allow a user to set the fixed sections and the free switching sections of the AV data to be encoded. This encoding apparatus detects the switching position of the destination to which the section which is neither a fixed section nor a free switching section is allocated from the edit information by the use of the switching position detector 18F, similarly to the encoding apparatus according to the first embodiment. When the editor 13F writes the edited AV data into the input buffer area BI of the memory unit 20, the data allocator 14F switches the destination to which the AV data is allocated from one of the hardware encoder 151 and the software encoder 152 to the other at the switching positions. Accordingly, both encoders 151 and 152 encode the AV data in parallel. In this encoding apparatus, similarly to the encoding apparatus according to the first embodiment, a viewer will hardly perceive the variation in image quality, if any, which is caused by the difference between the encoding process of the hardware encoder 151 and the encoding process of the software encoder 152, in the sections which are neither fixed sections nor free switching sections from a video reconstructed by decoding the encoded AV data. Therefore, the encoding apparatus according to the ninth embodiment can improve the image quality of the AV data encoded in parallel by both encoders 151 and 152. Note that since this encoding apparatus encodes the portion of the AV data representing a series of scenes or the portion of the AV data subjected to the same edit process from one switching position to the next switching position by the use of the same encoder, it is possible to make image quality of the portions uniform, similarly to the encoding apparatus according to the first embodiment.

Moreover, in the encoding apparatus according to the ninth embodiment, regarding a free switching section of the AV data to be encoded, when the empty area of the buffer 21 is less than or equal to a threshold, the data allocator 14F allocates a portion of the AV data to the software encoder 152 regardless of the switching position. Accordingly, it is possible to perform the encoding process of the software encoder 152 in parallel with the encoding process of the hardware encoder 151 while continuing the encoding process of the hardware encoder 151. In this way, this encoding apparatus can perform the entire encoding process at a higher speed than the encoding process using only the hardware encoder 151.

Tenth Embodiment

Figure 26:
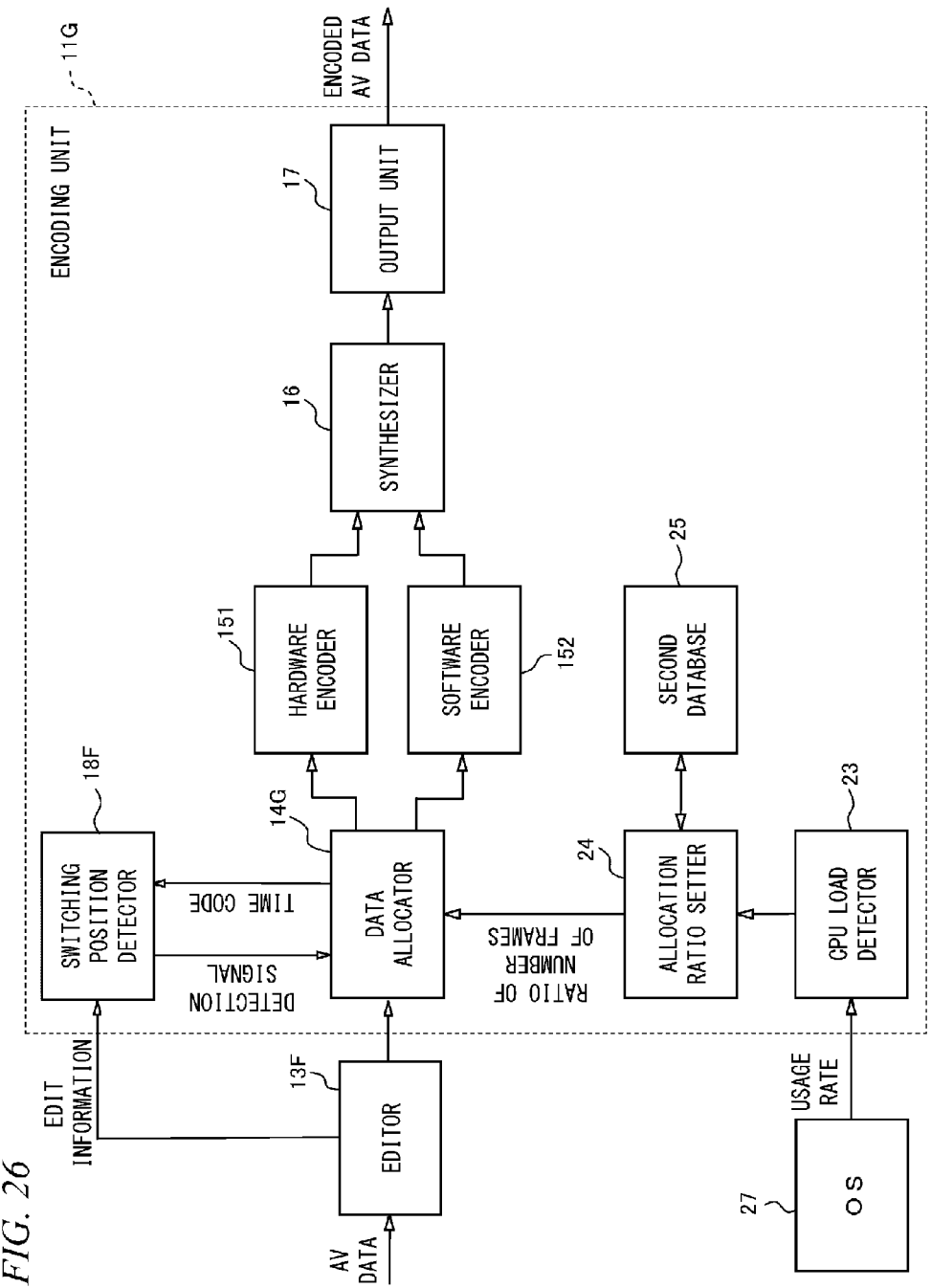
FIG. 26 is a block diagram showing an editor and an encoding unit according to a tenth embodiment of the present invention.

FIG. 26 is a block diagram showing an editor 13F and an encoding unit 11G according to a tenth embodiment of the present invention. Referring to FIG. 26, the encoding unit 11G includes a data allocator 14G, a hardware encoder 151, a software encoder 152, a synthesizer 16, an output unit 17, a switching position detector 18F, a CPU load detector 23, an allocation ratio setter 24, and a second database 25. The encoding unit 11G includes the same elements as shown in FIG. 3, except for the data allocator 14G, the switching position detector 18F, the CPU load detector 23, the allocation ratio setter 24, and the second database 25. In FIG. 26, the same elements are referenced by the same reference symbols as shown in FIG. 3. Additionally, the description of the elements shown in FIG. 3 is cited for details of the same elements. Moreover, the operation of the data allocator 14G includes the same portions as the operation of the data allocator 14 shown in FIG. 3. Therefore, only a portion of the operation of the data allocator 14G different from the operation of the data allocator 14 shown in FIG. 3 will be described and the description of the data allocator 14 shown in FIG. 3 is cited for the details of the same portions. On the other hand, the editor 13F and the switching position detector 18F operate completely in the same way as the editor 13F and the switching position detector 18F shown in FIG. 22. Therefore, the description of the editor 13F and the switching position detector 18F shown in FIG. 22 is cited for the details of the editor 13F and the switching position detector 18F.

The CPU load detector 23 operates by making the CPU 10 control other elements of the computer terminal according to a predetermined program. The CPU load detector 23 measures the usage rate of the CPU 10 at a predetermined time interval using API provided from the OS 27 of the computer terminal. Moreover, the CPU load detector 23 estimates the load of the CPU 10 from the usage rate thereof and notifies the allocation ratio setter 24 of the estimation result in real time. For example, the CPU load detector 23 estimates the load of the CPU 10 by dividing the entire range 0% to 100% of values of the usage rate of the CPU 10 into several steps and determining to which step the measured usage rate belongs. When there is a change in the step to which the measured usage rate of the CPU 10 belongs, the CPU load detector 23 notifies the allocation ratio setter 24 of the change along with the type of the changed step. For example, it is assumed that the entire range of the usage rate of the CPU 10 is divided into three steps of 0 to 20%, 20 to 80%, and 80 to 100%. When the measured usage rate of the CPU 10 is changed from the first step of 0 to 20% to the second step of 20 to 80%, the CPU load detector 23 notifies the allocation ratio setter 24 that the changed step is the second step of 20 to 80% along with the fact of change.

The allocation ratio setter 24 operates by making the CPU 10 control other elements of the computer terminal according to a predetermined program. When receiving a predetermined signal from the data allocator 14G, the allocation ratio setter 24 makes the CPU load detector 23 notify of the change in step of the usage rate of the CPU 10. When the change in step is notified from the CPU load detector 23, the allocation ratio setter 24 determines the ratio of the number of data units, for example, the ratio of the number of frames, to be allocated to both encoders 151 and 152 per unit time according to the changed step. The ratio is estimated in advance for every step of the usage rate of the CPU 10 and is stored as the second database 25 in the memory unit 20. The second database 25 stores an integer ratio HFI:SFI as the ratio of the number of data units. For example, the sum HFI+SFI of two integers constituting the integer ratio HFI:SFI is set smaller than the total number of data units to be edited by the editor 13F in a time interval for measuring the usage rate of the CPU 10. Additionally, as the usage rate of the CPU 10 becomes higher, the ratio of the number of data units allocated to the software encoder 152 is set lower. That is, as the load of the CPU 10 becomes heavier, the number of data units to be supplied to the software encoder 152 per unit time becomes smaller. When the step of the usage rate of the CPU 10 is notified from the CPU load detector 23, the allocation ratio setter 24 searches the second database 25 for the ratio of the number of data units corresponding to the step and notifies the data allocator 14G of the searched ratio.

Whenever the editor 13F writes the data unit to be encoded into the input buffer area BI of the memory unit 20, the data allocator 14G reads the time code from the data unit and sends the read time code to the switching position detector 18F. When it is notified from the switching position detector 18F, which has responded to the time code, that the position indicated by the time code is included in a free switching section, the data allocator 14G first makes the allocation ratio setter 24 notify of the ratio of the number of data units corresponding to the step of the usage rate of the CPU 10 at that time. Accordingly, the data allocator 14G alternately allocates the data unit and subsequent data units written into the input buffer area BI to both encoders 151 and 152 at the notified ratio until a new ratio is notified from the allocation ratio setter 24. For example, when the data unit is one frame and the notified ratio of the number of frames is 2:1, the data allocator 14F allocates one frame to the software encoder 152 whenever allocating two successive frames to the hardware encoder 151 from the input buffer area BI.

When it is notified from the switching position detector 18F, which has responded to the time code, that the position indicated by the time code is included in a fixed section or when it is not notified that the position is included in a fixed section or in a free switching section, the data allocator 14G operates in the same way as the data allocator 14F shown in FIG. 22.

Figure 27:
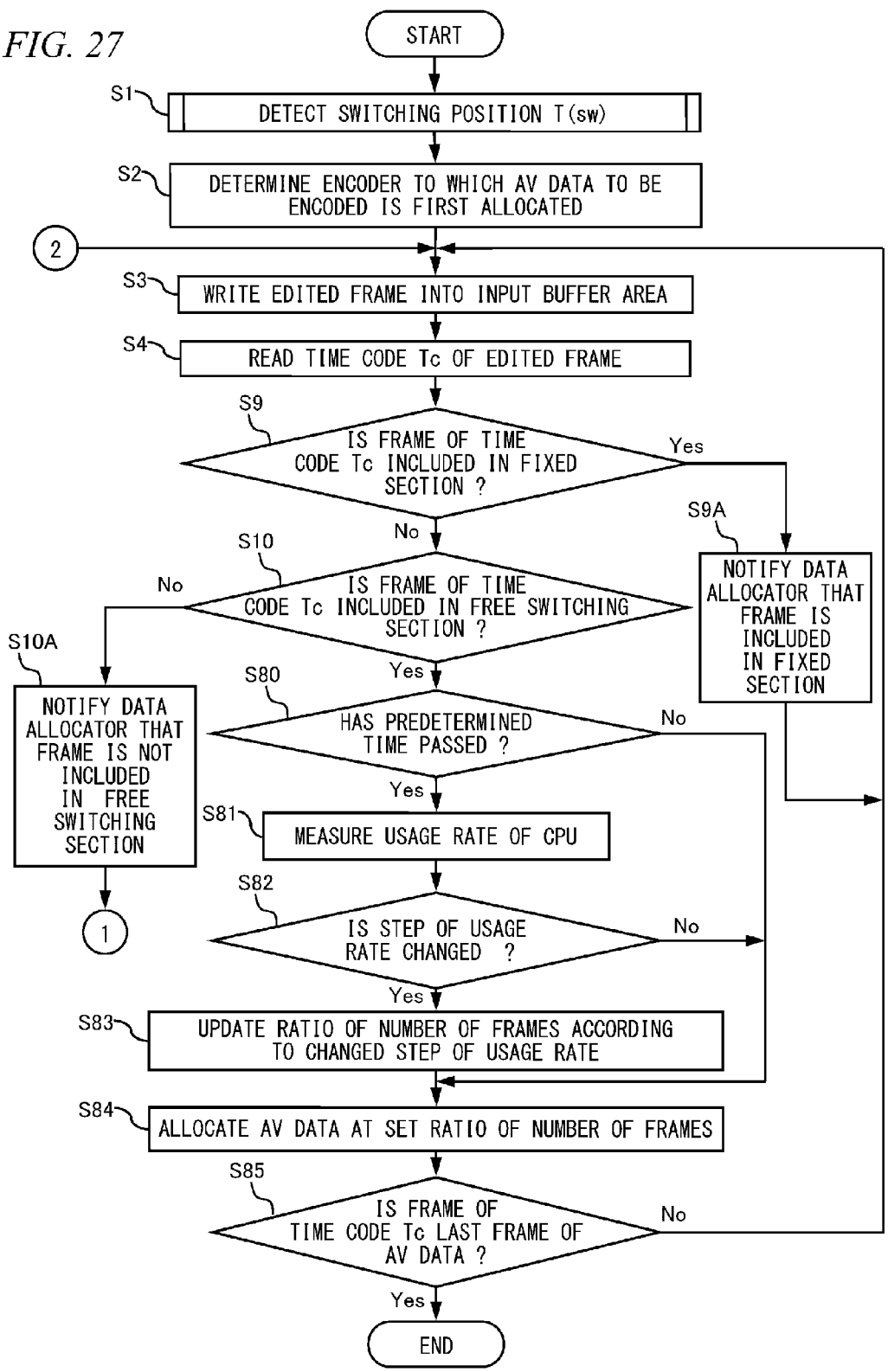
FIG. 27 is a flowchart showing an AV data allocating process by the encoding unit according to the tenth embodiment.

FIGS. 24 and 27 are flowcharts showing the AV data allocating process of the encoding unit 11G shown in FIG. 26. The allocating process will be described now referring to FIG. 27. For the purpose of convenience, it is assumed that the data unit to be encoded is one frame. Additionally, FIG. 27 includes the same steps as shown in FIG. 5 or 23. Therefore, in FIG. 27, the same steps are referenced by the same reference symbols as shown in FIG. 5 or 23. Moreover, the description of FIG. 5 or 23 is cited for the details of the same steps.

For example, when the edit information on the AV data to be encoded is prepared by the editor 13F, the following processes are started.

First, in step S1, the switching position detector 18F detects fixed sections and free switching sections from the edit information on the AV data to be encoded and detects the switching positions of the allocation destinations from the edit information on the sections which are neither fixed sections nor free switching sections. Moreover, the switching position detector 18F stores the time codes indicating the ranges of the fixed sections and the free switching sections and the time codes T(sw) indicating the switching positions. Note that since the details of step S1 is completely the same as shown in the flowchart of FIG. 25, the description of FIG. 25 recited in the description according to the ninth embodiment is cited for the details thereof.

In step S2, the switching position detector 18F initializes the number sw of the switching position to be detected to 1. On the other hand, the data allocator 14G determines one of the hardware encoder 151 and the software encoder 152 as the destination to which the first frame of the AV data to be encoded is allocated.

Next, in step S3, the editor 13F writes the frames of the edited AV data into the input buffer area BI of the memory unit 20 sequentially from the first frame.

Next, in step S4, whenever the editor 13F writes one frame to be encoded into the input buffer area BI, the data allocator 14G reads the time code Tc from the frame and sends the read time code to the switching position detector 18F.

Next, in step S9, the switching position detector 18F determines whether or not the frame of the time code Tc is included in a fixed section. When the frame is included in a fixed section ("YES" in step S9), the process proceeds to step S9A. On the other hand, when the frame is not included in a fixed section ("NO" in step S9), the process proceeds to step S10.

Next, in step S9A, the switching position detector 18F notifies the data allocator 14G that the frame of the time code Tc is included in a fixed section. Accordingly, the data allocator 14G sets the encoder fixed in the fixed section as the destination to which the frame of the time code Tc is allocated. Then, the processes are repeated from step S3.

On the other hand, in step S10, the switching position detector 18F determines whether or not the frame of the time code Tc is included in a free switching section. When the frame is not included in a free switching section ("NO" in step S10), the process proceeds to step S10A. On the other hand, when the frame is included in a free switching section ("YES" in step S10), the process proceeds to step S80.

Next, in step S10A, the switching position detector 18F notifies the data allocator 14G that the frame of the time code Tc is not included in a free switching section. Accordingly, the processes proceed in the order of steps S5 to S8 shown in FIG. 24. Here, steps S5 to S8 shown in FIG. 24 are completely equal to steps S5 to S8 shown in FIG. 5. Accordingly, the description regarding FIG. 5 is cited for the details of steps S5 to S8. After step S8, the processes are repeated from step S3.

On the other hand, in step S80, the switching position detector 18F notifies the data allocator 14G that the frame of the time code Tc is included in a free switching section. In response to the notification, the data allocator 14G sets the ratio of the number of frames to be allocated to both encoders 151 and 152 per unit time to a predetermined value. Moreover, the data allocator 14G outputs a predetermined signal to the allocation ratio setter 24. In response to the signal, the allocation ratio setter 24 first determines whether or not a predetermined time has passed since the allocation ratio setter 24 previously made the CPU load detector 23 measure the usage rate of the CPU 10. When the predetermined time has passed ("YES" in step S80), the process proceeds to step S81. When the predetermined time has not passed ("NO" in step S80), the process proceeds to step S84.

Next, in step S81, the allocation ratio setter 24 makes the CPU load detector 23 measure the usage rate of the CPU 10.

Next, in step S82, the CPU load detector 23 identifies the step to which the measured usage rate of the CPU 10 belongs and determines whether or not the identified step is equal to the previous step. When the step is changed ("YES" in step S82), the process proceeds to step S83. When the step is not changed ("NO" in step S82), the process proceeds to step S84.

Next, in step S83, the CPU load detector 23 notifies the allocation ratio setter 24 that the step to which the usage rate of the CPU 10 belongs is changed along with the type of the changed step. The allocation ratio setter 24 searches the second database 25 for the ratio of the number of frames corresponding to the notified step of the usage rate and sends the searched ratio to the data allocator 14G. Accordingly, the data allocator 14G updates the ratio of the number of frames set in step S80 to the notified ratio.

Next, in step S84, the data allocator 14G allocates the frame of the time code Tc to one of the encoder 151 and the encoder 152 according to the set ratio of the number of frames.

Next, in step S85, the data allocator 14G determines whether or not the frame of the time code Tc is the last frame of the AV data to be encoded. When the frame is not the last frame ("NO" in step S85), the processes are repeated from step S3. On the other hand, when the frame is the last frame ("YES" in step S85), the process ends.

The encoding apparatus according to the tenth embodiment can allow a user to set the fixed sections and the free switching sections of the AV data to be encoded. This encoding apparatus detects the switching position of the destination to which the section which is neither a fixed section nor a free switching section is allocated from the edit information by the use of the switching position detector 18F, similarly to the encoding apparatus according to the first embodiment. When the editor 13F writes the edited AV data into the input buffer area BI of the memory unit 20, the data allocator 14G switches the destination to which the AV data is allocated from one of the hardware encoder 151 and the software encoder 152 to the other at respective switching positions. Accordingly, both encoders 151 and 152 encode the AV data in parallel. In this encoding apparatus, similarly to the encoding apparatus according to the first embodiment, a viewer will hardly perceive the variation in image quality, if any, which is caused by the difference between the encoding process of the hardware encoder 151 and the encoding process of the software encoder 152, in the sections which are neither fixed sections nor free switching sections from a video reconstructed by decoding the encoded AV data. Therefore, the encoding apparatus according to the tenth embodiment can improve the image quality of the AV data encoded in parallel by both encoders 151 and 152. Note that since this encoding apparatus encodes the portion of the AV data representing a series of scenes or the portion of the AV data subjected to the same edit process from one switching position to the next switching position by the use of the same encoder, it is possible to make image quality of the portions uniform, similarly to the encoding apparatus according to the first embodiment.

Moreover, the encoding apparatus according to the tenth embodiment alternately supplies the data units, which are written into the input buffer area BI of the memory unit 20 by the editor 13F, in the free switching section of the AV data to be encoded to both encoders 151 and 152 at a predetermined ratio of the number of data units regardless of the switching positions by the use of the data allocator 14G. In this encoding apparatus, the CPU load detector 23 measures the step of the usage rate of the CPU 10 in real time and the allocation ratio setter 24 sets the ratio of the number of data units according to the step of the usage rate of the CPU 10. As a result, both encoders 151 and 152 can encode the AV data in parallel while reducing the time for waiting for the input of the AV data to be encoded or while suppressing the occurrence of the waiting time, regardless of the variation in load of the CPU 10. In this way, this encoding apparatus can perform the entire encoding process at a higher speed than the encoding process using only the hardware encoder 151.

Eleventh Embodiment

Figure 28:
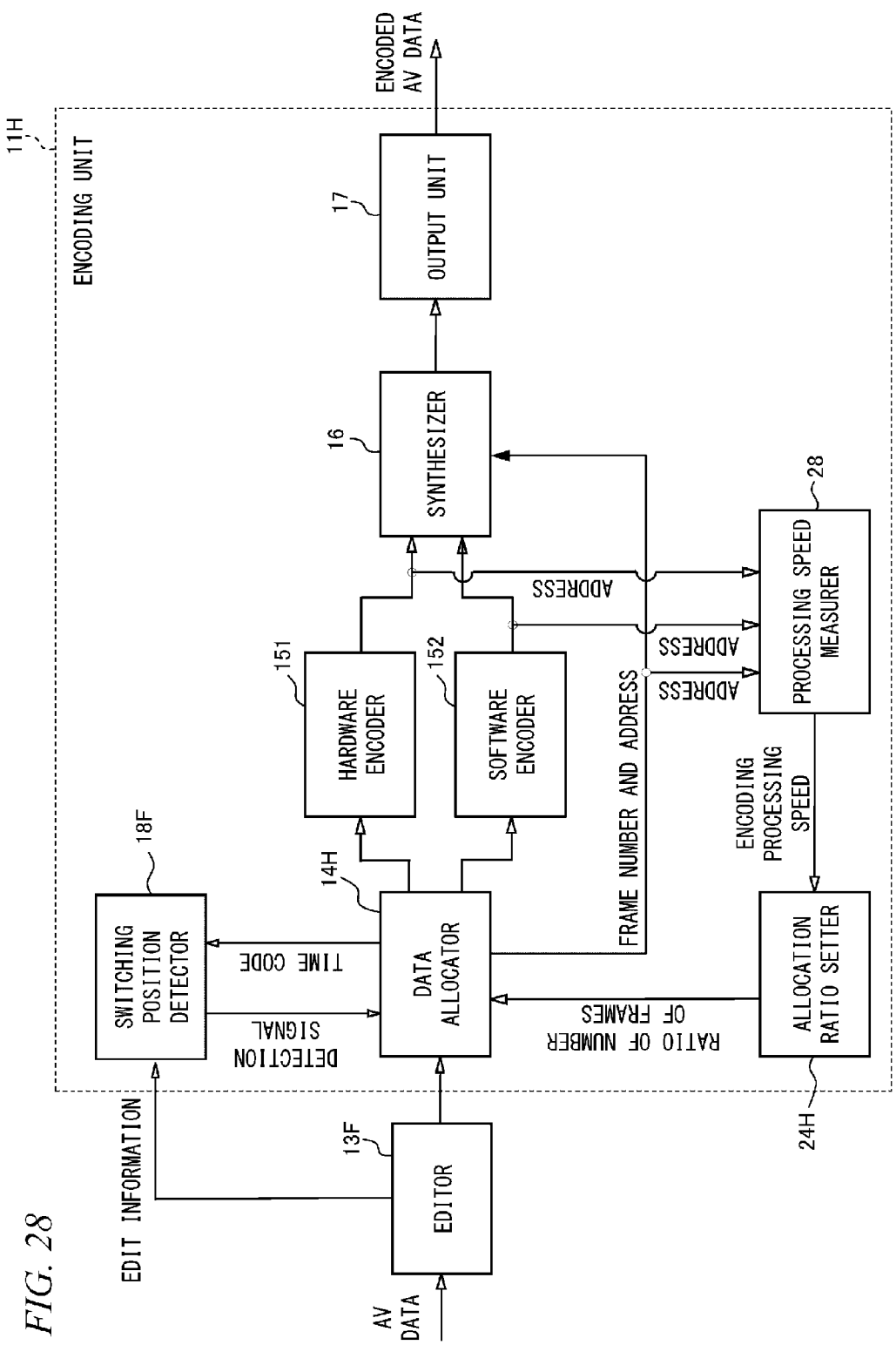
FIG. 28 is a block diagram showing an editor and an encoding unit according to an eleventh embodiment of the present invention.

FIG. 28 is a block diagram showing an editor 13F and an encoding unit 11H according to an eleventh embodiment of the present invention. Referring to FIG. 28, the encoding unit 11H includes a data allocator 14H, a hardware encoder 151, a software encoder 152, a synthesizer 16, an output unit 17, a switching position detector 18F, an allocation ratio setter 24H, and a processing speed measurer 28. The encoding unit 11H includes the same elements as shown in FIG. 3, except for the data allocator 14H, the switching position detector 18F, the allocation ratio setter 24H, and the processing speed measurer 28. In FIG. 28, the same elements are referenced by the same reference symbols as shown in FIG. 3. Additionally, the description of the elements shown in FIG. 3 is cited for details of the same elements. Moreover, the operation of the data allocator 14H includes the same portions as the operation of the data allocator 14 shown in FIG. 3. Therefore, only the portion of the operation of the data allocator 14H different from the operation of the data allocator 14 shown in FIG. 3 will be described and the description of the data allocator 14 shown in FIG. 3 is cited for the details of the same portions. On the other hand, the editor 13F and the switching position detector 18F operate completely in the same way as the editor 13F and the switching position detector 18F shown in FIG. 22. Therefore, the description of the editor 13F and the switching position detector 18F shown in FIG. 22 is cited for the details of the editor 13F and the switching position detector 18F.

The processing speed measurer 28 operates by making the CPU 10 control other elements of the computer terminal according to a predetermined program. The processing speed measurer 28 measures the time from when the data units to be encoded are allocated to the encoders 151 and 152 by the data allocator 14H to when the data units are encoded by the encoders 151 and 152 and written into the output buffer areas BO1 and BO2 of the memory unit 20. Specifically, the processing speed measurer 28 starts measuring the time when the numbers of the data units allocated to the encoders 151 and 152 and the address of the writing destination of the data units after the encoding are sent from the data allocator 14H to the synthesizer 16, and ends measuring the time when the same address is output from one of the encoders 151 and 152 to the synthesizer 16. Moreover, the processing speed measurer 28 calculates the encoding processing speeds of the encoders 151 and 152 from the measured time and sends the calculated encoding processing speeds to the allocation ratio setter 24H. Here, the encoding processing speed means the number of data units that can be encoded per unit time by each of the encoders 151 and 152. Alternatively, the processing speed measurer 28 may measure the bit rates of the AV data output from the encoders 151 and 152 to the output buffer areas BO1 and BO2 and may calculate the encoding processing speeds of the encoders 151 and 152 from the bit rates.

The allocation ratio setter 24H operates by making the CPU 10 control other elements of the computer terminal according to a predetermined program. When receiving a predetermined signal from the data allocator 14H, the allocation ratio setter 24H makes the processing speed measurer 28 calculate the encoding processing speeds of the encoders 151 and 152 and notify of the calculated encoding processing speeds. Moreover, the allocation ratio setter 24H calculates the ratio of the notified encoding processing speeds of the encoders 151 and 152 therefrom and compares the calculated ratio with the ratio of the number of data units allocated per unit time to both encoders 151 and 152 by the data allocator 14H at that time. When the ratio of the encoding processing speeds is different from the ratio of the number of data units, the allocation ratio setter 24H notifies the data allocator 14H of the ratio of the encoding processing speeds as a new ratio of the number of data units. Here, since the ratio of the encoding processing speeds is generally not an integer ratio, the allocation ratio setter 24H approximates the ratio of the encoding processing speeds to an integer ratio in advance.

Whenever the editor 13F writes a data unit to be encoded into the input buffer area BI of the memory unit 20, the data allocator 14H reads the time code of the data unit and sends the read time code to the switching position detector 18F. When it is notified from the switching position detector 18F, which has responded the time code, that the position indicated by the time code is included in a free switching section, the data allocator 14H first makes the allocation ratio setter 24H notify of the ratio of the encoding processing speeds of both encoders 151 and 152 at that time. Accordingly, the data allocator 14H allocates the data unit and subsequent data units written into the input buffer area BI to both encoders 151 and 152 at the notified ratio until a new ratio is notified from the allocation ratio setter 24H. For example, when the data unit is one frame and the notified ratio of the number of frames is 2:1, the data allocator 14H allocates one frame to the software encoder 152 every time two frames are successively allocated from the input buffer area BI to the hardware encoder 151.

When it is notified from the switching position detector 18F, which has responded to the time code, that the position indicated by the time code is included in a fixed section or when it is not notified that the position is included in a fixed section or included in a free switching section, the data allocator 14H operates similarly to the data allocator 14F shown in FIG. 22.

Figure 29:
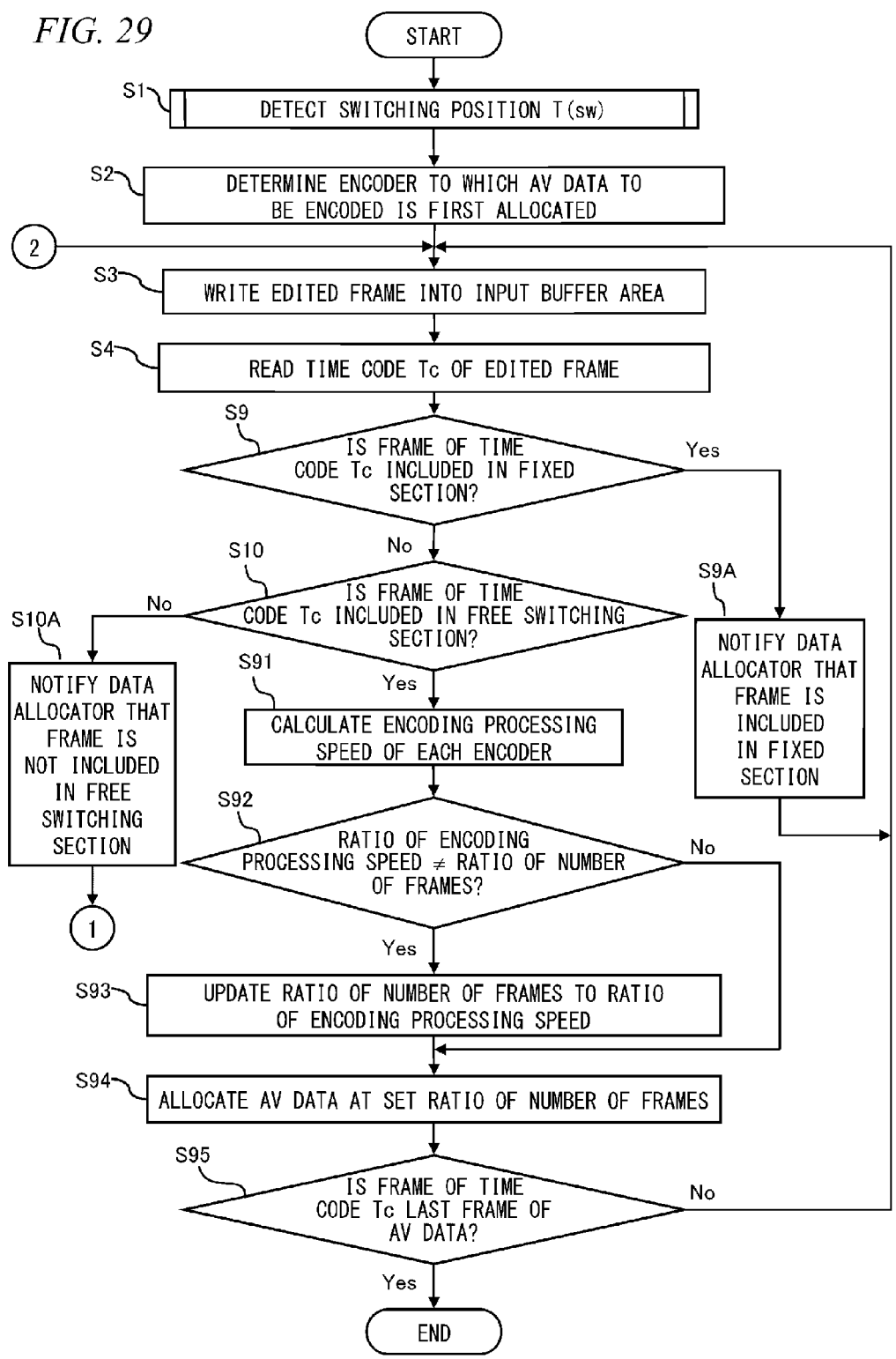
FIG. 29 is a flowchart showing an AV data allocating process by the encoding unit according to the eleventh embodiment.

FIG. 29 is a flowchart showing the AV data allocating process of the encoding unit 11H shown in FIG. 28. The allocating process will be described now referring to FIG. 29. Note that in the following description, it is assumed that the data unit is one frame for the purpose of convenient. Additionally, FIG. 29 includes the same steps as shown in FIG. 5 or 23. Therefore, in FIG. 29, the same steps are referenced by the same reference symbols as shown in FIG. 5 or 23. Moreover, the description of FIG. 5 or 23 is cited for the details of the same steps.

For example, when the edit information on the AV data to be encoded is prepared by the editor 13F, the following processes are started.

First, in step S1, the switching position detector 18F detects the fixed sections and the free switching sections from the edit information on the AV data to be encoded and detects the switching positions of the allocation destinations from the edit information on the sections which are neither fixed sections nor free switching sections. Moreover, the switching position detector 18F stores the time codes indicating the ranges of the fixed sections and the free switching sections and the time codes T(sw) indicating the switching positions. Note that since the details of step S1 are completely equal to those of the flowchart shown in FIG. 25, the description of FIG. 25 recited in the description of the ninth embodiment is cited for the details.

In step S2, the switching position detector 18F initializes the number sw of the switching section to be detected to 1. On the other hand, the data allocator 14H determines the destination to which the first frame of the AV data to be encoded is allocated to one of the hardware encoder 151 and the software encoder 152.

Next, in step S3, the editor 13F writes the frames of the edited AV data into the input buffer area BI of the memory unit 20 sequentially from the first frame.

Next, in step S4, whenever the editor 13F writes one frame to be encoded into the input buffer area BI, the data allocator 14H reads the time code Tc from the frame and sends the read time code to the switching position detector 18F.

Next, in step S9, the switching position detector 18F determines whether or not the frame of the time code Tc is included in a fixed section. When the frame is included in a fixed section ("YES" in step S9), the process proceeds to step S9A. On the other hand, when the frame is not included in a fixed section ("NO" in step S9), the process proceeds to step S10.

Next, in step S9A, the switching position detector 18F notifies the data allocator 14H that the frame of the time code Tc is included in a fixed section. Accordingly, the data allocator 14H sets the encoder fixed in the fixed section as the destination to which the frame of the time code Tc is allocated. Then, the processes are repeated from step S3.

On the other hand, in step S10, the switching position detector 18F determines whether or not the frame of the time code Tc is included in a free switching section. When the frame is not included in a free switching section ("NO" in step S10), the process proceeds to step S10A. On the other hand, when the frame is included in a free switching section ("YES" in step S10), the process proceeds to step S91.

Next, in step S10A, the switching position detector 18F notifies the data allocator 14H that the frame of the time code Tc is not included in a free switching section. Accordingly, the processes proceed in the order of steps S5 to S8 shown in FIG. 24. Here, steps S5 to S8 shown in FIG. 24 are completely equal to steps S5 to S8 shown in FIG. 5. Accordingly, the description regarding FIG. 5 is cited for the details of steps S5 to S8. After step S8, the processes are repeated from step S3.

On the other hand, in step S91, the switching position detector 18F notifies the data allocator 14H that the frame of the time code Tc is included in a free switching section. In response to the notification, the data allocator 14H sets the ratio of the number of frames to be allocated to both encoders 151 and 152 per unit time to a predetermined value. Moreover, the data allocator 14H outputs a predetermined signal to the allocation ratio setter 24H. In response to the signal, the allocation ratio setter 24H first makes the processing speed measurer 28 measure the encoding processing speeds of the encoders 151 and 152.

Next, in step S92, the allocation ratio setter 24H receives the encoding processing speeds of the encoders 151 and 152 from the processing speed measurer 28, calculates the ratio thereof, and approximates the ratio to an integer ratio. Moreover, the allocation ratio setter 24H compares the ratio of the encoding processing speeds with the ratio of the number of frames set in the data allocator 14H at that time. When the ratio of the encoding processing speeds is different from the ratio of the number of frames ("YES" in step S92), the process proceeds to step S93. When the ratio of the encoding processing speeds is equal to the ratio of the number of frames ("NO" in step S92), the process proceeds to step S94.

Next, in step S93, the allocation ratio setter 24H sends the ratio of the encoding processing speeds to the data allocator 14H. Accordingly, the data allocator 14H updates the ratio of the number of frames to the notified ratio.

Next, in step S94, the data allocator 14H allocates the frame of the time code Tc to one of the encoder 151 and the encoder 152 according to the set ratio of the number of frames.

Next, in step S95, the data allocator 14H determines whether or not the frame of the time code Tc is the last frame of the AV data to be encoded. When the frame is not the last frame ("NO" in step S95), the processes are repeated from step S3. On the other hand, when the frame is the last frame ("YES" in step S95), the process ends.

The encoding apparatus according to the eleventh embodiment can allow a user to set the fixed sections and the free switching sections of the AV data to be encoded. This encoding apparatus detects the switching positions of the destinations to which the section which is neither a fixed section nor a free switching section is allocated from the edit information by the use of the switching position detector 18F, similarly to the encoding apparatus according to the first embodiment. When the editor 13F writes the edited AV data into the input buffer area BI of the memory unit 20, the data allocator 14F switches the destination to which the AV data is allocated from one of the hardware encoder 151 and the software encoder 152 to the other at the respective switching positions. Accordingly, both encoders 151 and 152 encode the AV data in parallel. In this encoding apparatus, similarly to the encoding apparatus according to the first embodiment, a viewer will hardly perceive the variation in image quality, if any, which is caused by the difference between the encoding process of the hardware encoder 151 and the encoding process of the software encoder 152, in the sections which are neither fixed sections nor free switching sections from a video reconstructed by decoding the encoded AV data. Therefore, the encoding apparatus according to the eleventh embodiment can improve the image quality of the AV data encoded in parallel by both encoders 151 and 152. Note that since the encoding apparatus encodes the portion of the AV data representing a series of scenes or the portion of the AV data subjected to the same edit process from one switching position to the next switching position by the use of the same encoder, it is possible to make image quality of the portions uniform, similarly to the encoding apparatus according to the first embodiment.

Moreover, in the encoding apparatus according to the eleventh embodiment, the data allocator 14H alternately supplies the data units, which are written into the input buffer area BI of the memory unit 20 by the editor 13F, in the free switching sections of the AV data to be encoded to both encoders 151 and 152 at a predetermined ratio of the number of data units, regardless of the switching positions. Additionally, in this encoding apparatus, the processing speed measurer 28 measures the encoding processing speeds of the encoders 151 and 152 and the allocation ratio setter 24H adjusts the ratio of the number of data units to the actual ratio of the encoding processing speeds of the encoders 151 and 152. Accordingly, regardless of the variation in encoding processing speed of the software encoder 152 accompanied with the variation in load of the CPU 10, both encoders 151 and 152 can perform the encoding processes in parallel while reducing the time during which the synthesizer 16 waits for the input of the data units encoded by the encoders 151 and 152 or suppressing the occurrence of the waiting time.

In the encoding apparatuses according to the ninth to eleventh embodiments, similarly to the encoding apparatus according to the first embodiment, the destination to which the AV data is allocated in the sections of the AV data which are neither fixed sections nor free switching sections is switched from one of the encoder 151 and the encoder 152 to the other at the respective switching positions. Alternatively, the encoding apparatuses according to the ninth to eleventh embodiments may switch the destination to which the AV data is allocated in the same way as one of the encoding apparatuses according to the fourth to eighth embodiments.

In the encoding apparatuses according to the fourth to eleventh embodiments, the switching position detector 18 detects the switching positions of the destinations to which the sections of the AV data which are neither fixed sections nor free switching sections are allocated from the edit information, similarly to the encoding apparatus according to the first embodiment. Alternatively, the encoding apparatuses according to the fourth to eleventh embodiments may detect the switching positions of the destination from all of or a portion of AV data, similarly to those of the second and third embodiments.

Note that the following items are disclosed regarding the above-mentioned description.

(Item 1)

An encoding apparatus for encoding audiovisual (AV) data including audio data and/or video data, comprising:

a CPU;

a hardware encoder, configured by hardware, for encoding a portion of AV data to be encoded;

a software encoder for encoding another portion of the AV data using the CPU in parallel with the encoding by the hardware encoder;

a position detector for detecting a switching position of a destination to which the AV data is allocated, the switching position being at least one of a position in the AV data at which one scene is switched to another scene, a position in the AV data at which the type of edit process is changed according to a predetermined pattern, a position in the AV data at which the amount of variation in scene between the data units before and after this position is greater than a predetermined threshold, and a position in the AV data at which amounts of information of both the data units before and after this position are less than a predetermined threshold;

a data allocator for allocating the portion or the other portion of the AV data to the hardware encoder or the software encoder, a destination to which the portion or the other portion of AV data is supplied being switched at the switching position from one of the hardware encoder and the software encoder to the other;

a synthesizer for arranging AV data encoded by the hardware encoder and AV data encoded by the software encoder in a predetermined sequence to synthesize a series of encoded AV data; and an output unit for outputting the series of encoded AV data.

(Item 2)

The encoding apparatus according to item 1, wherein the position at which the one scene is switched to the other scene and the position at which the type of editing process is switched are detected based on edit information of the AV data.

(Item 3)

The encoding apparatus according to item 1, wherein the position at which the type of the edit process is changed according to the predetermined pattern and the position at which the amount of variation in scene between the data units before and after this position is greater than the predetermined threshold are detected based on the AV data.

(Item 4)

The encoding apparatus according to item 1, wherein the encoding scheme is common between the hardware encoder and the software encoder.

(Item 5)

The encoding apparatus according to item 1, wherein the AV data encoded by the hardware encoder and the AV data encoded by the software encoder are not in a prediction relationship with each other.

(Item 6)

The encoding apparatus according to item 1, wherein the amount of variation in scenes between the data units before and after the position includes at least one of the difference in video data of the entire screen, the difference in color components, the amount of variation in motion of the entire screen, and the amount of variation in motion of a specific object in the screen.

(Item 7)

The encoding apparatus according to item 1, wherein the position at which the type of editing process is changed according to a predetermined pattern includes a position at which at least one of the decoding scheme of the AV data to be edited and the type of an effect process on the AV data to be edited is changed according to the predetermined pattern.

(Item 8)

The encoding apparatus according to item 1, wherein the position at which the amounts of information of both the data units before and after this position are smaller than a predetermined threshold includes at least one of a position at which the sum or the average of predetermined high-frequency transform coefficients acquired from each data unit by the discrete cosine transform is smaller than a predetermined threshold and a position at which the bit rate after the encoding estimated in the encoding of the software encoder is smaller than a predetermined target bit rate.

(Item 9)

The encoding apparatus according to item 1, wherein the position detector detects and stores a switching position of the AV data to be encoded prior to encoding, and the data allocator switches a destination to which AV data is supplied at the stored switching position.

(Item 10)

The encoding apparatus according to item 9, wherein data representing an allowance for a frequency of allocating the AV data to be encoded to the hardware encoder and the software encoder is supplied to the position detector, and the position detector determines a switching position based on the allowance.

(Item 11)

The encoding apparatus according to item 1, further comprising a buffer, connected between the data allocator and the hardware encoder, for temporarily storing the AV data to be supplied to the hardware encoder by the data allocator and supplying the AV data to the hardware encoder, wherein the data allocator acquires space information of the buffer, allocates the AV data to the buffer when the space information indicates that there is an empty area greater than or equal to a predetermined amount even if there is a switching position, and allocates the AV data to the software encoder when the space information indicates that there is an empty area less than the predetermined amount.

(Item 12)

The encoding apparatus according to item 1, wherein the position detector determines the ratio of the number of data units to be supplied per unit time for each section to be encoded by the hardware encoder or the software encoder based on the length of a section between neighboring switching positions and supplies data indicating the ratio to the data allocator, and the data allocator supplies the AV data to the hardware encoder and the software encoder based on the data indicating the ratio of each section.

(Item 13)

The encoding apparatus according to item 1, wherein the CPU performs another process on the AV data to be encoded other than the encoding, the position detector further includes a CPU load estimator for predicting a load of the CPU at the time of performing the other process in correspondence with the AV data of a section between detected neighboring switching positions, the position detector determines an allocation destination to which AV data of each section is allocated according to the predicted load of the CPU, and the data allocator supplies the AV data to the determined allocation destination for each section.

(Item 14)

The encoding apparatus according to item 1, wherein the CPU performs another process on the AV data to be encoded other than the encoding, the encoding apparatus further comprises a CPU load detector for detecting a load of the CPU, and the data allocator makes the CPU perform the other process on the AV data with a predetermined length from one switching position prior to the encoding and determines the destination to which the AV data of a section from the switching position to a next switching position is allocated according to the load of the CPU, which is caused by the other process and is detected by the CPU load detector while the other process is performed prior to the encoding.

(Item 15)

The encoding apparatus according to item 1, wherein the data allocator allocates the AV data to one of the hardware encoder and the software encoder in a direction from the head to the tail of the AV data and allocates the AV data to the other in a direction from the tail to the head of the AV data.

(Item 16)

The encoding apparatus according to item 15, wherein the position detector predicts a load of the CPU due to the process of the first section and the last section by the CPU and determines the destination to which the first section is allocated based on the predicted load of the CPU.

(Item 17)

The encoding apparatus according to item 1, wherein data indicating a fixed section of the AV data to be allocated to one of the hardware encoder and the software encoder is supplied to the position detector, and the position detector does not detect the switching position of the allocation destination in the fixed section.

(Item 18)

The encoding apparatus according to item 1, wherein data indicating a free switching section of the AV data which can be allocated to any of the hardware encoder and the software encoder is supplied to the position detector, and the position detector does not detect the switching position of the allocation destination in the free switching section.

(Item 19)

The encoding apparatus according to item 18, further comprising a buffer, connected between the data allocator and the hardware encoder, for storing the AV data allocated to the hardware encoder by the data allocator and supplying the AV data to the hardware encoder, wherein the data allocator acquires space information of the buffer and allocates the AV data to be encoded to the hardware encoder or the software encoder based on the space information in a predetermined section of the AV data to be encoded, regardless of the switching position.

(Item 20)

The encoding apparatus according to item 18, further comprising an allocation ratio setter for detecting a load of the CPU, calculating the ratio of the number of data units per unit time of the AV data to be allocated to the hardware encoder and the AV data to be allocated to the software encoder based on the detected load, and supplying data indicating the ratio to the data allocator, wherein the data allocator allocates the AV data to be encoded to the hardware encoder or the software encoder at the ratio in a predetermined section of the AV data to be encoded, regardless of the switching position.

(Item 21)

The encoding apparatus according to item 18, further comprising:

a processing speed measurer for measuring an encoding processing speed of the hardware encoder and an encoding processing speed of the software encoder; and an allocation ratio setter for calculating the ratio of the number of data units per unit time of the AV data to be allocated to the hardware encoder and the AV data to be allocated to the software encoder based on the measured encoding processing speed and supplying data indicating the ratio to the data allocator, wherein the data allocator allocates the AV data to be encoded to the hardware encoder or the software encoder at the ratio in a predetermined section of the AV data to be encoded, regardless of the switching position.

(Item 22)

A video editing system comprising:

a CPU;

an editor for editing audiovisual (AV) data including audio data and/or video data; a hardware encoder, configured by a circuit for encoding, for encoding a portion of AV data to be encoded;

a software encoder for encoding another portion of the AV data using the CPU in parallel with the encoding by the hardware encoder;

a position detector for detecting a switching position of a destination to which the AV data is allocated, the switching position being at least one of a position in the AV data at which one scene is switched to another scene, a position in the AV data at which the type of an edit process is changed according to a predetermined pattern, a position in the AV data at which an amount of variation in scene between the data units before and after this position is greater than a predetermined threshold, and a position in the AV data at which amounts of information of both the data units before and after this position are less than a predetermined threshold;

a data allocator for allocating the portion or the other portion of the AV data to the hardware encoder or the software encoder, a destination to which the portion or the other portion of AV data is supplied being switched at the switching position from one of the hardware encoder and the software encoder to the other;

a synthesizer for arranging AV data encoded by the hardware encoder and AV data encoded by the software encoder in a predetermined sequence to synthesize a series of encoded AV data; and an output unit for outputting the series of encoded AV data.

(Item 23)

The video editing system according to item 22, wherein the position detector acquires edit information from the editor and detects and stores a switching position of the AV data to be edited from the edit information, and the data allocator switches the destination to which the AV data is supplied at the stored switching position.

(Item 24)

The video editing system according to item 22, wherein the position detector determines the ratio of the number of data units to be supplied per unit time for each section to be encoded by the hardware encoder or the software encoder based on the length of a section between neighboring switching positions and supplies data indicating the ratio to the editor and the data allocator, the editor supplies the edited AV data to the data allocator based on the data indicating the ratio of each section, and the data allocator supplies the AV data to the hardware encoder and the software encoder based on the data indicating the ratio of each section.

(Item 25)

The video editing system according to item 22, wherein the position detector further includes a CPU load estimator for predicting a load of the CPU at the time the editor outputs the AV data edited based on the edit information from the edit information in correspondence with the AV data of a section between the detected neighboring switching positions, the position detector determines the destination to which the AV data of each section is allocated according to the predicted load of the CPU, and the data allocator supplies the AV data to the determined allocation destination for each section.

(Item 26)

The video editing system according to item 22, further comprising a CPU load detector for detecting a load of the CPU, wherein the data allocator makes the editor perform a process of outputting the AV data with a predetermined length from one switching position prior to the encoding and determines the destination to which the AV data of a section from the switching position to a next switching position is allocated according to the load of the CPU, which is caused by the output process of the editor and is detected by the CPU load detector while the output process is performed prior to the encoding.

(Item 27)

The video editing system according to item 22, wherein the editor outputs the edited AV data in a direction from the head to the tail and also outputs the AV data in a direction from the tail to the head, and the data allocator allocates the AV data to one of the hardware encoder and the software encoder in the direction from the head to the tail of the AV data and allocates the AV data to the other in the direction from the tail to the head of the AV data.

(Item 28)

The video editing system according to item 27, wherein the position detector predicts a load of the CPU caused by the output process of the editor for the first section and the last section and determines the destination to which the first section is allocated based on the predicted load of the CPU.

(Item 29)

The video editing system according to item 22, wherein data indicating a fixed section of the edited AV data to be allocated to one of the hardware encoder and the software encoder is included in the edit information supplied from the editor to the position detector, and the position detector does not detect the switching position of the allocation destination in the fixed section.

(Item 30)

The video editing system according to item 22, wherein data indicating a free switching section of the edited AV data which can be allocated to any of the hardware encoder and the software encoder is included in the edit information supplied from the editor to the position detector, and the position detector does not detect the switching position of the allocation destination in the free switching section.

(Item 31)

A method for encoding audiovisual (AV) data including audio data and/or video data, comprising the steps of:

receiving the AV data, detecting a switching position of a destination to which the AV data is allocated, the switching position being at least one of a position in the AV data at which one scene is switched to another scene, a position in the AV data at which the type of edit process is changed according to a predetermined pattern, a position in the AV data at which the amount of variation in scene between the data units before and after this position is greater than a predetermined threshold, and a position in the AV data at which amounts of information of both the data units before and after this position are less than a predetermined threshold;

allocating a portion or another portion of the AV data to a hardware encoder or a software encoder, a destination to which the portion or the other portion of AV data is supplied being switched at the switching position from one of the hardware encoder and the software encoder to the other, wherein the hardware encoder is configured by hardware for encoding and the software encoder uses a CPU for encoding;

encoding the portion or the other portion of the AV data in parallel by the hardware and software encoder;

arranging AV data encoded by the hardware encoder and AV data encoded by the software encoder in a predetermined sequence and synthesizing a series of encoded AV data; and outputting the series of encoded AV data.

(Item 32)

A program for encoding audiovisual (AV) data including audio data and/or video data, the program making an apparatus which includes:

a CPU;

a hardware encoder, configured by hardware dedicated to encoding, for encoding a portion of AV data to be encoded; and a software encoder for encoding another portion of the AV data to be encoded using the CPU, perform the steps of:

receiving the AV data to be encoded;

detecting a switching position of a destination to which the AV data is allocated, the switching position being at least one of a position in the AV data at which one scene is switched to another scene, a position in the AV data at which the type of edit process is changed according to a predetermined pattern, a position in the AV data at which an amount of variation in scene between the data units before and after this position is greater than a predetermined threshold, and a position in the AV data at which amounts of information of both the data units before and after this position are less than a predetermined threshold;

allocating the AV data to the hardware encoder or the software encoder, a destination to which the AV data is supplied being switched at the switching position from one of the hardware encoder and the software encoder to the other;

encoding, in the hardware encoder or the software encoder, the supplied AV data; arranging AV data encoded by the hardware encoder and AV data encoded by the software encoder in a predetermined sequence to synthesize a series of encoded AV data; and outputting the series of encoded AV data.

REFERENCE SIGNS LIST

10 CPU
11, 111, 112, 11A-11H Encoding unit
13, 13B, 13E, 13F Editor
14, 14A, 14B, 14D-14H Data allocator
151 Hardware encoder
152 Software encoder
16 Synthesizer
17 Output unit
18, 181, 183, 18B, 18E, 18F Switching position detector
182 Data analyzer
184 CPU load estimator
21 Buffer
22 First database 23 CPU load detector
24, 24H Allocation ratio setter
25 Second database
28 Processing speed measurer
100 Encoding apparatus
200 Video editing system

The invention claimed is:

1. An encoding apparatus for encoding video, comprising:
a CPU;
a hardware encoder, configured by hardware, for encoding a portion of video data to be encoded;
a software encoder for encoding another portion of the video data using the CPU in parallel with the encoding by the hardware encoder;
a position detector for detecting a switching position for allocating the portions of the video data to the hardware encoder or the software encoder, the switching position being at least one of a position in the video data at which an amount of variation in scene between the data units before and after this position is greater than a predetermined threshold, and a position in the video data at which amounts of information of both the data units before and after this position are less than a predetermined threshold;
a data allocator for allocating the portion or the other portion of the video data to the hardware encoder or the software encoder, a destination to which the portion or the other portion of video data is supplied being switched at the switching position from one of the hardware encoder and the software encoder to the other;
a synthesizer for arranging video data encoded by the hardware encoder and video data encoded by the software encoder in a predetermined sequence to synthesize a series of encoded video data; and
an output unit for outputting the series of encoded video data.

2. The encoding apparatus according to claim 1, wherein the position detector detects and stores a switching position of the video data to be encoded prior to encoding, and the data allocator switches a destination to which video data is supplied at the stored switching position.

3. The encoding apparatus according to claim 2, wherein data representing an allowance for a frequency of allocating the video data to be encoded to the hardware encoder and the software encoder is supplied to the position detector, and the position detector determines a switching position based on the allowance.

4. The encoding apparatus according to claim 1, further comprising a buffer, connected between the data allocator and the hardware encoder, for temporarily storing the video data to be supplied to the hardware encoder by the data allocator and supplying the video data to the hardware encoder,
wherein the data allocator acquires space information of the buffer, allocates the video data to the buffer when the space information indicates that there is an empty area greater than or equal to a predetermined amount even if there is a switching position, and allocates the video data to the software encoder when the space information indicates that there is an empty area less than the predetermined amount.

5. The encoding apparatus according to claim 1, wherein the position detector determines the ratio of the number of data units to be supplied per unit time for each section to be encoded by the hardware encoder or the software encoder based on the length of a section between neighboring switching positions and supplies data indicating the ratio to the data allocator, and the data allocator supplies the video data to the hardware encoder and the software encoder based on the data indicating the ratio of each section.

6. The encoding apparatus according to claim 1, wherein the CPU performs another process on the video data to be encoded other than the encoding, the position detector further includes a CPU load estimator for predicting a load of the CPU at the time of performing the other process in correspondence with the video data of a section between detected neighboring switching positions, the position detector determines an allocation destination to which video data of each section is allocated according to the predicted load of the CPU, and the data allocator supplies the video data to the determined allocation destination for each section.

7. The encoding apparatus according to claim 1, wherein the CPU performs another process on the video data to be encoded other than the encoding, the encoding apparatus further comprises a CPU load detector for detecting a load of the CPU, and the data allocator makes the CPU perform the other process on the video data with a predetermined length from one switching position prior to the encoding and determines the destination to which the video data of a section from the switching position to a next switching position is allocated according to the load of the CPU, which is caused by the other process and is detected by the CPU load detector while the other process is performed prior to the encoding.

8. The encoding apparatus according to claim 1, wherein data indicating a free switching section of the video data which can be allocated to any of the hardware encoder and the software encoder is supplied to the position detector, and the position detector does not detect the switching position of the allocation destination in the free switching section.

9. A method for encoding video data comprising the steps of:
receiving the video data,
detecting a switching position for allocating portions of the video data to a hardware encoder or a software decoder, the switching position being at least one of a position in the video data at which an amount of variation in scene between the data units before and after this position is greater than a predetermined threshold, and a position in the video data at which amounts of information of both the data units before and after this position are less than a predetermined threshold; allocating a portion or another portion of the video data to a hardware encoder or a software encoder, a destination to which the portion or the other portion of video data is supplied being switched at the switching position from one of the hardware encoder and the software encoder to the other, wherein the hardware encoder is configured by hardware for encoding and the software encoder uses a CPU for encoding; encoding the portion or the other portion of the video data in parallel by the hardware and software encoder; arranging video data encoded by the hardware encoder and video data encoded by the software encoder in a predetermined sequence and synthesizing a series of encoded video data; and outputting the series of encoded video data.

* * * * *